(12) United States Patent
Hermanson

(10) Patent No.: US 9,101,969 B2
(45) Date of Patent: Aug. 11, 2015

(54) RECTANGULAR/SQUARE SPIRAL DUCTING SYSTEMS WITH FLANGE CONNECTORS

(76) Inventor: Jeffrey Allen Hermanson, Sumner, WA (US)

(*) Notice: Subject to any disclaimer, the term of this patent is extended or adjusted under 35 U.S.C. 154(b) by 1524 days.

(21) Appl. No.: 11/952,907

(22) Filed: Dec. 7, 2007

(65) Prior Publication Data

US 2008/0134745 A1   Jun. 12, 2008

Related U.S. Application Data

(60) Continuation-in-part of application No. 11/520,844, filed on Sep. 12, 2006, now Pat. No. 7,743,504, which is a division of application No. 10/359,017, filed on Feb. 3, 2003, now Pat. No. 7,104,104.

(60) Provisional application No. 60/968,001, filed on Aug. 24, 2007, provisional application No. 60/873,837, filed on Dec. 8, 2006, provisional application No. 60/368,632, filed on Mar. 27, 2002, provisional application No. 60/353,807, filed on Feb. 1, 2002.

(51) Int. Cl.
*B21K 1/76* (2006.01)
*B21D 15/02* (2006.01)
*B21C 37/12* (2006.01)
*B21C 37/30* (2006.01)
*F16L 23/14* (2006.01)
*F24F 13/02* (2006.01)

(52) U.S. Cl.
CPC ............. *B21D 15/02* (2013.01); *B21C 37/127* (2013.01); *B21C 37/30* (2013.01); *F16L 23/14* (2013.01); *F24F 13/0209* (2013.01); *F24F 13/0245* (2013.01); *Y10T 29/49391* (2015.01); *Y10T 29/49428* (2015.01)

(58) Field of Classification Search
CPC ...... B21D 15/02; B21C 37/30; B21C 37/127; F16L 23/14; F24F 13/0245; F24F 13/0209; Y10T 29/49428; Y10T 29/49391
USPC .............. 29/890.14, 897, 897.3, 897.31, 412, 29/417, 525.14; 72/48, 49, 50, 370.23, 72/370.26, 370.06, 370.08, 367.1, 368, 72/379.2, 379.4; 285/242, 424; 138/155, 138/158, 163
See application file for complete search history.

(56) References Cited

U.S. PATENT DOCUMENTS 565,499 A   8/1896   Pattison
2,123,410 A   7/1938   Fawcett
(Continued)

FOREIGN PATENT DOCUMENTS

DE   2916801 A1   11/1980
EP   0443193 A2   8/1991
(Continued)

*Primary Examiner* — Ryan J Walters
(74) *Attorney, Agent, or Firm* — Christensen O'Connor Johnson Kindness PLLC

(57) ABSTRACT

A duct structure (50), includes lengths of square/rectangular duct (52) manufactured by performing spiral duct in round cross-section (51) and then transforming the round cross-section into square and rectangular cross-sections utilizing expandable die structures (58). The duct (52) may be connected together end to end by flanged connectors (54) formed from strip stock (220), that is notched at locations that correspond to the corners of the formed flange connector. The cross-sectional profile of the flanged connector is then formed by roll forming and/or bending and/or other techniques. Thereafter, the strip stock is bent at its notched locations to define the corners (230) of the flange connector (54) and then the free ends of the strip stock are fixed together.

13 Claims, 43 Drawing Sheets

(56) References Cited

U.S. PATENT DOCUMENTS

| | | |
|---|---|---|
| 2,474,887 A | 7/1949 | Carswell |
| 2,916,076 A | 12/1959 | Young |
| 3,266,285 A | 8/1966 | Jensen |
| 3,347,569 A | 10/1967 | Lindgren |
| 3,710,609 A | 1/1973 | Jones |
| 3,712,649 A | 1/1973 | Martin |
| 3,815,638 A | 6/1974 | Martin |
| 3,871,688 A | 3/1975 | Molino |
| 3,996,783 A | 12/1976 | Meserole |
| 4,046,409 A | 9/1977 | Virgin |
| 4,215,518 A | 8/1980 | Blair |
| 4,516,797 A | 5/1985 | Meinig |
| 4,571,980 A | 2/1986 | Goodwin |
| 4,803,881 A | 2/1989 | Dudley |
| 4,829,803 A * | 5/1989 | Cudini .................. 72/370.22 |
| 4,862,724 A | 9/1989 | Haws |
| 4,914,939 A | 4/1990 | Brinegar |
| 4,974,440 A | 12/1990 | Brinegar |
| 5,022,688 A | 6/1991 | Arnoldt |
| 5,133,580 A | 7/1992 | Meinig |
| 5,357,667 A * | 10/1994 | Schutz .......................... 29/509 |
| 6,000,260 A | 12/1999 | Price |
| 6,260,403 B1 | 7/2001 | Johnston |
| 6,397,449 B1 * | 6/2002 | Mason et al. ................ 29/421.1 |
| 6,540,266 B2 | 4/2003 | Pakker |

FOREIGN PATENT DOCUMENTS

| | | |
|---|---|---|
| EP | 0537594 A2 | 4/1993 |
| EP | 0687845 A1 | 12/1995 |
| GB | 1242990 A | 8/1971 |
| GB | 1425778 A | 2/1976 |

* cited by examiner

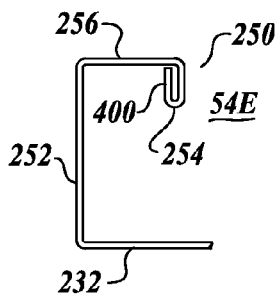
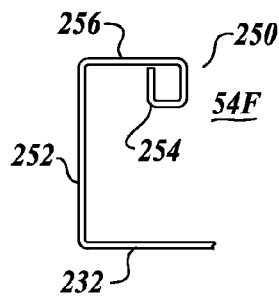
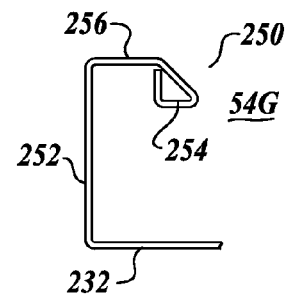
Fig.52.    Fig.53.    Fig.54.
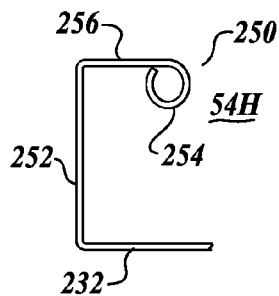
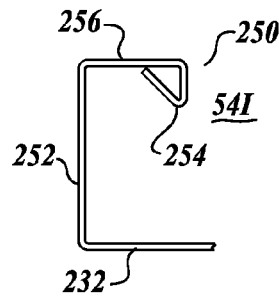
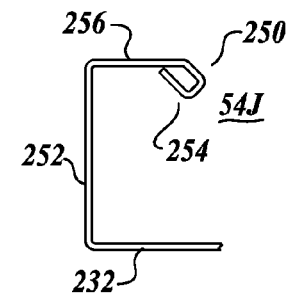
Fig.55.    Fig.56.    Fig.57.
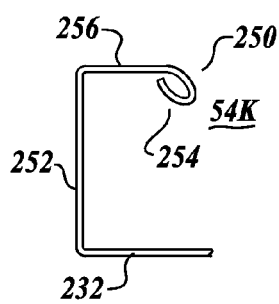
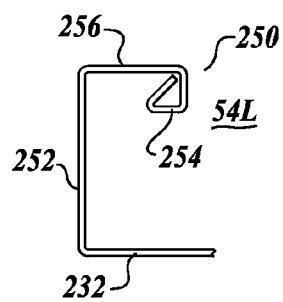
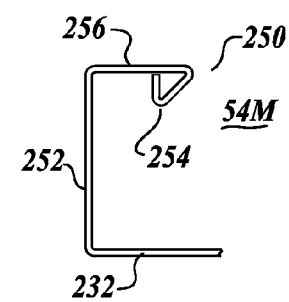
Fig.58.    Fig.59.    Fig.60.
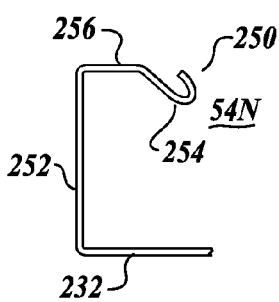
Fig.61.

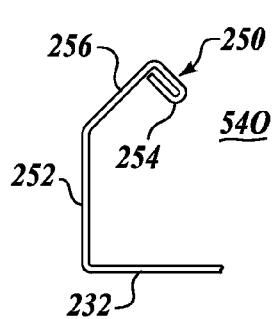 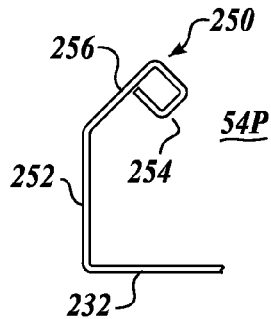 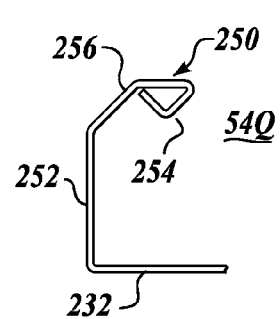
*Fig. 62.*   *Fig. 63.*   *Fig. 64.*
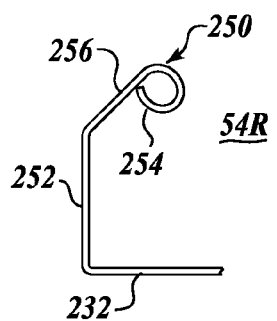 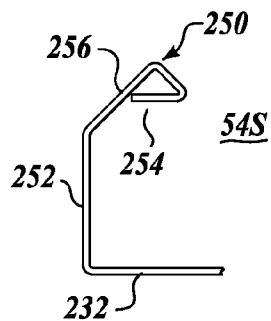 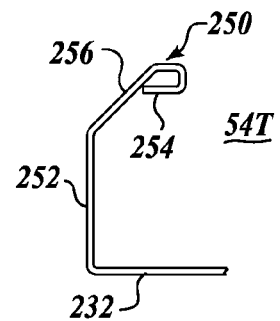
*Fig. 65.*   *Fig. 66.*   *Fig. 67.*
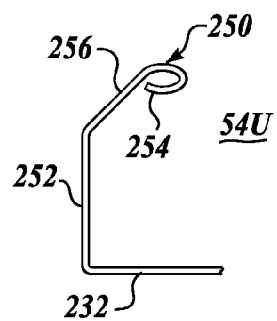 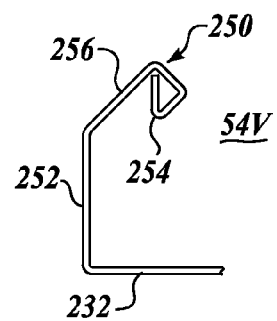 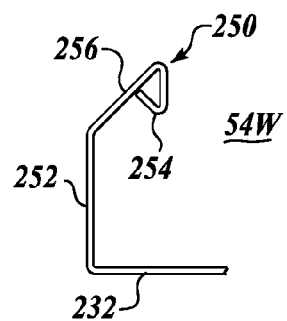
*Fig. 68.*   *Fig. 69.*   *Fig. 70.*
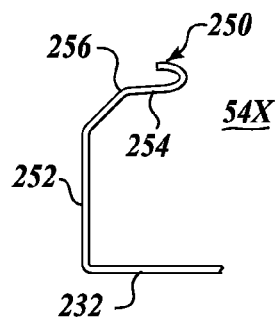
*Fig. 71.*

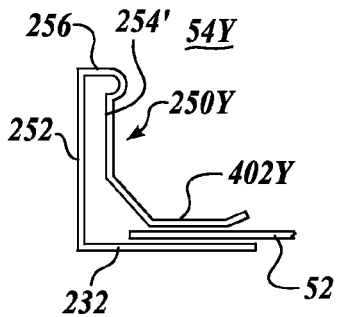
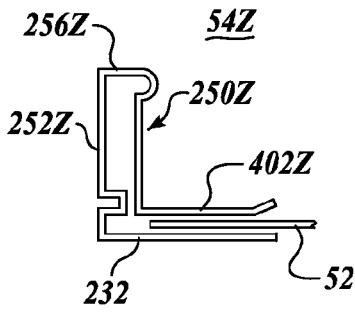
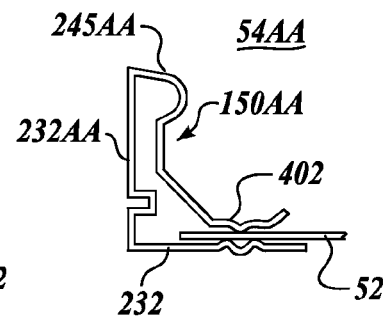
Fig. 72.        Fig. 73.        Fig. 74.
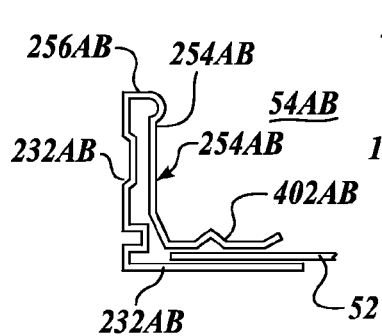
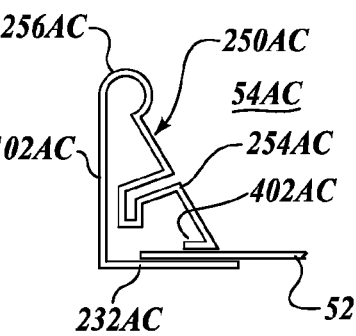
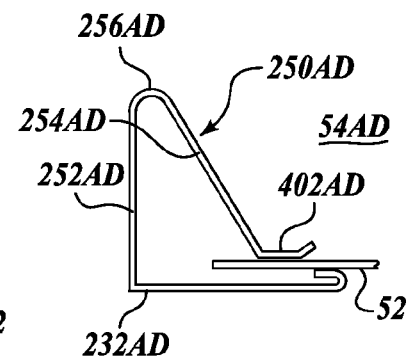
Fig. 75.        Fig. 76.        Fig. 77.
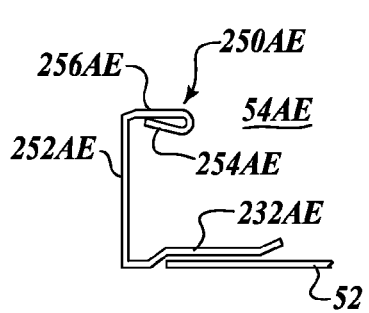
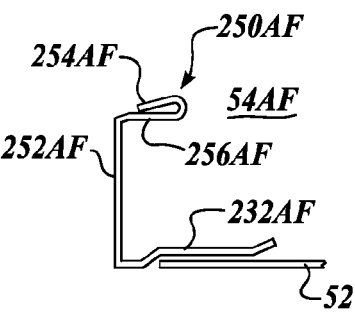
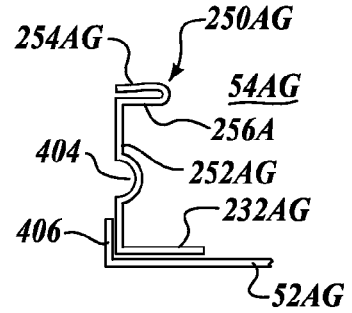
Fig. 78.        Fig. 79.        Fig. 80.

RECTANGULAR/SQUARE SPIRAL DUCTING SYSTEMS WITH FLANGE CONNECTORS

TECHNICAL FIELD

The present invention relates to rectangular and square heating, ventilating and air conditioning (HVAC) ducting and methods of making such ducting from spiral round ducting and interconnecting such ducting.

BACKGROUND

Square and rectangular ducting are widely used in HVAC systems. Such ducting can be located in a floor or ceiling, for example, between floor or ceiling joists, whereas ducting of other cross-sectional shapes, such as round, may not fit in such locations and still be sufficiently large enough in size to handle the HVAC load required.

Referring to FIGS. 1-3, it is known to manufacture square and rectangular ducting structures such as structure 20, by bending a sheet of thin-gauge material to form the corners and the four walls of a length of ducting 22 and then join the duct together along one corner 24 to form an integral structure. This corner joint may take various forms, such as by overlapping portions of the ducting and then screwing the overlapped portions together, or by utilizing an "S" shaped flange 26 or other shaped member to join the ducting along corner 24. Typically, lengths of square and rectangular ducting produced in this manner are relatively limited in length due to the size of the brake press or other machinery used to form the corners of the ducting and also limited by the length of the sheet metal stock available, typically about four feet in length.

Because square and rectangular cross-section HVAC ducting is typically of relatively short lengths, it is necessary to connect ducting sections end-to-end to achieve a desired overall length. In this regard, as shown most clearly in FIGS. 1 and 2, a face flange structure 28 is integrally formed at the ends of each wall of the duct 22. The face flange structure typically has a mating or face section 30 extending perpendicularly to the corresponding wall of duct 22 and a reinforcement hem structure 32 extending transversely from the distal edge flange face 30. The hem structure 32 may be folded over on itself to form a double thick section for additional strength. In FIG. 1, the hem structure 32 is folded inwardly on itself whereas in FIG. 2, the hem section is folded outwardly on itself.

As will be appreciated by the foregoing construction, it is not possible to extend the face flange structures 28 to occupy the entire corner at the juncture between two adjacent panels of the ducting structure 20. Such open corners are "filled in" by an angle bracket 34 that typically nests with the adjacent portions of the face flange structures 28. FIG. 1 shows the angle brackets 34 prior to installation, whereas FIG. 2 illustrates the angle brackets in installed positions. The angle brackets include corner apertures 35 for receiving a hardware fastener 36 therethrough. The hardware fastener may be in the form of a threaded screw 36 that mates with a nut 38. In this manner, the face flange structures 28 are connected together in face-to-face relationship at the corners of the ducting structure 20.

A flat or other shaped gasket 40 may be interposed between adjacent flange faces 30 in an effort to provide an airtight seal therebetween. A sufficient seal usually is not achieved through the use of only the angle brackets 34. As such, typically, formed clips 41 are also used to also retain the adjacent face flange structures 28 together in an engaged face-to-face relationship. As shown in FIG. 2, the clips 40 are shaped and sized to wrap around the reinforcement hem structures 32 of the face flange structures 28.

Referring to FIG. 3, typically reinforcing members are needed to increase the structural integrity of ducting sections 20 and to prevent the ducting sections from unduly vibrating. FIG. 3 illustrates such reinforcing members in the form of "Z" brackets 39 that extend transversely across duct 22, with one of the flange sections of the brackets attached to the duct by hardware members, welding or otherwise.

Referring to FIG. 4, duct sections 20a and 20b can be interconnected by various slip joint-type connectors. One such connector is shown in FIG. 5 which is a partial cross-section of FIG. 4. In FIG. 5, the connector 42 is generally formed in a "C" shape. The adjacent ends of the duct sections 20a and 20b are turned over on itself to form lip sections 43 to engage with the connector 42. As can be appreciated, a fair amount of effort is required to install the connector 42 in the field since the connector must be slipped over the lips 43. Moreover, corner pieces 44 are required at the corner of the duct sections since the connectors 42 cannot fully close off the corners of the adjacent duct sections, rather connectors 42 stop about a couple of inches short of the corners of the duct sections.

A further slip joint-type connector 45 is shown in FIG. 6, which figure is a cross-sectional view similar to FIG. 5. Connector 45 is generally S-shaped and requires that the adjacent ends of the duct sections 20a' and 20b' overlap somewhat. As in connector 42, the S-shape connector 45 is formed in straight lengths and positioned along each side of the ducting. As will be appreciated, this type of connection also does not close off the corners of the duct section 20a' and 20b'. As such, separate corner pieces corresponding to corner pieces 44 are required to be used in connection with connector 45.

A further slip type connector 46 is shown in FIG. 7. Connector 46 is of a generally S-type connector similar to connector 45, but with a transverse section 47 which is said to increase the stiffness of the connector. The transverse section is formed by bending the connector material over on itself. As in connector 45, the connector 46 can only be used within about two inches of the corner of the duct. As such, separate corner pieces, not shown, are also required with connector 46. Also as with connector 45, installing the connector 46 in the field is not always easy since the connector must engage overlapping sections of the duct and then a fastener must be extended through the overlapped sections of the duct as well as through the connector 46 itself. This requires screws or other hardware members passing through at least five layers of material.

It can be appreciated that the prior art ducting structure shown in FIGS. 1-7 is time consuming and expensive not only to fabricate, but also to assemble and install in the field. The present invention is directed to more economical and faster methods for manufacturing, assembling and installing HVAC ducting of a rectangular or square cross-section.

It is also known to form relatively small size square and rectangular ducts from steel galvanized spiral round ducting or aluminum flexible round ducting. Such ducting is typically in the size of 3-inch×10-inch or 4-inch×12-inch, used primarily for concrete encased toilet and kitchen exhaust ducting. Such ducting is first formed in round cross-section and then stretched to a rectangular shape using sharp, square corner dies having a corner radius of ⅛ inch or less. Such dies perform adequately for relatively small sized ducting where the material is able to flow around the sharp corners of the die. A significant friction resistance occurs between the die corners and the ducting material, but in the relatively small sizes, having from 3 inches to 4 inches along a minor side of ducting, such friction force is typically not so excessive that the ducting material tends to adhere or stick to the corner of the die or the material tends to split at the corner due to the high friction-caused tension existing between the die corner and the ducting material. However, for larger size ducting, for example, having a minor width of 6 inches or more, the friction between the sharp corner of the die and the ducting material becomes excessive, causing the ducting material to seek to "adhere" to the die corner, which can cause the material to excessively stretch and thereby split or otherwise fail during the attempt to reconfigure the round cross-section into a rectilinear cross-section. Also, the large friction load on the die often causes the die to twist or otherwise deform due to the ducting material "catching" on the corners of the die.

SUMMARY

A ducting structure of a relatively large, square or rectangular cross-section is formed from lengthy variable length helical round duct sections that are transformed into square or rectangular cross-sections by an expansion apparatus composed die structures of structures that press against the interior of the round cross-sectional duct to force the duct to assume a desired square or rectangular cross-sectional shape.

The square or rectangular cross-sectional duct sections are inner-connected by formed flanged connectors that may be of numerous possible profiles. Each of the flanged connectors may include an insertion section that engages into, or over, the adjacent end portion of the duct section, and a mating flange extending substantially perpendicularly to the insertion section to form a mating surface for face-to-face engagement with the flanged connector of the adjacent duct section. Preferably, but optionally, a reinforcing section is disposed at the outer perimeter portion of the mating flange. The reinforcing section may be of numerous configurations, and may include a hem section that extends outwardly from the mating flange and also optionally a return section to enhance the structural integrity and stiffness of the reinforcing section.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 52-61 illustrate alternative embodiments of flanged connectors constructed in accordance with the present disclosure;

FIGS. 62-71 illustrate additional flanged connector profiles constructed in accordance with the present disclosure;

FIGS. 72-80 illustrate still further embodiments of flange connector profiles constructed in accordance with the present disclosure;

FIG. 88 illustrates a die assembly in open position prior to forming a corner of the slip joint, FIG. 89 illustrates the die in closed position with a corner being formed, FIG. 90 is an isometric view of FIG. 89, and FIG. 91 is a plan view showing the die in open position after a corner has been formed in the slip joint;

FIG. 94 showing the band being further formed to define a circumferential bead separating the slip joint into first and second sections that engage within the interior ends of adjacent rectilinear ducts to be joined;

DETAILED DESCRIPTION

Figure 11:
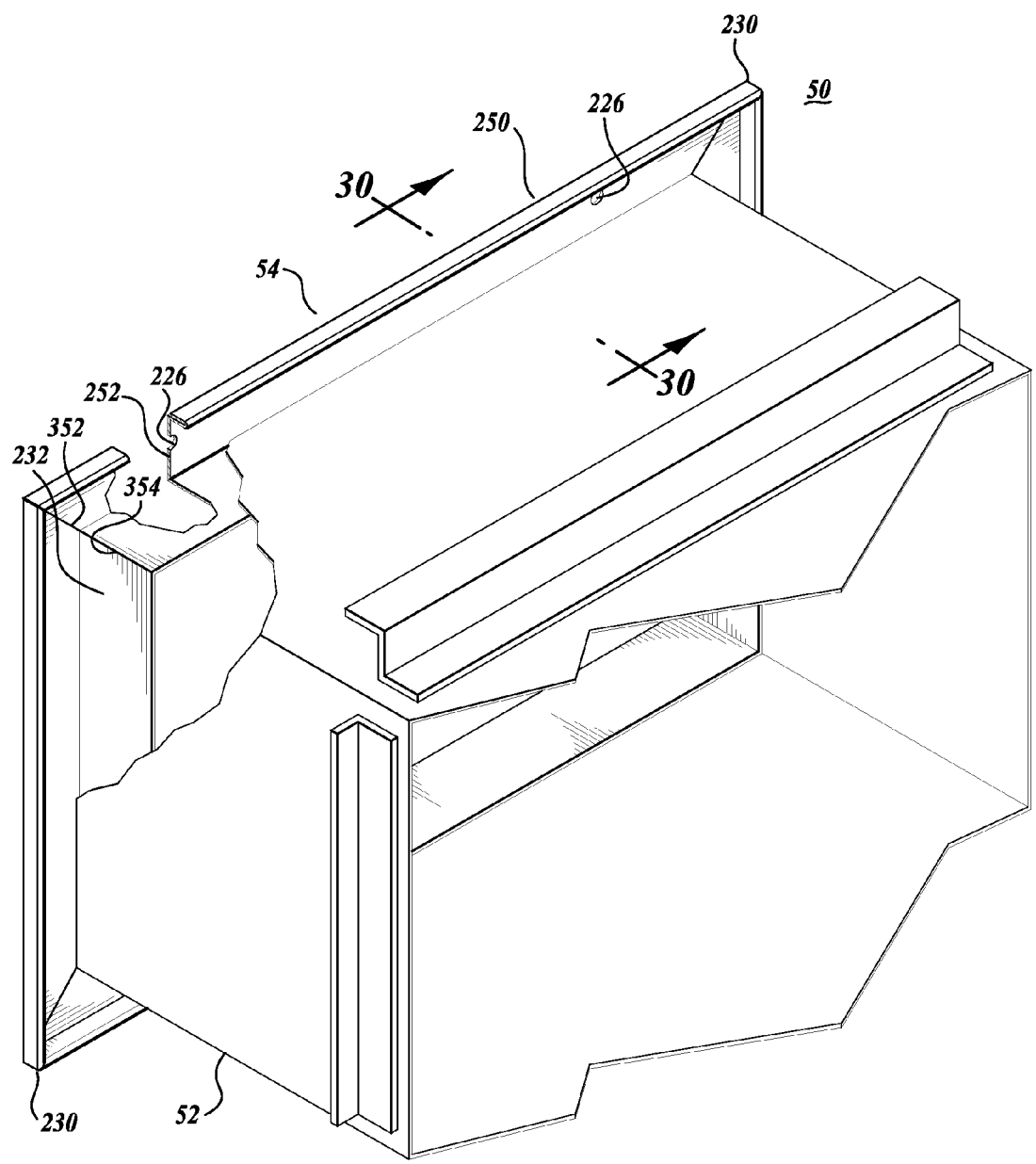
FIG. 11 is fragmentary view of an embodiment of the duct structure of the present invention illustrating a formed flanged connector ring engaged with an end portion of duct of rectangular cross-section, with portions broken away for clarity.

FIG. 11 illustrates a HVAC duct structure 50 constructed in accordance with the present invention. The structure 50 includes a length of rectangular ducting 52 constructed in accordance with the present invention and a formed flanged connector ring 54 also constructed in accordance with the present invention and illustrated as affixed to the adjacent end of the ducting.

Figure 1:
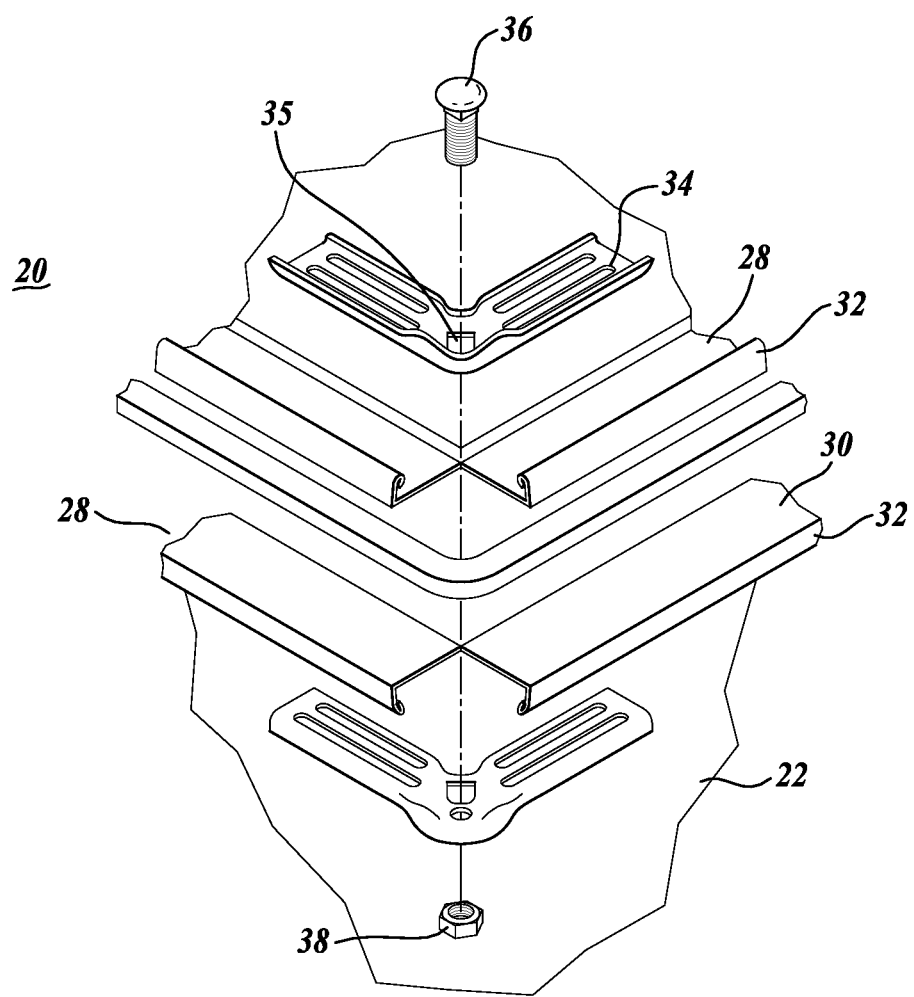
FIG. 1 is a fragmentary view of the corner portions of a prior art ducting structure.
Figure 2:
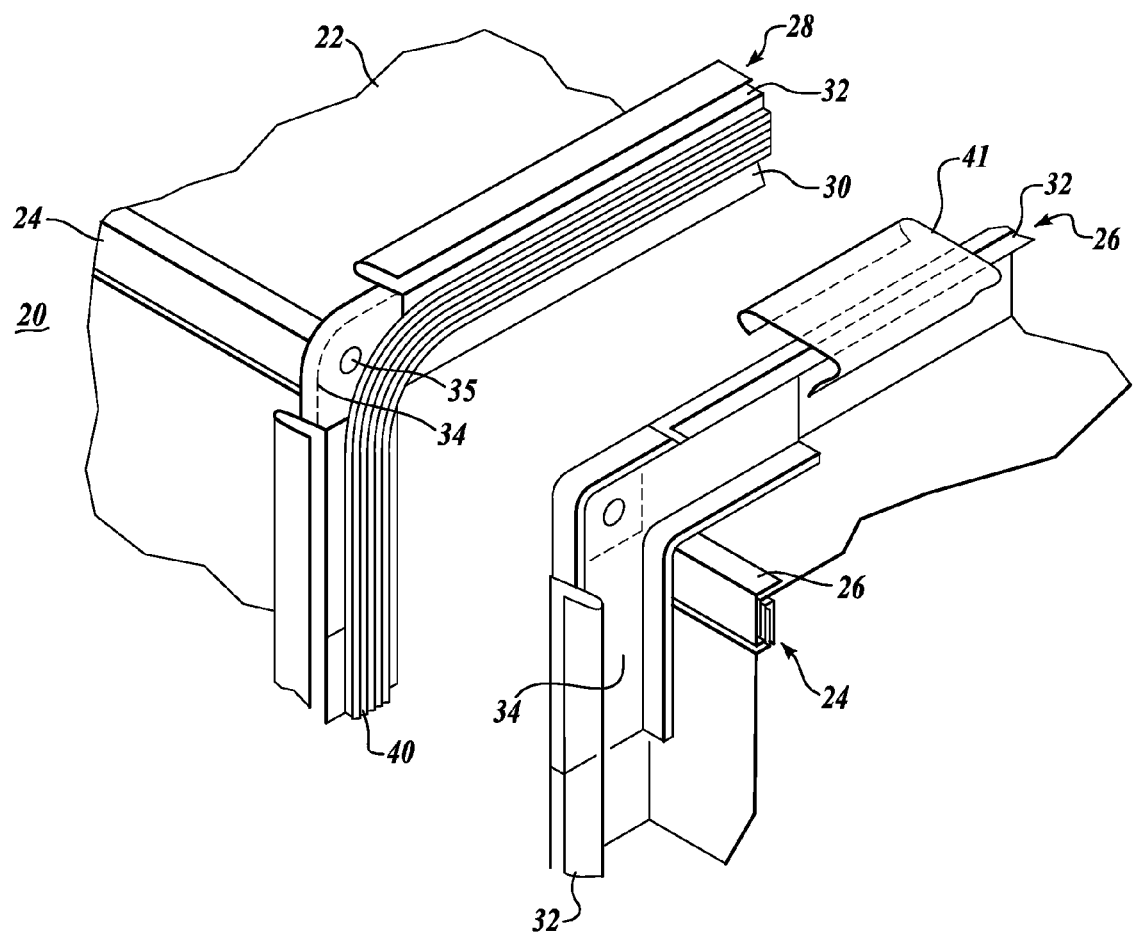
FIG. 2 is another fragmentary view of prior art ducting structure.
Figure 3:
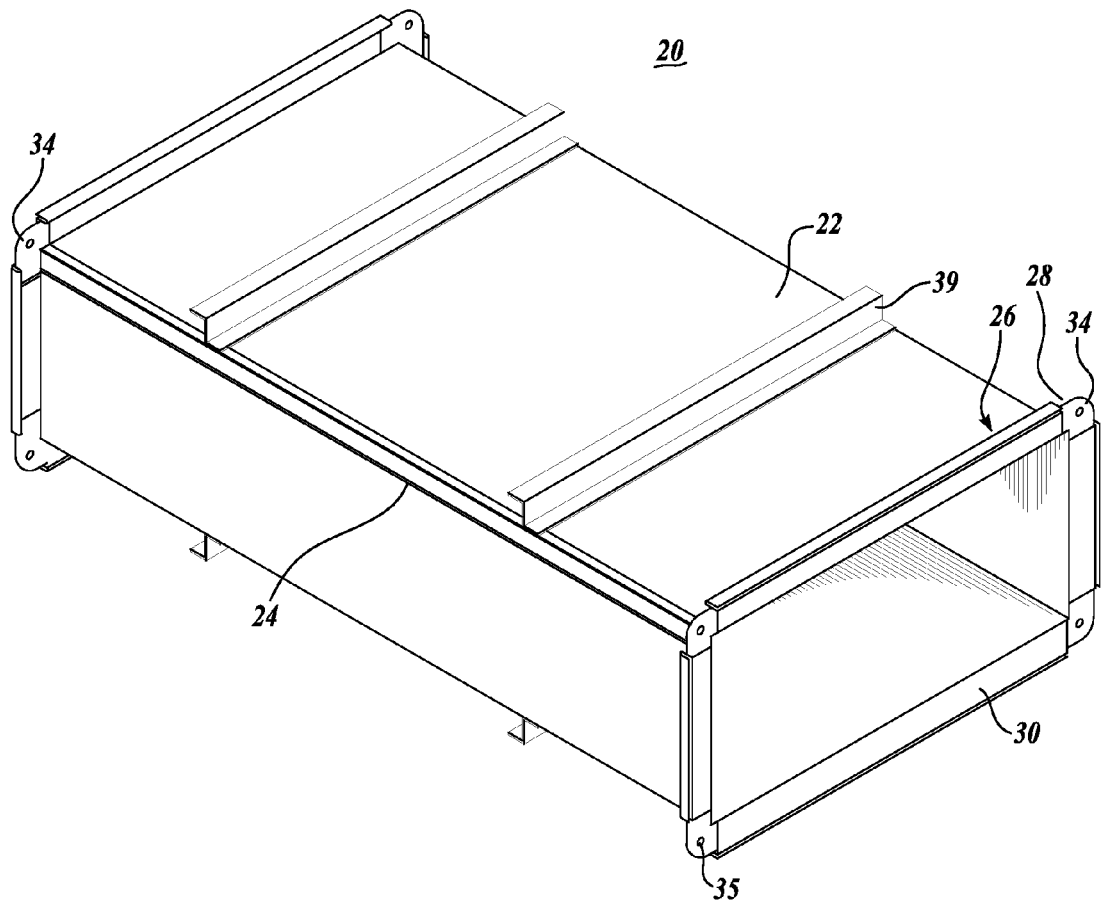
FIG. 3 is a pictorial view of a prior art ducting structure corresponding to FIGS. 1 and 2.
Figure 4:
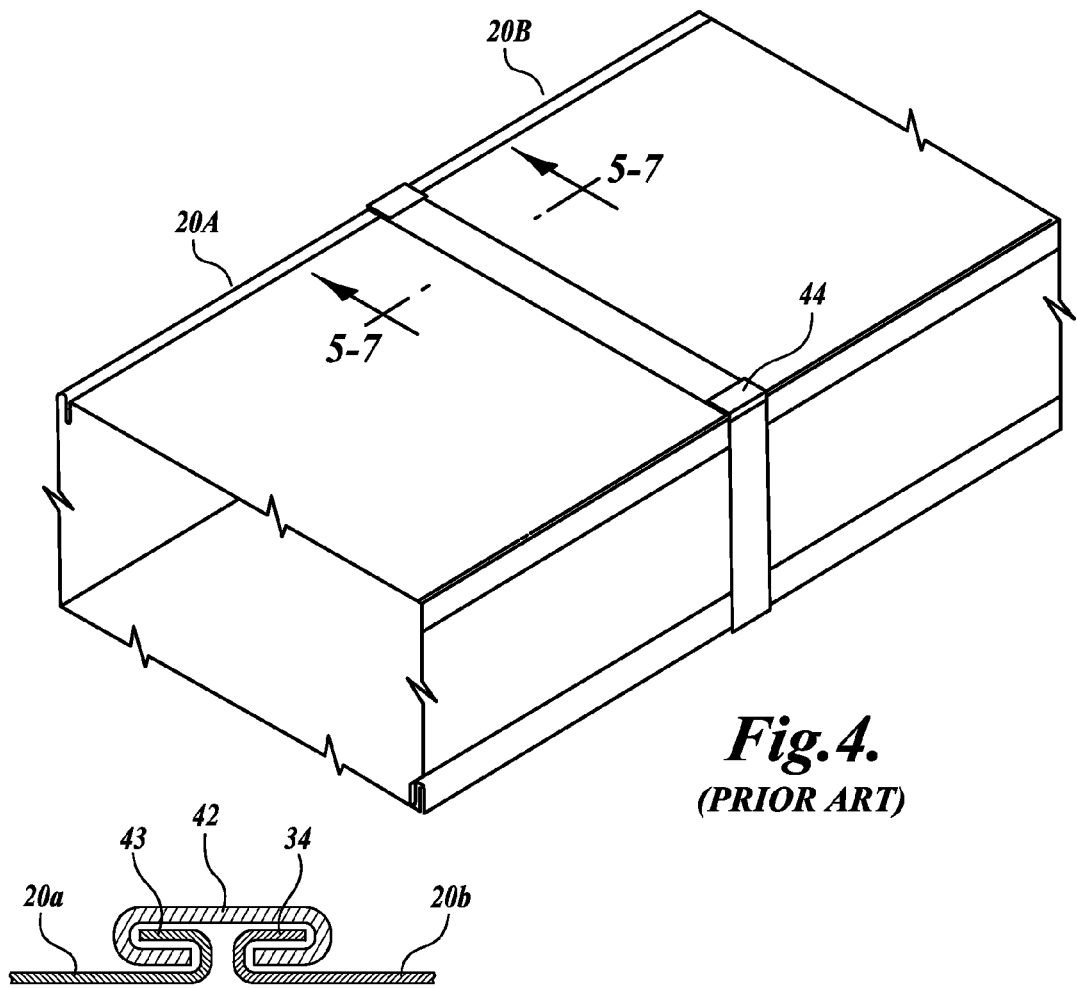
FIG. 4 is a pictorial view of a prior art duct structure wherein duct sections are interconnected by a slip joint.
Figure 5:
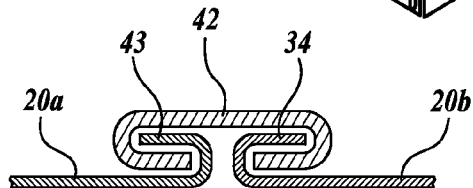
FIG. 5 is a partial cross-sectional view of FIG. 4 taken substantially along lines 3b-3b thereof.
Figure 6:
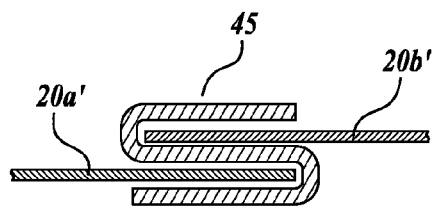
FIG. 6 is a view similar to 5, but illustrating use of the "S" type slip connector.
Figure 7:
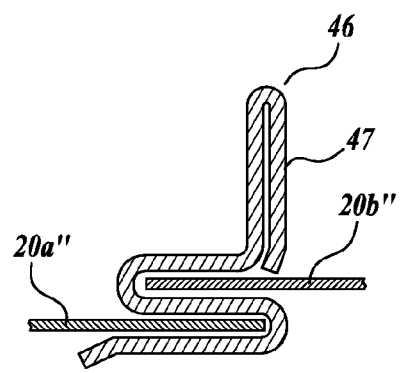
FIG. 7 is a view similar to view 6 illustrating a reinforced S type connector of the prior art.
Figure 8:
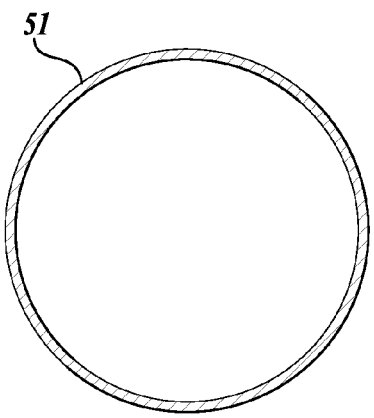
FIG. 8 is a cross-sectional view of a round preformed duct.
Figure 9:
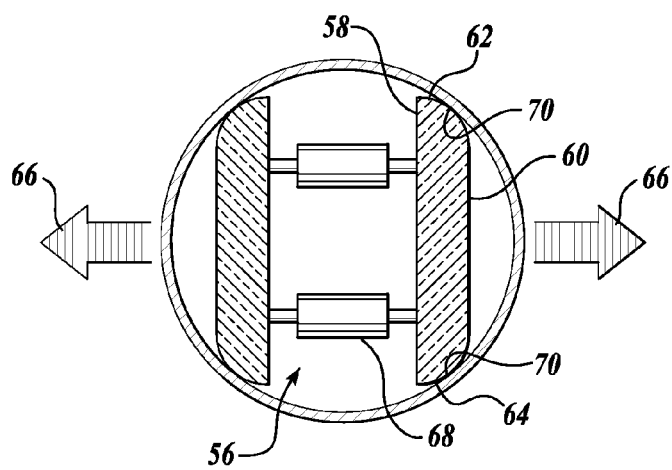
FIG. 9 is a cross-sectional view of the round cross-sectional duct engaged over an expansion apparatus.
Figure 10:
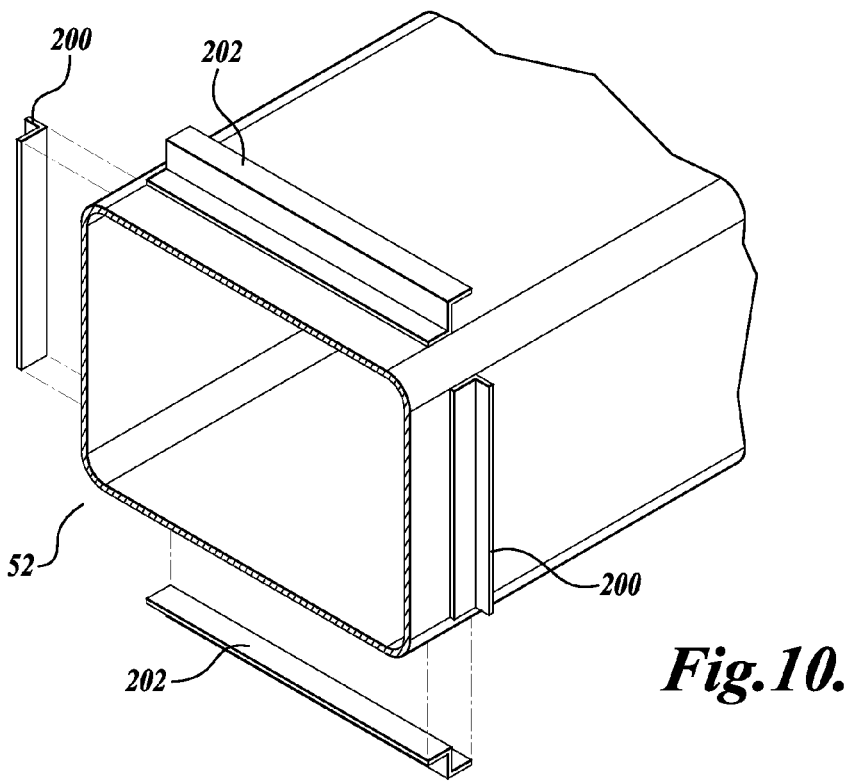
FIG. 10 is a cross-sectional view of a duct section after being transformed by the expansion apparatus of FIG. 9 from a round cross-section.

Next, referring to FIGS. 8-10, one method of manufacturing the duct 52 is illustrated. In accordance with the present invention, round cross-sectional ducting 51 is first prefabricated. Preferably, the preformed duct 51 is in the form of a spiral-seam tube composed of a helically wound sheet metal strip, with the strip edges interconnected to each other by formed lock seams. This is a standard, well-known method of manufacturing round ducting from a continuous sheet metal strip. In this regard, see for example, U.S. Pat. Nos. 3,263,321 and 3,474,514, which are incorporated herein by reference.

The round, preformed ducting 51 can be placed over an expansion apparatus 56 which extends lengthwise within the interior of the round duct. The apparatus 56 includes a pair of spaced apart die structures 58, each having an outwardly directed, substantially flat face 60 and upper and lower edge sections 62 and 64 extending transversely from the face. The die structures 58 may be pushed apart from each other by linear actuators 68 so that the outward faces 60 thereof move in the direction of the arrows 66 shown in FIG. 9 while maintaining a parallel relationship to each other. As the die structures move outwardly, they cause the round duct 51 to press against the outward faces 60 and also to press against the upper and lower die edges 62 and 64, thereby to transform the round duct 51 into a rectangular cross-section duct 52, shown in FIG. 10. Thereafter, the linear actuators 68 may be activated to retract the die structures 58 to their initial position shown in FIG. 9 so that the formed duct 52 can be removed.

The linear actuators 68 may be of various types and configurations, including, for example, hydraulic cylinders or pneumatic cylinders, or maybe of other types of actuators, such as scissors links or sliding cams. Moreover, guideways or guide structures may be employed to assist in maintaining the die outward faces 60 parallel to each other, especially when being extended outwardly in the direction of arrows 66. Also, the die structures can be of other constructions, for example, a substantially flat face backed by a reinforced framework that provides substantial strength but is not of solid construction, thereby reducing the weight of the die structures.

As shown in FIGS. 9 and 10, the die structures 58 have rounded corners 70. The rounded corners provide efficient airflow through the duct while enabling relatively large size ducts to square/rectangular ducts to be formed. Without the rounded corners 70, it is difficult to form large size ducts over about eight inches across from thin gauge spiral ducting with a thickness in the range of from 10 gauge to 30 gauge. Rounded corners of about ⅛ to 2 inch or larger radius allow ducts of up to 100 inches across to be formed utilizing the present invention.

Rounding the corners 70 of the die structures 58 allows the nominally round ducting material 51 to flow or move as the die structure 56 is expanded and the ducting stretched to rectangular shape as shown in FIG. 10. If the die corner 70 is too sharp, high friction resistance will be generated between the corner 70 and the inside surface of the duct 51 which tends to cause the ducting material to "stick" to the corner 70. This can result in the ducting material splitting, cracking, or otherwise failing at the corner being formed. Also, the "sticking" of the ducting material to the corner 70 can cause the die structures to twist or otherwise deform. It is only necessary to stretch the ducting material 51 about 1% beyond its original configuration to permanently "set in" the rectilinear form shown in FIG. 10. Stretching beyond such 1% could weaken the ducting, which could lead to failure thereof by splitting, cracking, fatiguing, or otherwise.

Moreover, forming the ducting 51 with round corners results in a relatively strong and stiff construction, in comparison to if the corners were formed in sharp form in the manner shown in FIGS. 1-4. The rounded corners provide a stiff interconnection of adjacent panels of the rectilinear ducting so that forces tending to cause one panel of the ducting to move inwardly or outwardly (typically, the wider panel) are transferred through the rounded corners to the side panels of the ducting, which typically would be the narrower panels, the stiffer narrow panels help restrain the wider panels from moving inwardly or outwardly. The substantial rigidity of the rounded corners of the ducting enables the transfer of the forces between the wider panels and the narrower panels of the ducting.

However, if the ducting is made with sharp corners, there is very little rigidity in the corners per se; rather, the corners form a relatively flexible interconnection between the adjacent panels, perhaps approximating a hinge connection between the two panels forming the corner. Thus, the narrower panels of the duct are not able to counter the forces placed on the wider panels of the ducting by the air pressure within the ducting. This is detrimental in that industry standards limit the amount that HVAC ducting can deflect during use. Excessive deflecting of the panels can cause fatigue or other type of failure of the ducting. Also, such deflection can cause the longitudinal seams extending along the joint to lose their seal, resulting in air leakage.

It will be appreciated that expansion apparatus 56 can be utilized to form a square cross-sectional shapes and/or rectangular cross-sectional shapes of various sizes depending on the extent to which the die structure 58 are expanded. Also, round preform ducting which is longer than the length of the die structure 58 may be formed by first transforming one end of the round ducting 51 and then removing the partially formed ducting from the expansion apparatus and inserting it over the die structure 58 in a reverse direction, to transform the opposite end of the ducting 51 into the desired cross-section.

Figure 12A:
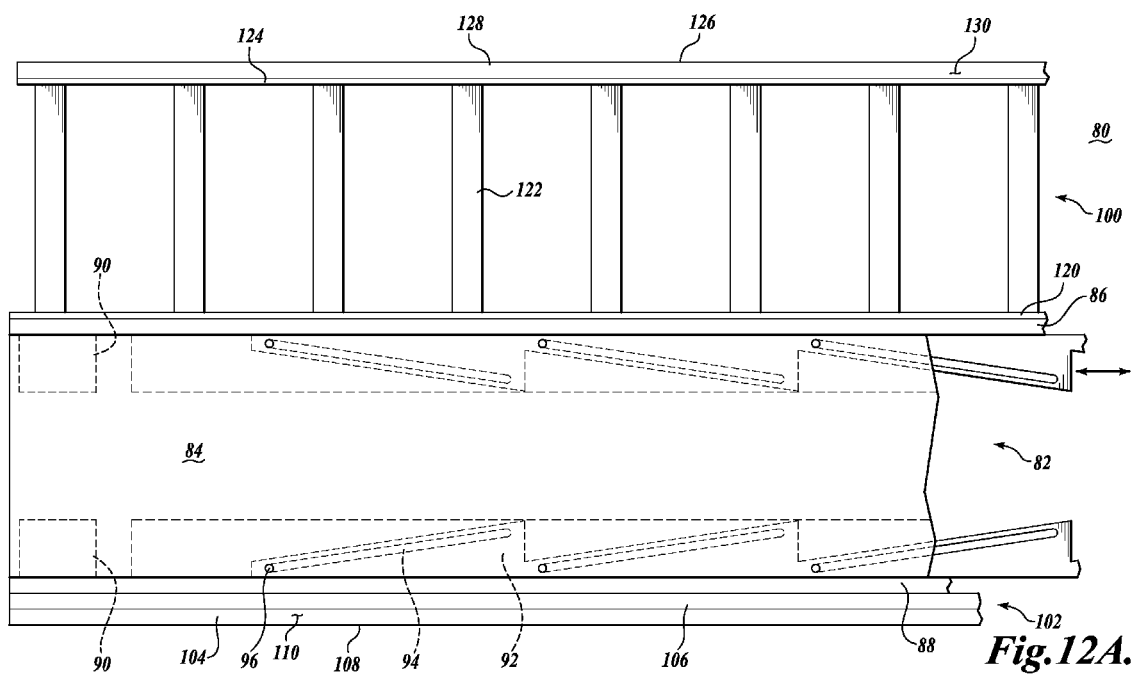
FIG. 12A is a further embodiment of an expansion apparatus shown in side elevational view.
Figure 12B:
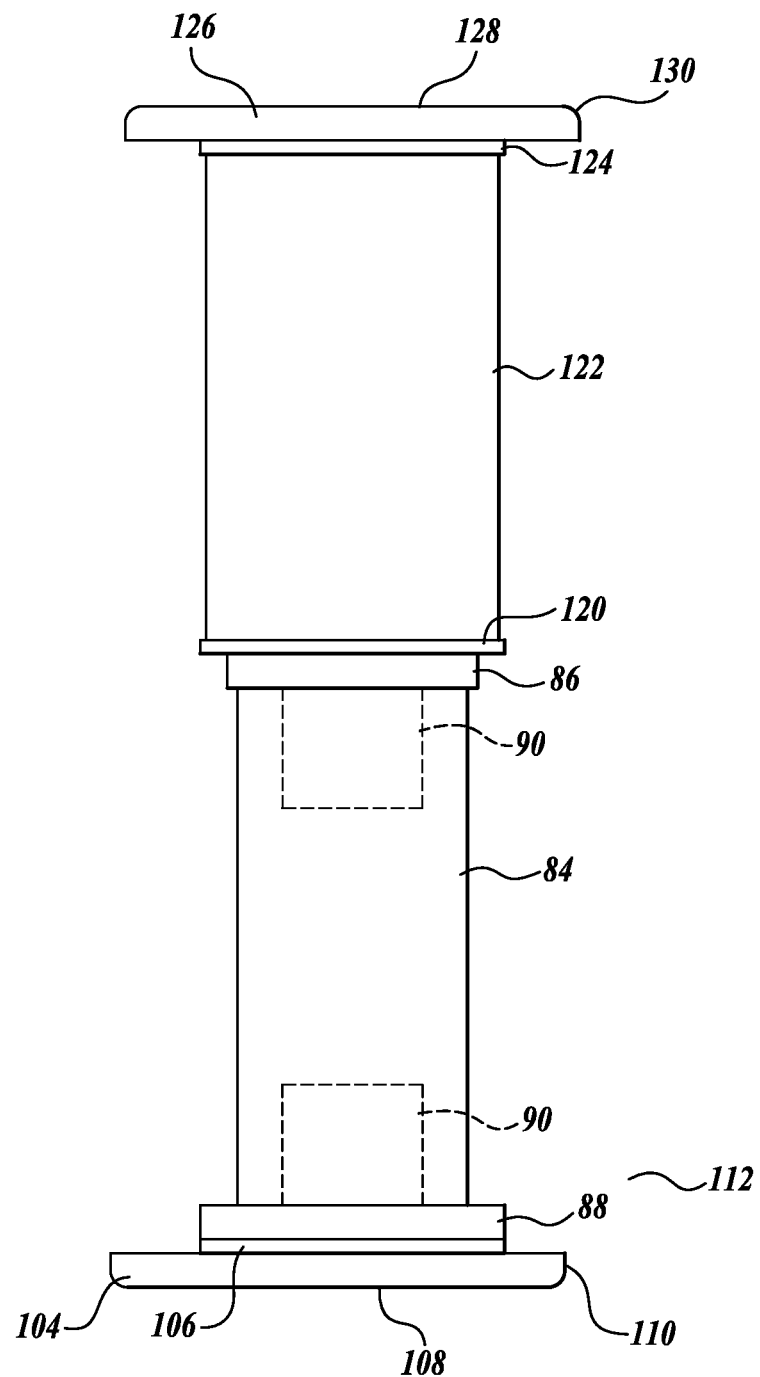
FIG. 12B is an end view of FIG. 12A.
Figure 13:
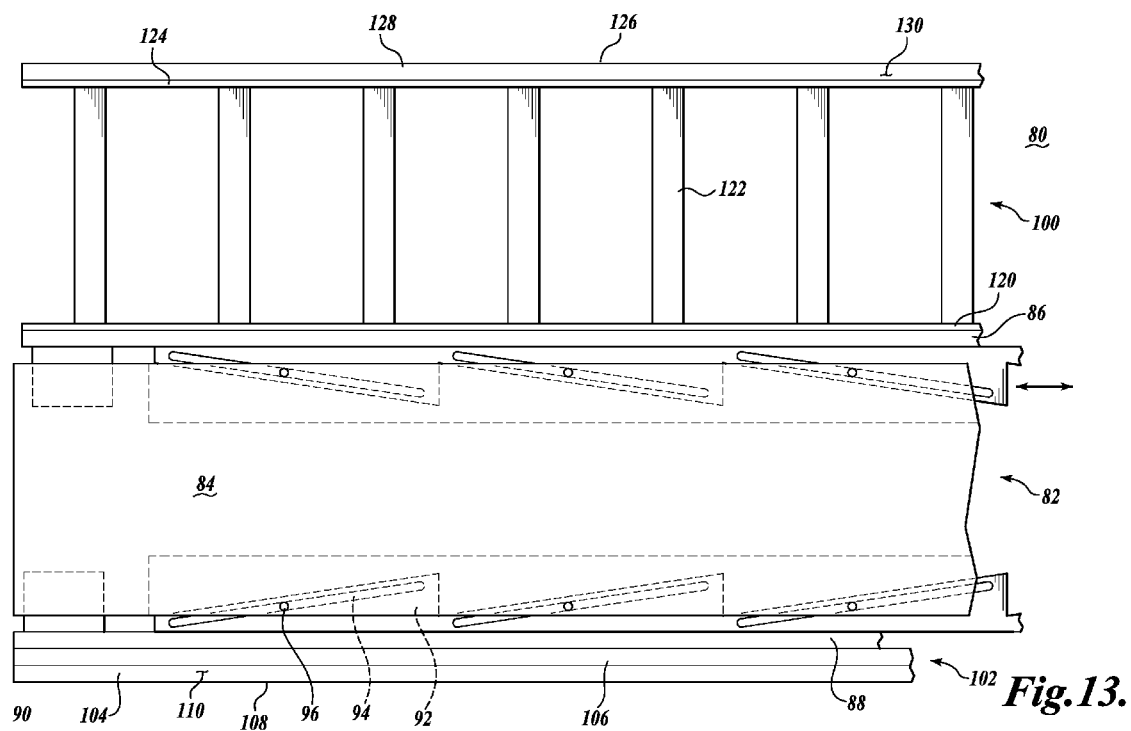
FIG. 13 is a view of the expansion apparatus of FIG. 12A shown in partially expanded condition.
Figure 14:
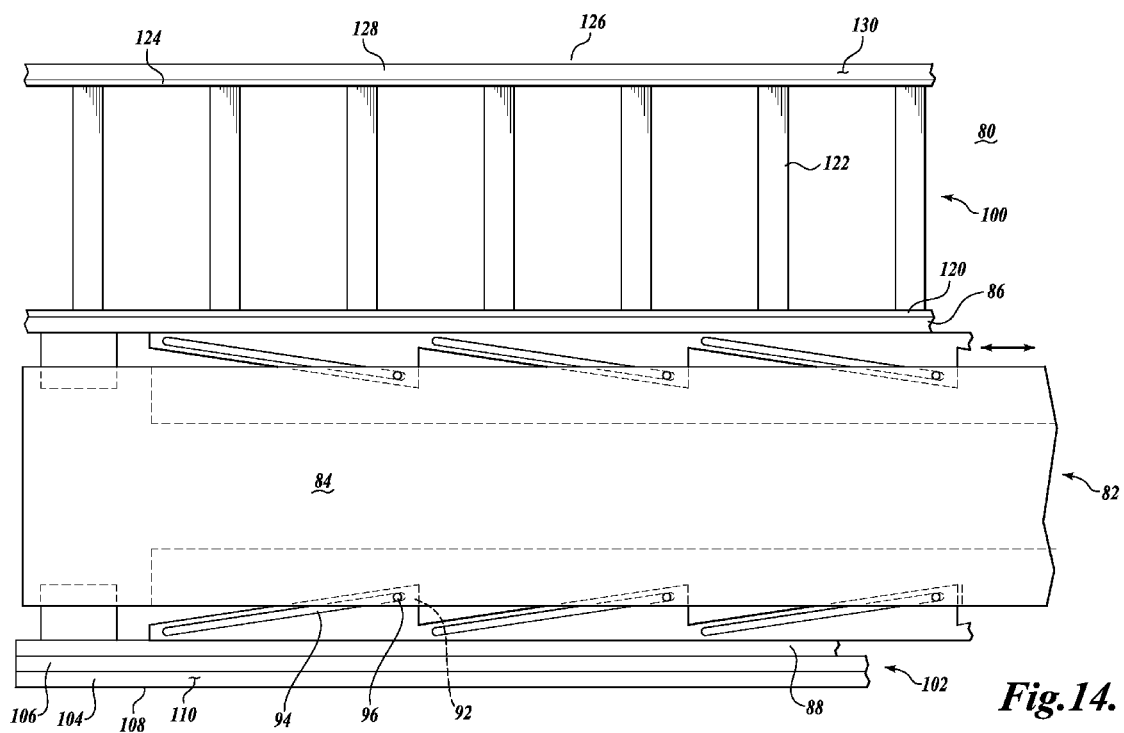
FIG. 14 is a further view of the expansion apparatus shown in FIG. 12A shown in further expanded condition.

Another expansion apparatus 80 is illustrated in FIGS. 12-14. Such expansion apparatus includes an elongate actuator assembly 82 shown in FIGS. 12A and B as generally rectangular in cross-section. The actuator assembly includes a core section 84 for supporting an upper movable plate 86 and a lower movable plate 88 which are operable to in unison move in opposite directions away from and towards the core. One or more guide blocks 90 extend between the adjacent side of upper and lower movable plates 86 and 88 and into the interior of the core 84 which defines a close fitting guideway extending transversely to the length of the core for guiding and receiving the guide blocks 90. As would be appreciated, the guide blocks 90 retain the upper and lower movable plates 86 and 88 in fixed relationship to the core 84 while allowing the plates 86 and 88 to move away from and towards the core. A series of ramps 92 also extends between the adjacent surface or side of the movable plates 86 and 88 and the interior of the core. The ramps include slots 94 that engage with rollers 96 disposed within the core to cause the plates 86 and 88 to move in a uniform manner along their entire lengths towards and away from the core. The moving plates 86 and 88 can be actuated by numerous methods, such as moving sections of the core section 84 relative to each other, thereby causing movable plates 86 and 88 and associated ramps 92 to move laterally and relatively away from each other. Alternatively, linear actuators can be used.

The expansion apparatus 80 includes an upper expansion die 100 and a lower expansion die 102 which are mounted on upper and lower movable plates 86 and 88, respectively. Referring initially to the lower die 102, this die consists of a die plate 104 that is detachably bolted or otherwise mounted to lower movable plate 88. A spacer plate 106 is sandwiched between the die plate 104 and the movable plate 88. The lower spacer 106 may be of substantially the same width as lower movable plate 88; however, the lower die plate 104 is substantially wider than the width of the lower movable plate 88 or its corresponding spacer 106. The width of the lower die plate 104 corresponds to the minor width of the rectangular-shaped ducting that is formed using the expansion apparatus 80.

As shown in FIGS. 12-14, the lower die plate 104 has a lower face 108 that presses against the ducting being formed, not shown. Further, the corner defined by the die face 108 and the adjacent edge portion 110 of the die is rounded, arcuate or otherwise "relieved," rather than being sharp. This is important for the metallic material of the circular preformed ducting to properly deform without being unduly stretched or stressed when expansion apparatus 80 is used to form rectangular ducting from a round starting material, which could occur if the die corner is too sharp. The radius size of the corner can vary, for example, depending on the overall size of the square or rectangular ducting being manufactured, as discussed above. Such radius can be in the range of ⅛ to 2 inches, and larger, and more particularly in a range of ¼ to 1 inch. However, other radius sizes can be utilized with the radius size depending in part on the minor and/or major widths of the formed rectilinear ducting.

Figure 16:
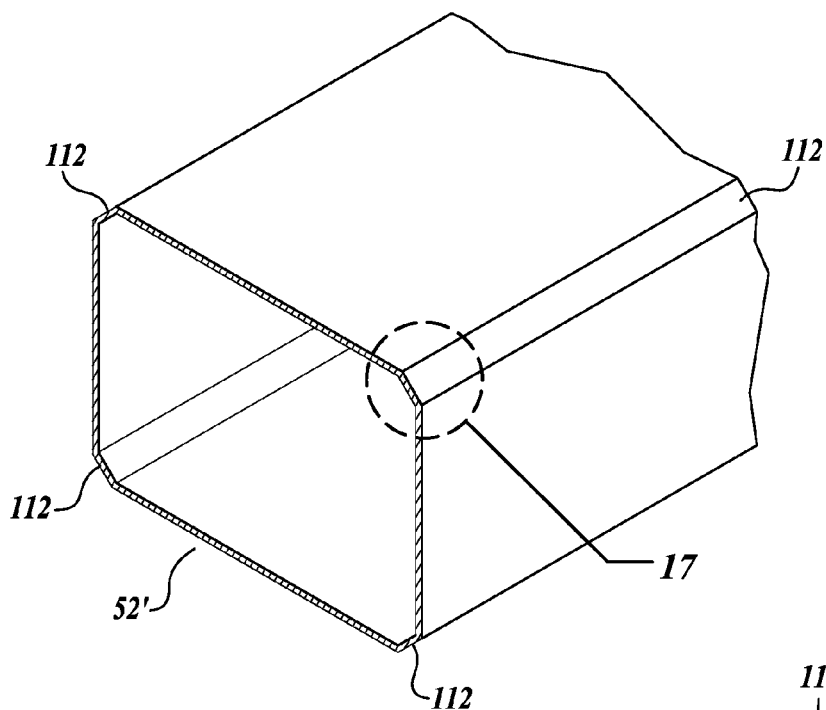
FIG. 16 is a cross-sectional view of a duct section after being transformed by the expansion apparatus of FIG. 15 from round cross-section to rectangular cross-section and with chamfered corners.
Figure 17:
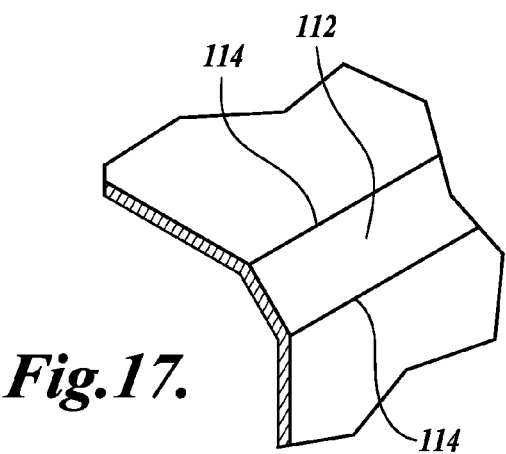
FIG. 17 is an enlarged fragmentary view of the duct section showing that the ends of the chamfers are rounded or radiused.

Moreover, rather than utilizing a radius defining a circle segment, the corner may be instead chamfered with the chamfer itself being radiused or rounded so that its intersection with the face 108 and edge 110 do not define a sharp edge. In this regard, see FIGS. 15-17. These figures correspond to FIGS. 9 and 10, so like components are given the same part number, but with a prime (') designation. In FIGS. 16 and 17, the ducting 52' is shown as having chamfered corners 112 with the chamfers being rounded or radiused at 114 where the chamfers intersect the major and minor sides of the duct 52'.

The upper die 100 is actually a die structure composed of a lower attachment plate 120 which is bolted or otherwise detachably attached to upper movable plate 86. The die structure 100 includes a plurality of space columns 122 spaced apart along the length of the die structure and extending transversely away from the lower attachment plate 120 to intersect with an attachment upper plate 124 which may be similar in size and shape as the lower attachment plate 120. An upper die plate 126 is connected in face-to-face relationship to the upper attachment plate 124. The upper die plate 126 may be of the same size and shape as the lower die plate 104 when the apparatus 100 is being used to form square or rectangular ducting. However, the die plates 126 and 104 may be of different, relative widths if it is desired to form the ducting in a trapezoidal cross-section or other cross-sectional shape that is not a right rectangle or a square. As in lower die plate 104, the upper die plate 126 also is formed with rounded corners between the upper face 128 of the die plate and the edges 130 of the die plate.

In operation, a length of preformed, helically wound ducting is placed over the expansion apparatus 80 and then the expansion apparatus is operated to cause the lower die 102 and upper die structure 100 to extend away from core 84 so that the outward surfaces or faces of the die plates 104 and 126 push against the interior wall of the preformed ducting, thereby causing the ducting to assume a rectangular shape having a minor width corresponding to the widths of the die plates 104 and 126 and a major width corresponding to the distance separating the two die plates. Once the rectangular ducting has been formed, the lower die 102 and upper die structure 100 are retracted, thereby enabling the formed ducting to be removed from the apparatus 80.

It will be appreciated that the columns 122 are constructed with sufficient structural strength and integrity to cause the upper die plate 126 to retain its shape and not twist, crack, or otherwise deform during use of the apparatus 80. The columns 122 may consist of rectangular plates or tubes or other structural elements. Also, cross or diagonal braces, not shown, may be utilized between adjacent columns 122.

As a further matter, the apparatus 80 can be constructed with two die structures similar to the upper die structure 100 shown in FIGS. 12-14. Such die structures can be of the same or different sizes (die plates of different widths and/or columns with different lengths) so that different combinations of such die structures can be utilized to form rectangular/square ducting of different sizes.

Moreover, it will be appreciated that the widths of the die plates 104 and 126 may be changed when desiring to produce rectangular ducting of different cross-sectional sizes than shown in the figures. The die plates 104 and 126 may be conveniently removed from corresponding spacer 106 or upper plate 124 for replacement of the die plates.

In addition, two expansion units similar to apparatus 80 could be utilized to form rectangular or square spiral ducting in accordance with the present invention. For example, the two units can be placed side by side and spacer units used to interconnect the upper and lower dye plates, similar to die plates 104 and 126. In this regard, see FIG. 18. As shown in this figure, the apparatus 140 includes two expansion units 142 and 144 which may be similar in construction to apparatus 80 described above. The expansion units include upper and lower movable die plates 146 and 148 which may be similar to corresponding die plates 126 and 104, described above. Spacer sections or units 150 span between the upper die plates 146 and spacer units 152 span between the lower die plates 148. The expansion units 142 and 144 may be operated in unison so that the upper die plates 146 and corresponding spacers 150 and lower die plates 148 and corresponding spacers 152 move oppositely away from each other when actuated.

Figure 18:
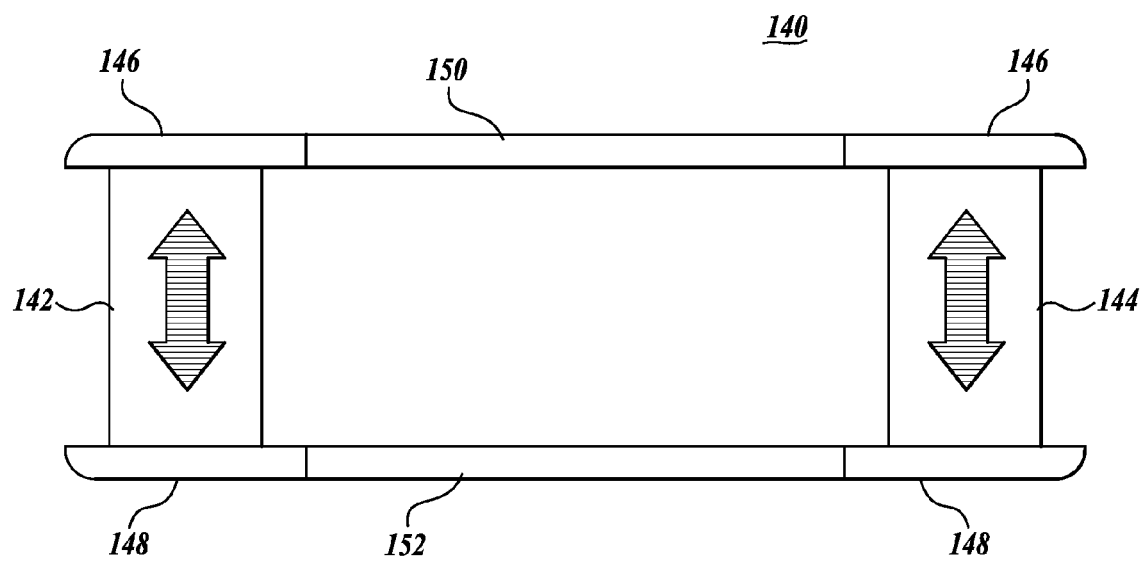
FIG. 18 is a schematic view of an embodiment of the present disclosure utilizing two expansion units in tandem to form spiral ducting in a rectilinear profile.

It will be appreciated that the apparatus shown in FIG. 18 can be used to press against the major sides of the rectangular ducting to be formed or the minor sides of the rectangular ducting to be formed. By the construction shown in FIG. 18, rectangular or square spiral ducting of many various sizes can be produced efficiently and economically. Typically, in an expansion apparatus similar to apparatus 80 described above, the maximum width of the minor side of square/rectangular ducting is approximately 36 inches wide due to structural limitations of the apparatus and operational limitations of the apparatus. However, it will be appreciated that with the apparatus shown in FIG. 18, the rectangular/square spiral ducting that may be formed is not limited in the manner of size of a single expansion apparatus.

For a square or lower aspect ratio ducting (up to about 1:2), it is typically possible to manufacture such ducting from round, helically wound starting stock using a singular expansion apparatus, for example, similar to those shown in FIGS. 9, 12-15, and 18. However, with a higher aspect ratio, such as 1:3 or 1:4, rectangular ducting typically an expansion apparatus as shown in the above-noted figures does not have sufficient "travel" to form the ducting in the desired shape. In such case, it may be necessary to preform the ducting before utilizing an expansion apparatus. Of course, it would be possible to utilize two expansion apparatuses in series to arrive at a desired cross-sectional shape. However, this would "tie up" a significant amount of manufacturing machinery in order to produce the rectangular ducting.

Figure 19:
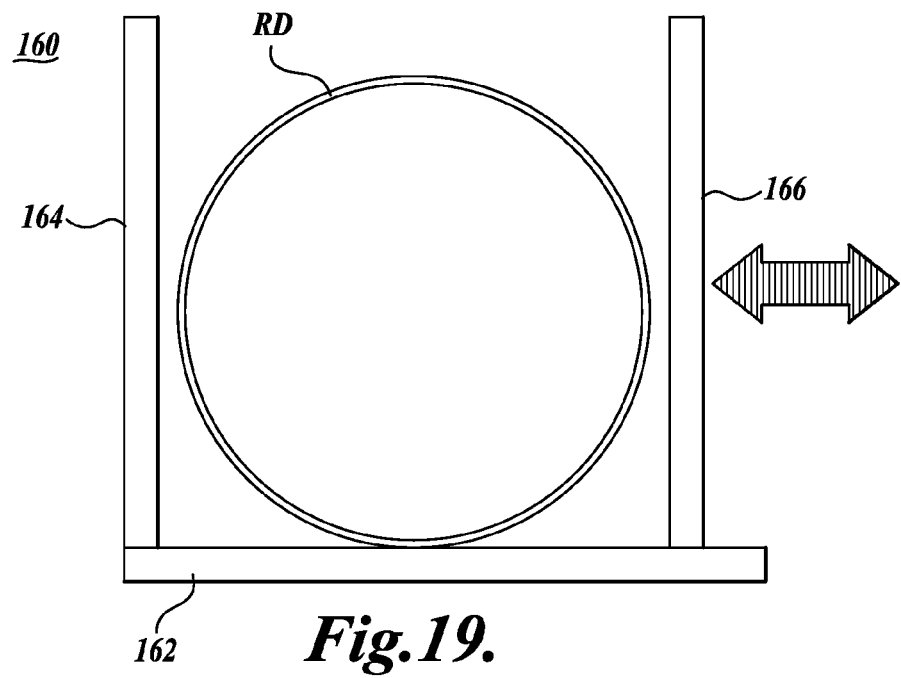
FIG. 19 is a schematic view of an apparatus for performing the round helically wound ducting RD.

To avoid the foregoing situation, applicant has conceived of performing the round, helically wound ducting RD using a relatively simpler, cost-effective apparatus 160 shown in FIG. 19. The apparatus includes a longitudinal base 162, an upright side wall 164, and a movable opposite side wall 166. The movable side wall can be designed to move towards and away wall 164 utilizing numerous types of actuators including hydraulic rams, screw jacks, etc. The length of helically wound, round ducting RD is placed in the apparatus 160 between the walls 164 and 166, and the wall 166 is then moved towards wall 164 so that the round ducting RD takes a permanent set, for example, in a generally ovoid shape. Thus, the preformed ducting RD can then be engaged over an expansion apparatus, for example, apparatus 80, which can then be used to achieve the desired final end cross-sectional shape of the ducting.

Figure 20:
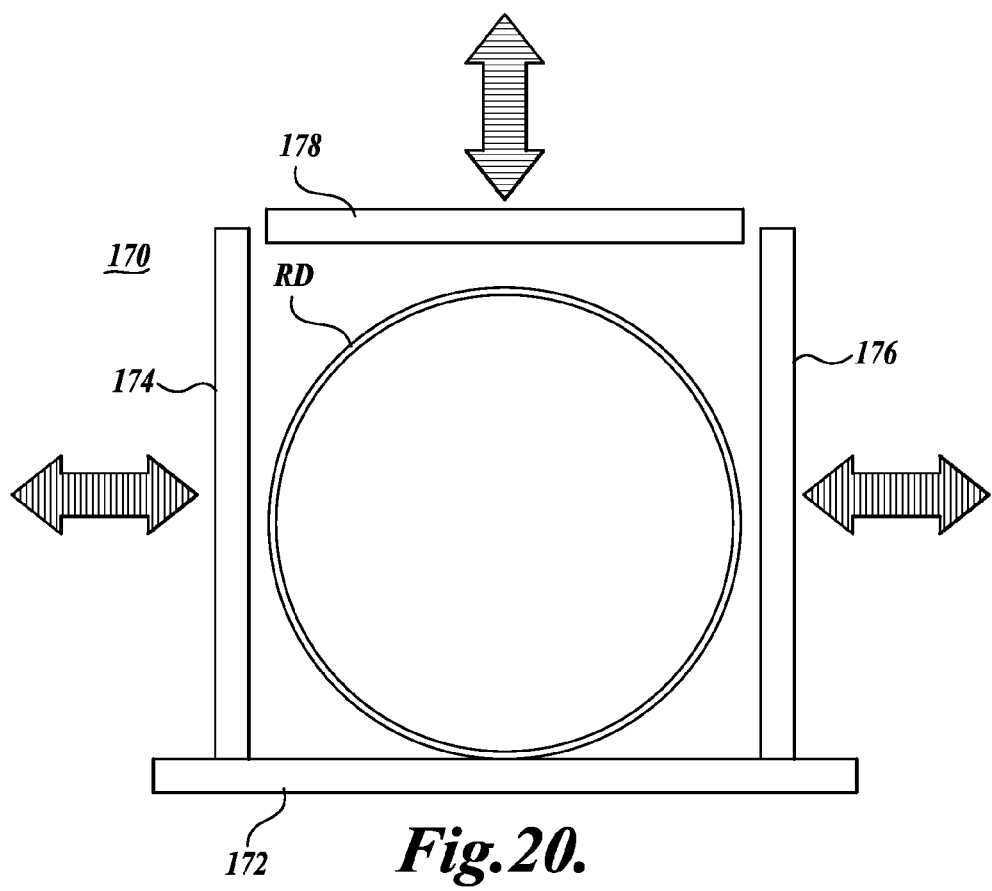
FIG. 20 is a schematic view of a further apparatus for performing the round helically wound ducting RD.

As an alternative, the round ducting RD may be preformed in an apparatus 170 shown in FIG. 20. This apparatus includes elongate base 172 and elongate, transverse side walls 174 and 176, one or both which may be movable towards and away from each other while maintaining a substantially perpendicular relationship to the base 172. In addition, or alternatively, the apparatus 170 may include an upper movable wall 178 that is supported to move towards and away from base 172. The upper wall 178 may be actuated to preform the round ducting RD. The side walls 174 and 176 may also be actuated simultaneously with the top wall 178 to move towards or away from the round ducting RD, as required, to achieve the desired shape of the preformed ducting.

Other configurations may be utilized in place of apparatus 160 or 170. Nonetheless, the hallmark of such apparatus is that it is simple in construction and operation to press against the exterior of the round, helical ducting so as to preform the ducting in a shape consistent with the final desired cross-sectional shape of the ducting. As a consequence, such final cross-sectional shape can be achieved by utilizing a singular expansion apparatus, for example, similar to apparatus 80.

Figure 15:
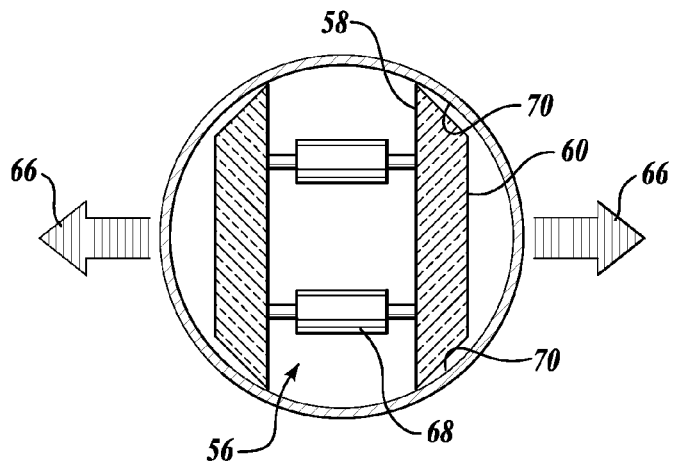
FIG. 15 is a schematic cross-sectional view of a round cross-sectional duct enlarged over an expansion apparatus having chamfered corners.

Also, as noted above, the performing of the round ducting RD can be achieved by performing the ducting by pressing outwardly against the interior of the round ducting utilizing an apparatus, perhaps similar to that shown in FIGS. 9 and 15 or other apparatus. Such other apparatus can be in the form of a fixed member insertable within the normally round spiral tubing and a movable member also insertable within the tubing. The movable member can be attached at one end to a rack or other system that is capable of moving the movable member away or toward the fixed member while maintaining the members in parallel relationship to each other. As another example, the movable member might be mounted to the carriage of a forklift. In this regard, the movable member will have significant travel capacity relative to the fixed member.

Other methods could be utilized to form duct 52/52' in addition to expansion apparatus 56/56', 80 or 140. In this regard, an expansion mandrel could be pulled through the round preformed ducting 51. Lengthwise, such expansion mandrel could be circular at a first end having a diameter somewhat smaller than the inside diameter of the preformed ducting 51. From the first end the expansion mandrel could progressively transform from a rounded to a square or rectangular shape of the desired final cross-section of ducting 52. One possible advantage of such an expansion mandrel is that it could be utilized with virtually any length of round preformed ducting 51.

The foregoing are some of the methods that can be used in accordance with the present invention for forming square and rectangular ducting from thin gauge (10 to 30 gauge), spiral-seam tubing made from helically wound strip material formed with the strip edges interconnected into lock seams. Moreover, the present method can be used to form relatively large cross-section ducting, that is, ducting having a minimum width of at least 4 to 20 inches and more typically up to well over 100 inches. Such large size rectangular/square ducting is especially advantageously made using the present invention. It will be appreciated that connecting short segments of such large size ducting made from conventional methods is expensive and time consuming, including with respect to installation at the job site.

Figure 21:
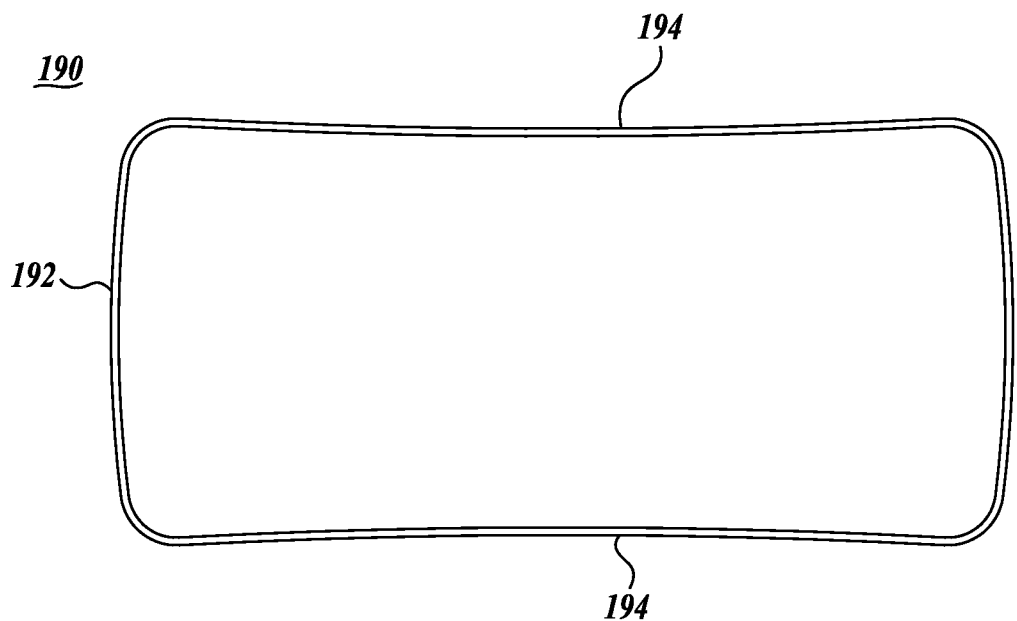
FIG. 21 is a schematic view of rectangular ducting formed in accordance with the present invention with the minor sides of the ducting nominally bowed outwardly and the major sides of the ducting nominally bowed inwardly.
Figure 22:
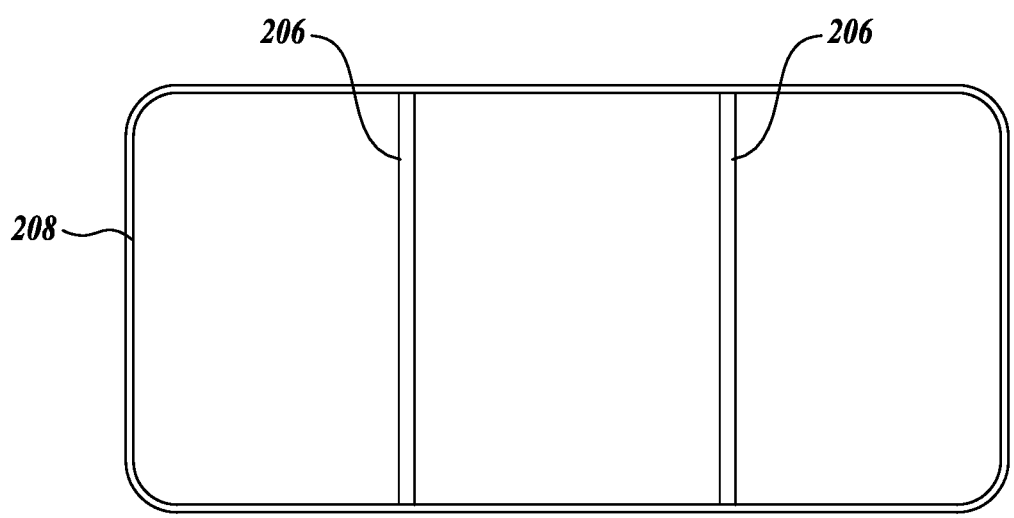
FIG. 22 is a cross-sectional view of a formed rectilinear duct utilizing internal reinforcing rods.

In another aspect of the present disclosure, the spiral ducting 190, shown in cross section in FIG. 21, is formed with the minor sides 192 bowed or cambered outwardly slightly and the major sides 194 nominally cambered or bowed inwardly slightly. Bowing of the ducting sides is possible by controlling the stretch percentage of the minor and major panel dimensions independently. Also, the cross-sectional configuration shown in FIG. 21 can be achieved by use of an open jaw press brake or an open jaw roll former, once the general rectangular shape has been achieved. With this initial configuration, when the ducting 190 is in use, the pressure of the air flowing through the duct tends to cause the major sides 194 to "straighten," or even bow very slightly outwardly which movement of the major sides is countered or resisted by the minor sides 192. This resistance by the minor sides 192 tend to straighten the minor sides resulting in a substantially rectilinear cross-sectional shape of the ducting during use. This transfer of forces from the major sides to the minor sides of the ducting is possible because of the relatively stiff and structurally robust corners of the ducting achieved by rounding the corners rather than forming the corner in a square or sharp manner. In this manner, the rectangular ducting 190 remains within the required maximum outward deformation limits that must be met by the rectangular ducting when in use.

As noted above, the outward nominal camber of the minor sides 192 can be achieved by different techniques, including by the shape of the equipment used to form the rectilinear shape of the ducting or the procedures or techniques used to form the ducting 190 into rectilinear shape. Various amounts of camber may be formed into the major and minor sides of the ducting, with the desired amount of camber dependent on various factors, including the thickness of the material used to form the ducting, the service air pressure that will flow through the ducting, the temperature of the air that will flow through the ducting, etc. Typically, the amount of camber will be approximately 3/16 inch per 12 inches of the width of the minor side 192, shown in FIG. 21. It will be appreciated that camber preformed in the minor side of the rectangular ducting tends to naturally cause the major sides of the rectangular ducting to nominally bow somewhat inwardly.

Figure 23:
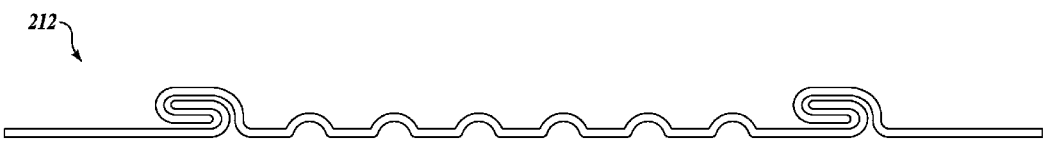
FIG. 23 is a fragmentary cross-sectional view of 6-C corrugated ducting material usable with the present invention.
Figure 24:
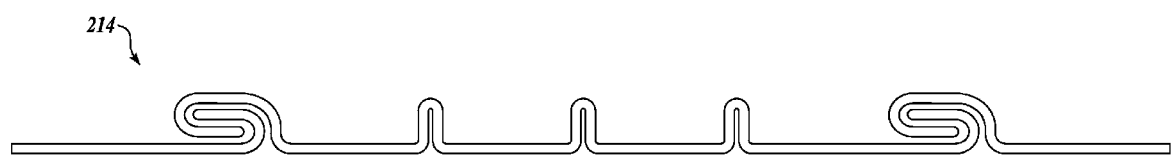
FIG. 24 is a view similar to FIG. 23, but showing treble rib strip material that can be used to form helical wound ducting for use with the present invention.
Figure 25:
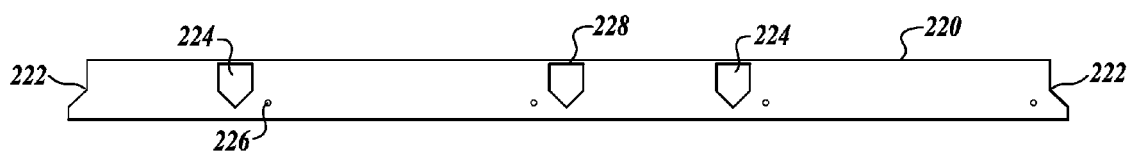
FIG. 25 is a plan view of strip stock utilized to form a flanged connector.

It will also be appreciated that use of the spiral-seamed tubing to form the square/rectangular ducting results in a relatively strong ducting in relationship to the thickness of the ducting. In essence, the locked edges of the helically wound sheet strip material provide substantial reinforcement and strength to the ducting, even when formed into rectangular or square cross-sectional shapes. Thus, reinforcement of the ducting typically is not required unless the ducting is of relatively large size. The present invention can be used with different types of helically wound ducting material of various profiles. For example, the present invention can be used with ducting formed from 6-C corrugated ducting material 212 and from triple ribbed corrugated ducting material 214 as shown in FIGS. 23 and 24, respectively.

When reinforcement of the ducting is needed, such reinforcement can be in the form of angle sections, channel sections, Z-shaped sections, or other shaped members that are attached to the exterior of the square/rectangular ducting. Such reinforcement members may extend longitudinally of the ducting, transverse of the ducting, diagonal of the ducting, or in other orientations. Applying such reinforcement to the ducting is relatively convenient since the ducting is in long lengths in relationship to the relatively short lengths of ducting made by known manufacturing methods, as described in the Background section of the present application. In this regard, see the angle sections 200 and Z-sections 202 attached to the ducting 52 shown in FIG. 10.

Reinforcement of the spiral-seamed square/rectangular ducting can be carried out by other techniques. For instance, rods 206 can be used to span across the minor dimension of the formed rectangular ducting 208 shown in cross section in FIG. 23. The rods 206 can be replaced with round tubing, square tubing, or rods or tubing of other cross-sectional shapes, such as triangular, oval, or elliptical. Also cables or tubing can be alternatively used. The reinforcing member need only carry a tension load. Also, rather than extending across the minor dimension of the ducting, the reinforcing member can instead span across the major dimension of the ducting. The use of the reinforcing rods 206 or other devices enables longer lengths of spiral ducting 208 to be utilized and/or enables the ducting to be constructed from lighter gauge material without exceeding the allowed level of flexing or other deformation while in use.

It will be appreciated that the need for intermediate reinforcements of the spiral ducting as discussed above may be reduced or perhaps eliminated by forming the ducting with round corners as described above. As stated above, by forming the ducting with rounded corners, increased structural rigidity and strength is achieved over ducting with sharp or square corners. This increase in structural rigidity and strength may reduce the number of reinforcements needed or even eliminate such reinforcements, providing significant cost savings in the manufacture of the spiral rectilinear ducting.

Another advantage of forming spiral HVAC rectangular and square cross-sectional ducting with rounded corners is for better air flow efficiency. In HVAC ducting having square or sharp corners, air does not tend to flow in the four corners of the ducting, resulting in "dead spaces." It is common for dirt, dust, and microbial build up to occur in the square/sharp corners of rectangular/square helical ducting. However, by forming the corners with a significant radius, the "dead space" is significantly reduced or eliminated for improved air flow and reduced microbial, dirt and dust build up.

A further benefit achievable by forming rectangular/square HVAC ducting in accordance with the present disclosure is reduced air flow leakage. In the conventional rectangular ducting described in the Background section above, the longitudinal corner seams must be sealed to prevent leakage of air from the ducting. In the spiral square/rectangular cross-sectional ducting of the present disclosure, there are no such longitudinal seams that require sealing, rather, the ducting of the present disclosure is of continuous construction in significant lengths of up to at least 20 feet. Conventional square/rectangular ducts, as noted above, are typically fabricated in lengths of 48 inches, 60 inches, or at the most 72 inches. As apparent, many more of such relatively short length ducts must be interconnected together in relationship to the relatively few lengths of ducting required when formed in accordance with the present disclosure. This results in not only manufacturing savings, but also installation cost savings, and a reduction in the possibility of leakage at the joints interconnecting adjacent lengths of ducting.

As a further matter, when conventional lengths of square/rectangular ducting are utilized, typically a certain number of non-standard lengths must be produced to accommodate an HVAC installation. Such non-standard lengths of ducting are typically manufactured by plasma cutting a standard length duct or by shearing the duct components and then manually forming the duct using typical manually operated seam and joint tools. As a consequence, non-standard lengths of conventional ducting are expensive and time consuming to produce. The ducting of the present disclosure, on the other hand, can be conveniently and conventionally made at a desired specific length during the formation of the nominally round helical ducting. Thus, no special preparation or production is required to achieve a specific necessary length of ducting utilizing the methods and procedures of the present disclosure.

In addition, engineers, architects, and contractors seek to minimize a number of non-standard lengths of conventional ducting utilized in an HVAC project. One strategy in this regard is to add length or otherwise modify fittings, such as elbows, Tees, etc., where possible, instead of specifying non-standard lengths of conventional HVAC ducting. However, this results in more costly fittings and significantly more time in drawing/detailing the HVAC ducting system, which drawings and detailings are typically required for submission to governmental authorities and others. The ducting of the present disclosure enables standard fittings to be utilized, since the ducting can be produced in desired specific lengths as part of the routine manufacturing process. As would be appreciated, this can result in significant savings not only in not requiring special fittings to be manufactured, but also in reducing the cost of producing HVAC system drawings.

It will be appreciated that square/rectangular ducting sections made from the foregoing methods may be interconnected by flanged connectors, including those connectors described herein. Such flanged connectors may be attached to the adjacent ends of adjacent ducting sections. Further, such flanged connectors may be incorporated into other ducting components, for example, without limitation, elbows, tees, splices, collars, taps, reducers, bell mouths, end caps, and plugs. These are standard components utilized in ducting systems for heating/ventilating and air conditioning systems. Further, patterns for such components may be created utilizing CAD systems in a known manner. Heretofore, such connectors were utilized in connection with rectangular/square ducting made by the bending techniques described in the Background of the present application. However, with the advent of the present invention, such connectors may be designed and utilized with respect to longer lengths of square/rectangular ducting constructed using the methods of the present disclosure.

Next, some exemplary methods for making flanged connector rings for use with square or rectangular ducting will be described. For example, the one piece connector ring 54 shown in FIG. 11 may be manufactured from a length of strip stock/material 220 having notches 222 stamped or otherwise cut out of its ends as well as intermediate notches 224 stamped or otherwise cut out along the length of strip stock 220. Alignment holes 226, as discussed more fully below, may also be stamped, punched or otherwise cut out of the strip stock 220. The intermediate notches 224 are located at what will become the corners of the flanged connector ring 54, and the ends of the strip stock will form the fourth corner of the flanged connector ring, as discussed below. The intermediate notches 222 preferably do not "break out" to the edge of the strip stock. Rather, a thin section 228 of the strip stock material is retained, which will assist in forming the strip stock into a desired profile with less distortion, as discussed below. Each of the intermediate notches 224 includes a rectangular/square portion adjacent thin section 228 and a triangular section opposite thin section 228. The apex of such triangular section corresponds to the center of a corner 230 of the flanged connector ring 54.

The flat strip stock 220 is then formed into a desired profile using rolling and/or bending and/or other well-known techniques. One profile for the connector ring 54 is shown in FIG. 11. This profile corresponds to FIG. 30, which illustrates a cross-sectional view of the connector ring shown in FIG. 11.

Figure 34:
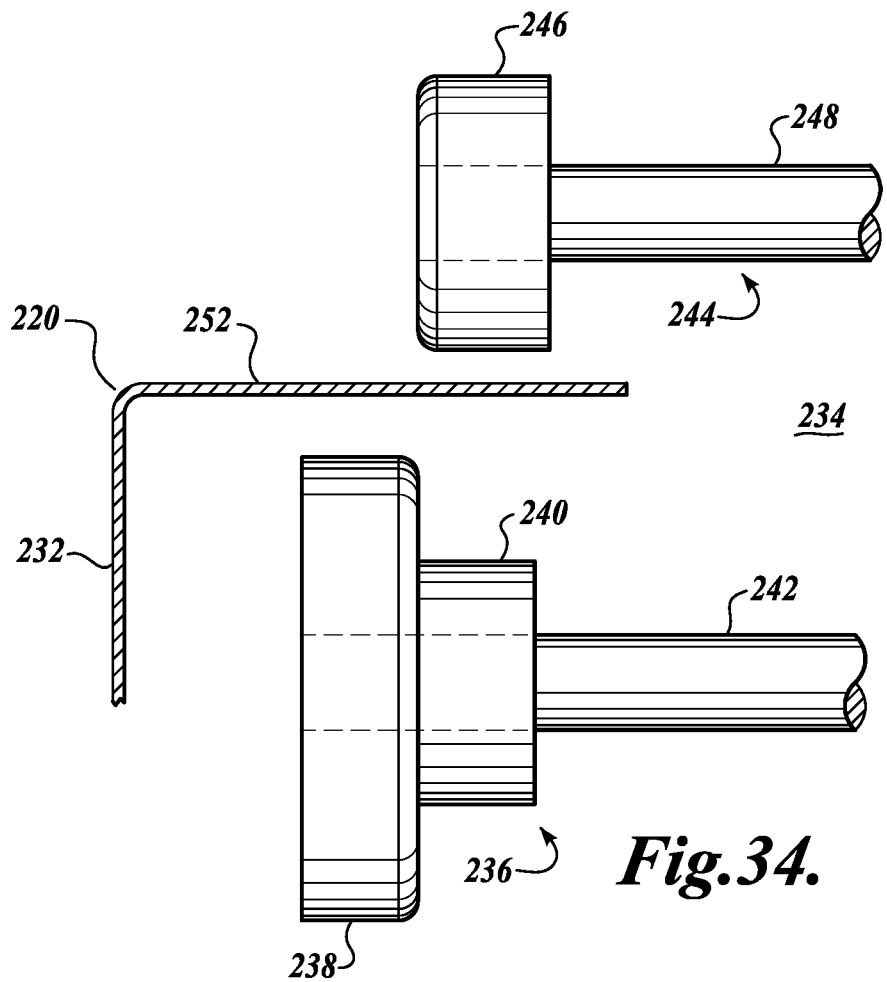
FIG. 34 illustrates one of the steps in roll forming flanged connectors according to the present disclosure.

The flanged connector ring 54 can be manufactured by first bending or rolling the strip stock 220 lengthwise into an angle shape, as shown in FIG. 34, with a brake press or with rollers as is well known in the art. The vertical leg of the angle shape shown in FIG. 34 corresponds to the insertion section 232, of the formed connector 54, see FIGS. 11 and 30. Thereafter, the horizontal leg of the now angle-shaped strip stock 220 is further formed by a first roller set 234, consisting of a first roller assembly 236, having a major diameter roller 238, and a side-by-side smaller roller 240, mounted on a rotatable shaft 242. The first roller set 234 also includes a second roller assembly 244 consisting of a roller 246, mounted on a rotatable shaft 248. The rotatable shafts 242 and 248 may be moved towards and away from each other in a substantially parallel orientation in a well-known manner. When the shafts are moved towards each other, the roller 246, while positioned at the side of the roller 238, turns a portion of the horizontal leg of the preformed strip stock downwardly to partially form a reinforcing section 250, thereby also defining the width of the mating flange section 252 of the formed connector 54. The reinforcing section 250 is captured between the adjacent face sections of the rollers 238 and 246. In addition, a horizontal segment 254 of the reinforcing section 250 is formed between the outer diameter of roller 246 and the outer diameter of roller 240. The vertically disposed segment of the reinforcing section 250 serves a hem section 256 of the connector 54, and the horizontal segment 254 will be formed to serve as a return section of the connector, as discussed below.

Figure 35:
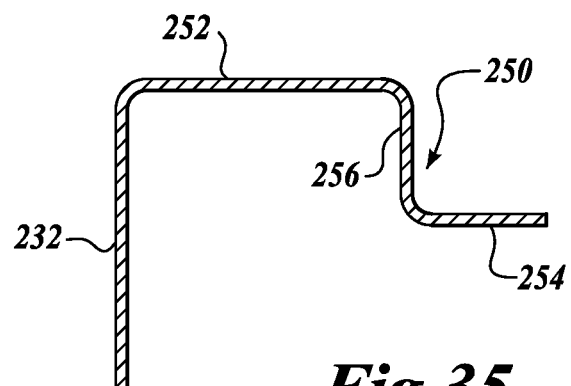
FIG. 35 is a cross-sectional view of a partially formed flanged connector.
Figure 36:
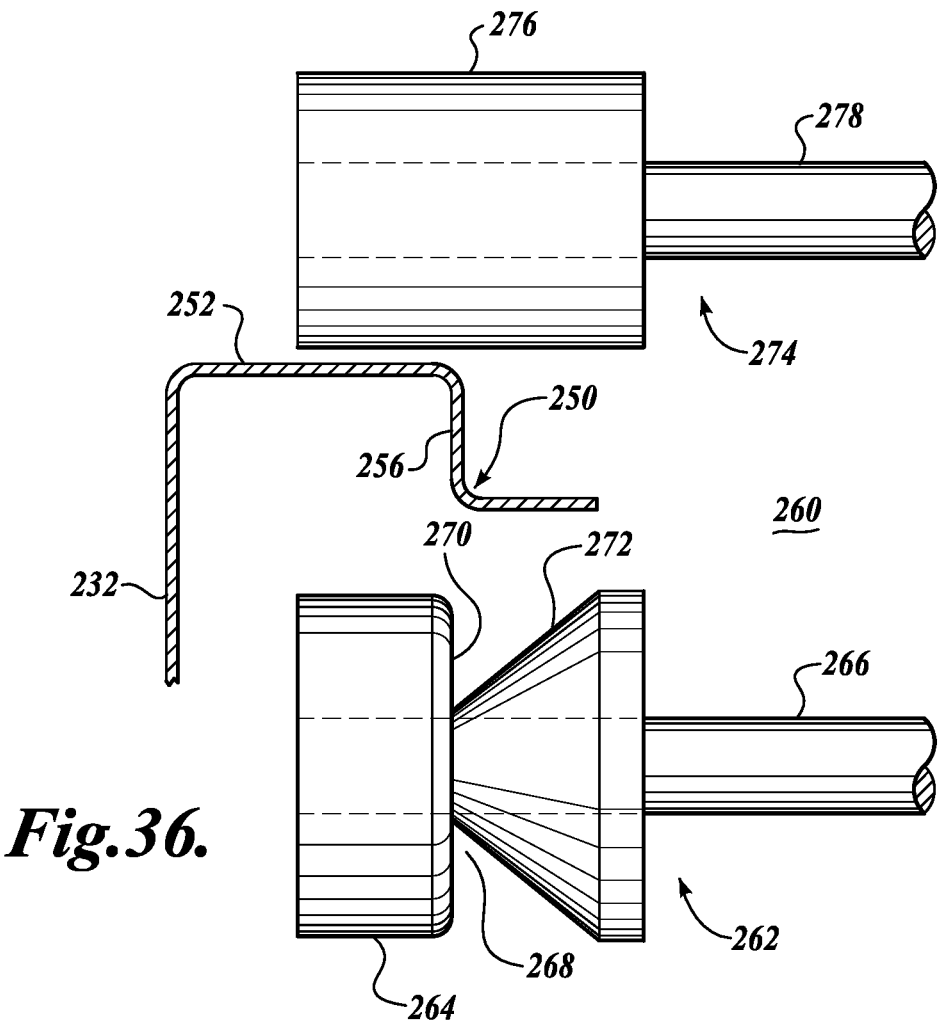
FIG. 36 is a view of a further step in the roll forming of a flanged connector in accordance with the present disclosure.

The partially formed flanged connector 54 of FIG. 35 is placed in a roller set 260 of FIG. 36 for further processing. The roller set 260 includes a die roller assembly 262 composed of a die roller 264 mounted on a rotatable shaft 266. The die roller 264 has a groove 268 formed around its perimeter in a shape of a half "V" composed of a vertical face 270 and a diagonal face 272. The roller set 262 also includes a second roller assembly 274 composed of a cylindrical roller 276 mounted on a rotatable shaft 278. The roller assemblies 264 and 274 are capable of moving towards and away from each other while the rotatable shafts 266 and 278 remain substantially parallel to each other. As shown in FIG. 36, the partially formed flanged connector 54 from FIG. 35 is positioned relative to roller 264 so that hem section 256 is adjacent vertical face 270 of roller 264. Thereafter, the roller assemblies 262 and 274 are moved towards each other as the rollers 264 and 276 rotate relative to each other, thereby causing the return section 254 to assume the orientation of diagonal roller face 272 relative to roller face 270, as shown in FIG. 37.

Figure 37:
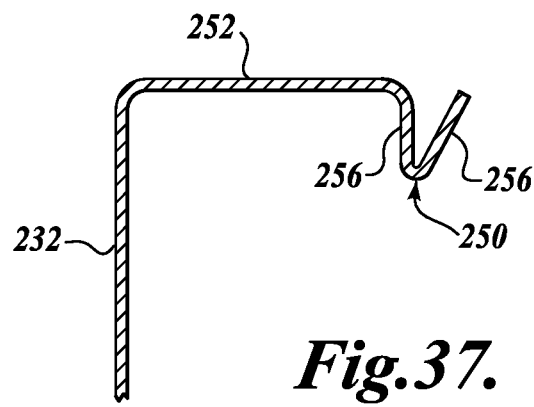
FIG. 37 is a cross-sectional view of a partially formed flanged connector after being worked with the roll forming apparatus shown in FIG. 36.
Figure 38:
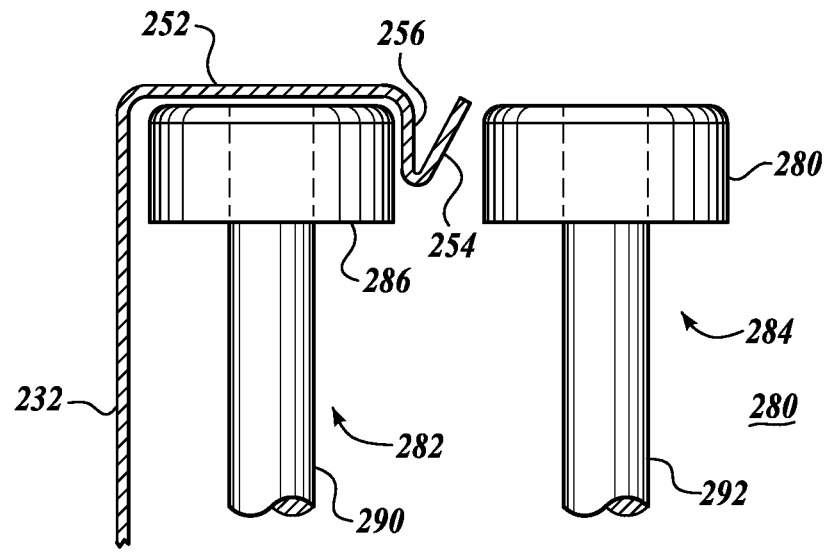
FIG. 38 is a further step in the roll forming process.
Figure 39:
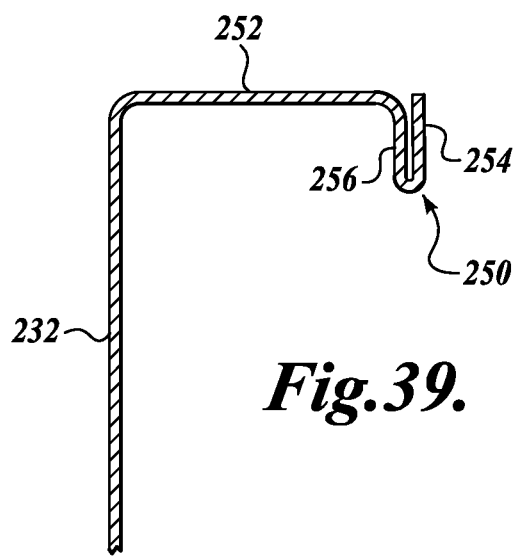
FIG. 39 is a cross-sectional view of the partially formed flanged connector corresponding to FIGS. 11 and 29.
Figure 40:
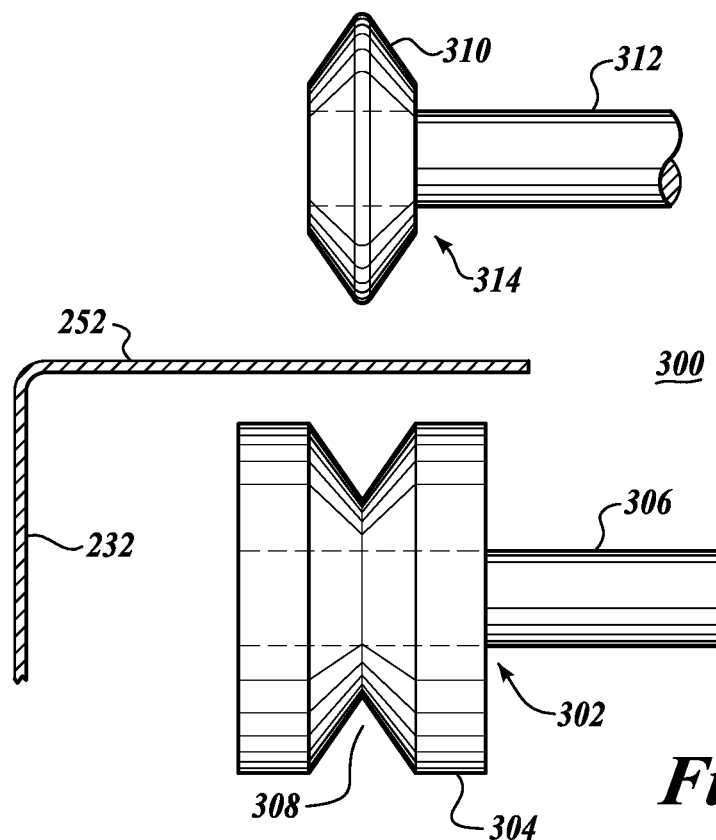
FIG. 40 is a step in an alternative embodiment of roll forming flange connectors according to the present disclosure.

Thereafter, the partially formed flanged connector 54 in the configuration of FIG. 37 is further formed by a roller set 280 shown in FIG. 38. The roller set 280 consists of a pair of roller assemblies 282 and 284, each composed of a roller 286 and 288 carried by corresponding rotatable shafts 290 and 292. As shown in FIG. 38, the hem section 256 and the partially formed return flange 254 are placed between the two rollers 286 and 288, and then the two rollers are moved towards each other while rotating, thereby to pinch the end section and the return section, therebetween so that the return section closely overlies the end section thereby completing the formation of the reinforcing section 250, as well as partially completing the overall formation of the flanged connector 54, as shown in FIG. 39. The cross-sectional shape of FIG. 39 corresponds to the view of the partially formed flanged connector shown in FIG. 28.

Figure 41:
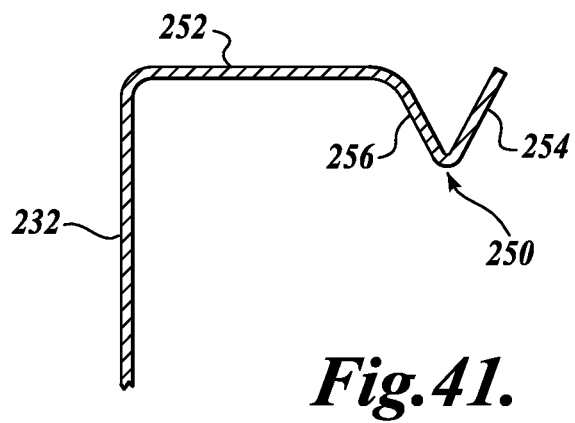
FIG. 41 is a cross-sectional view of a partially formed flanged connector after utilization of the apparatus shown in FIG. 40.

FIGS. 40-43 illustrate another method of performing flanged connector 54. As illustrated, the insertion section 232 and the mating flange 252, of the flanged connector, are formed by bending strip stock 220 with the press or with rollers, as described above. Thereafter, the mating flange portion 252, and the material extending outwardly therefrom that will eventually form the hem section 256, and return section 254, of the connector is placed over a roller set 300 to partially form the hem section 256 and return section 254, as shown in FIG. 41. The roller set 300 includes a first roller assembly 302 consisting of a roller die 304 mounted on a rotatable shaft 306. A "V" shaped groove 308 extends around the circumference of the roller die 304 to match the outer perimeter profile of a roller die 310 mounted on a rotatable shaft 312 of roller assembly 314. The roller assemblies 302 and 314 are capable of moving towards and away from each other while their respective shafts 306 and 312, rotate and maintain an orientation substantially parallel to each other. As a consequence, when the outer marginal portion of the mating flange 252 is placed in alignment with groove 308 and then the roller dies 304 and 310 are engaged with each other, they cooperatively form hem section 256 and return section 254 in the orientation shown in FIG. 41.

Figure 42:
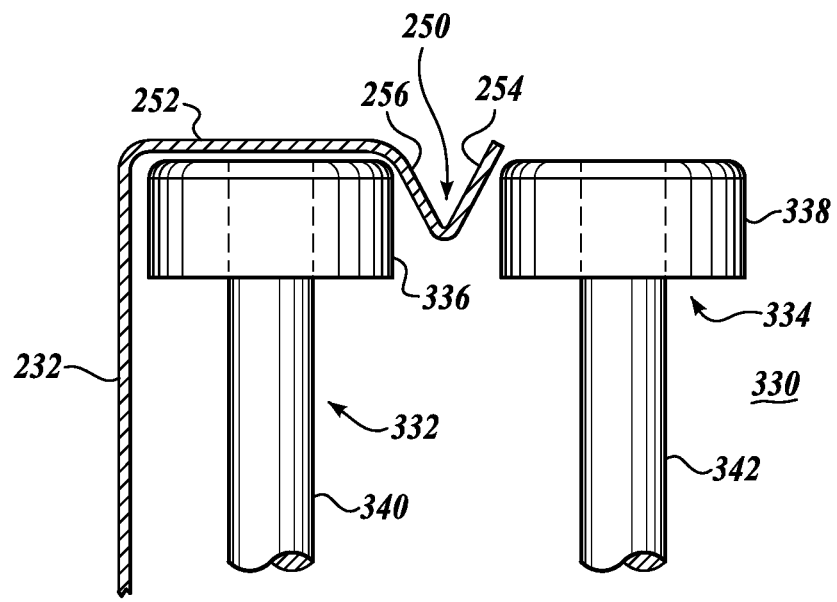
FIG. 42 is a further step in the roll forming process of the present invention.
Figure 43:
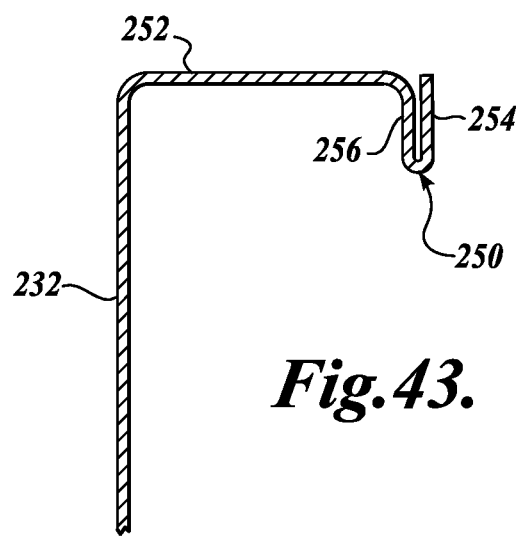
FIG. 43 is a cross-sectional view of a partially formed flanged connector corresponding to FIGS. 11 and 29.

Thereafter, the partially formed flanged connector shown in FIG. 41 is further worked by a roller set 330 shown in FIG. 42. The roller set 330 corresponds to the roller set 280 shown in FIG. 38, with the description set forth above with respect to FIG. 38 applying to FIG. 42, but with the part numbers increased by 50. Thus, such description will not be repeated. The results of roller set 330 is a partially formed flanged connector 54 as shown in FIG. 43. The cross-sectional view of FIG. 43 corresponds to the longitudinal view of the partially formed connector 54 shown in FIG. 28.

Figure 28:
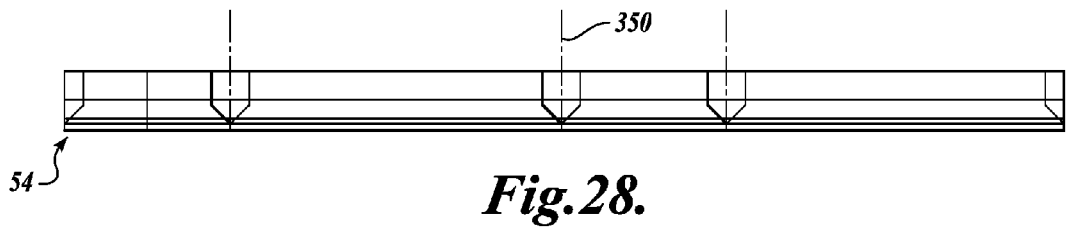
FIG. 28 is a plan view of the strip stock of FIG. 25, after being partially formed by roll forming and/or other manufacturing techniques.

The partially formed flanged connector 54, shown in FIG. 28, is then bent at the center of notches 74 represented by bend line 350 to form a connector of the shape shown in FIG. 11. It will be appreciated that due to the notches 224, the rolled strip stock is readily bent at such notches. It may or may not be necessary to utilize a binding jig. The free ends of the formed flanged connector shown in FIG. 11 are fastened together, such as by welding. Moreover, each of the other three corners of the flanged connector is composed of a miter-joint. As such it is preferable to close these joints by welding the diagonal intersection 352 of the adjacent mating flange segments 252, as well as the corner intersection 354 of the adjacent segments of the insertion section 233, see FIG. 11. In this manner, the formed flanged connector constitutes a structurally sound and strong member capable of securely fastening duct structures together in end-to-end relationship. Such duct structures may be aligned with each other through the use of aligning holes 226 shown in FIG. 11. Also, a gasket, a bead of caulk, or other sealant can be applied to the outward faces of adjacent mating flanges 252 to form an air tight seal therebetween. It will be appreciated that before the flange connector is bent at bend line 350, the thin section 228 between the notches 224 and the edge of the strip stock 222, are cut, snipped, clipped, or otherwise removed.

Figure 26:
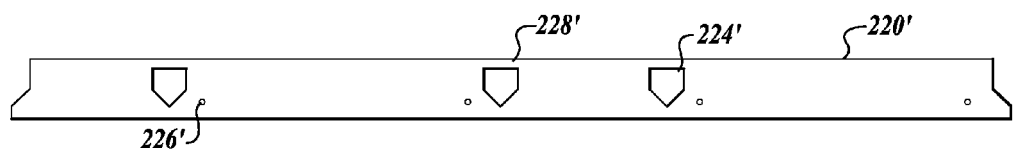
FIG. 26 is an alternative embodiment of strip stock shown in FIG. 25.
Figure 27:
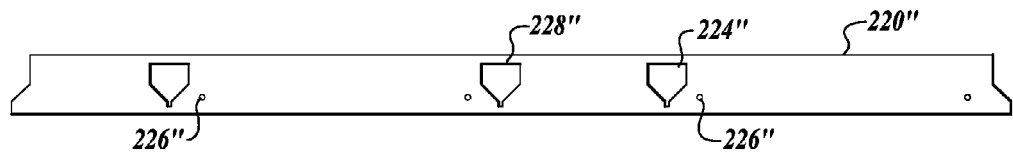
FIG. 27 is a further alternative of the embodiment of the strip stock shown in FIG. 25.

FIGS. 26 and 27 show alternative configurations of strip stock 220, identified as part Nos. 220' and 220". The corresponding components and features of strip stock 220' and 220" are identified by the same part numbers as in strip stock 220, with the addition of the (') or (") designation. Strip stock 220' and 220" differ from each other and from strip stock 220 by the configuration of notches 224, 224', and 224". These different configurations are capable of accommodating different cross-sectional profiles of flanged connectors. Also, notches 224' and 224" are inset further away from the edges of the strip stock 220' and 220" than the location of notch 224 of strip stock 220. This may be desirable to help prevent distortion in the strip stock as it is being formed into the cross-sectional shape showing FIGS. 39 and 43. The strip stock is composed of relatively thin gauge material, typically from 10 to 30 gauge, but can be of other gauge material.

Figure 44:
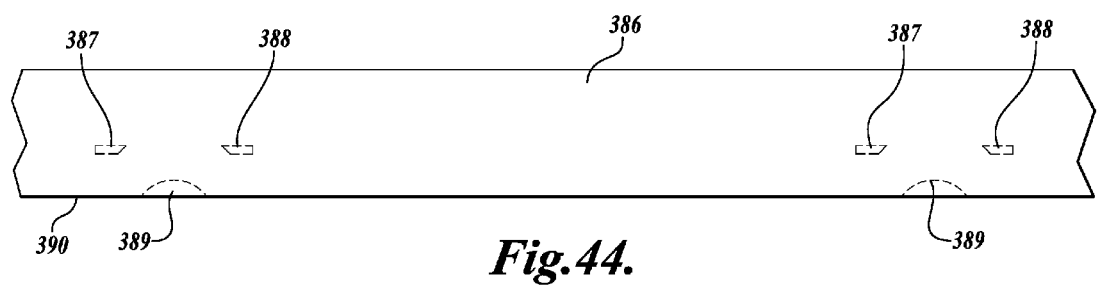
FIGS. 44, 45, and 46 are views of strip stock utilized to form a flanged connector similar to the flanged connector shown in FIG. 11.
Figure 45:
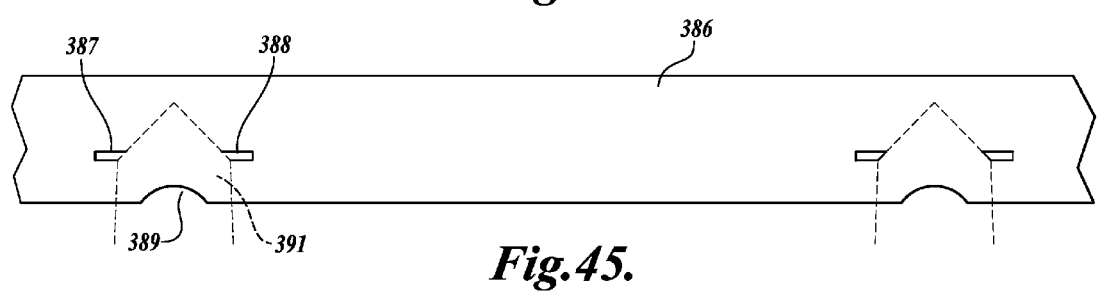
Figure 46:
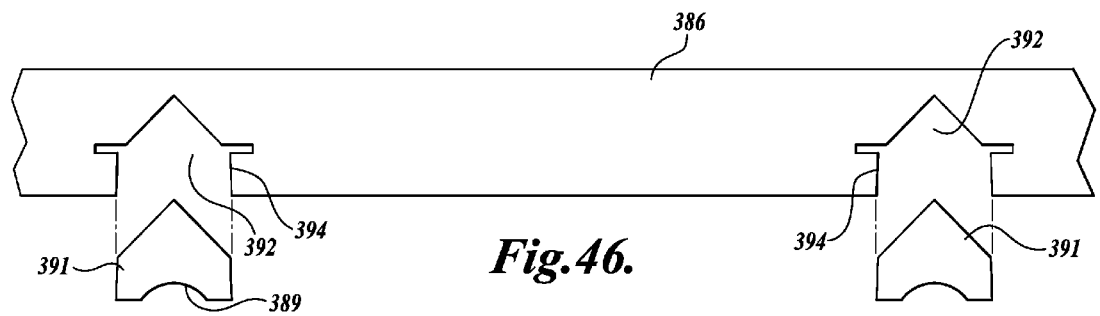
Figure 47:
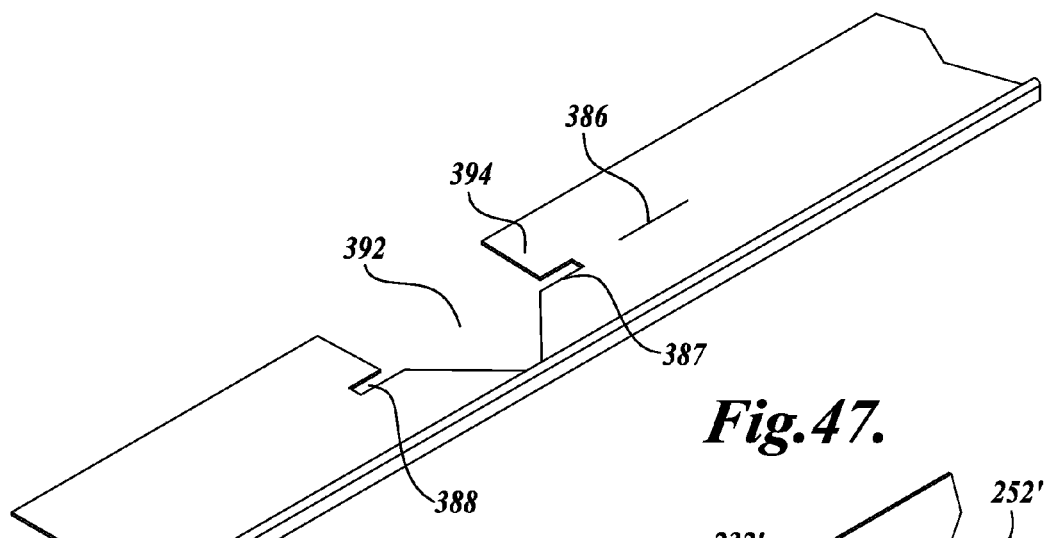
FIGS. 47, 48, and 49 are views of forming the strip stock shown in FIGS. 44-46.
Figure 48:
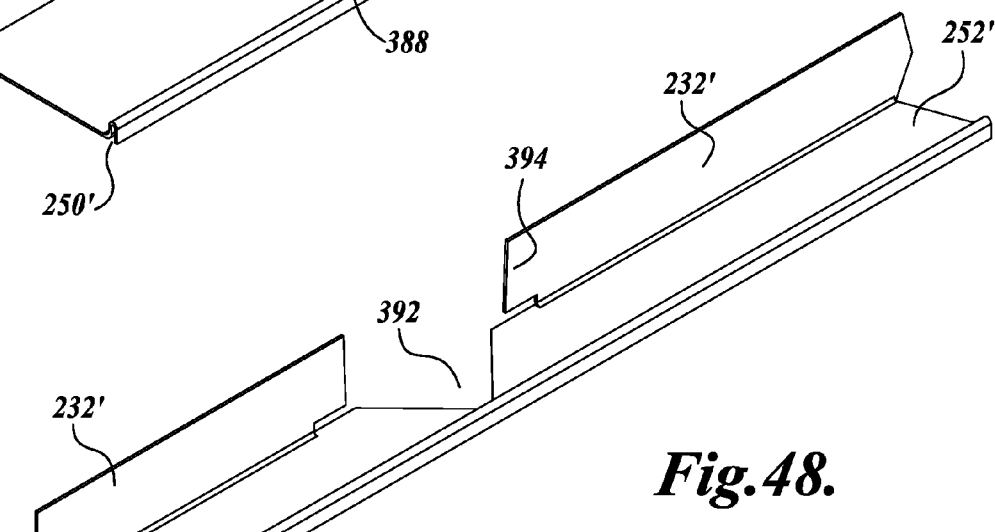
Figure 49:
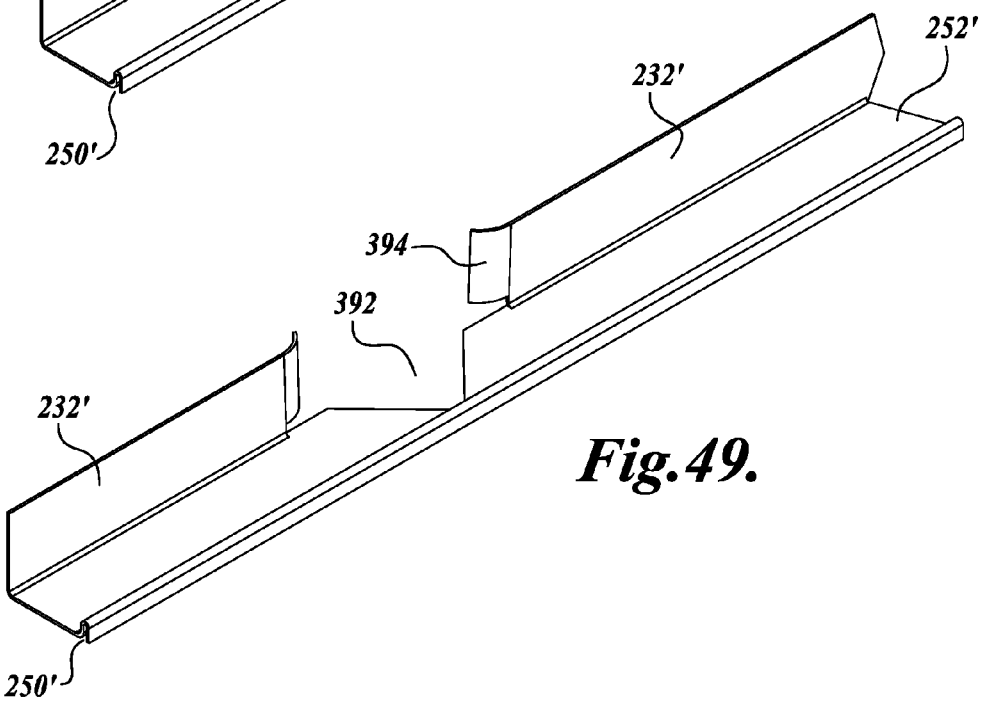

FIGS. 44-46 show a further alternative configuration of a strip stock, identified as part number 386, that may be used to form a flanged connector 54' similar to connector 54. The strip stock 386 is punched in two stages. In a first "pre-punch stage 1", a pair of relatively small longitudinal notches 387 and 388 are punched out together with an arcuate section 389 along strip edge 390. In a second stage, labeled as "final punch stage 2," a generally triangularly shaped notch is punched out of the strip stock 386 to form a corner drop off 391 leaving a generally "house" shaped notch 392 in the stock strip 386, see FIGS. 45 and 46. It will be appreciated that the notch 392 also includes the initial smaller longitudinal notches 387 and 388. Also, the sides of notches 392 are defined by tab portions 394 that will be used to form the corners 354' of insertion section 232'.

Figure 50:
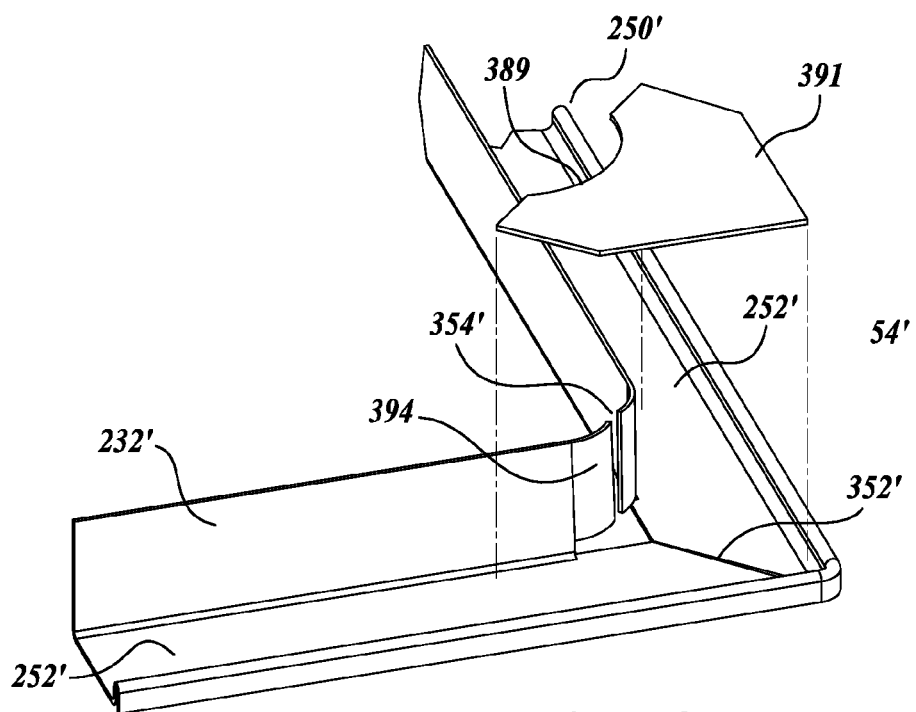
FIGS. 50 and 51 are views of a flange connector constructed from the formed strip stock shown in FIGS. 44-46.
Figure 51:
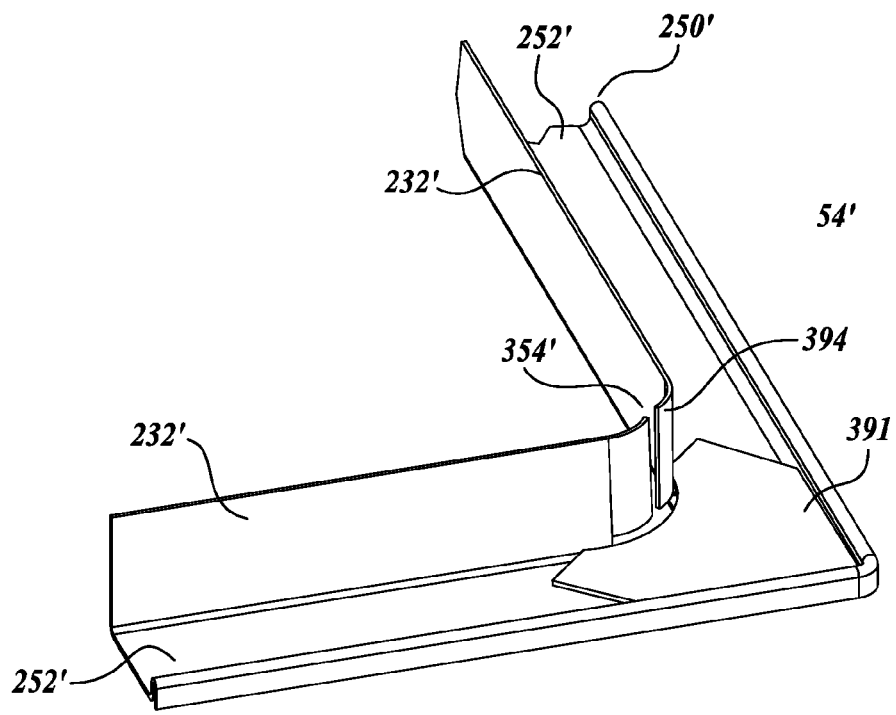

Thereafter, the strip stock 386 is formed into a desired profile using rolling and/or bending and/or other well-known techniques, for example, in a manner similar to that discussed above with respect to connector ring 54. The resulting profile may be, for instance, a profile shown in FIGS. 11 and 24, defining a flange section 252' and an insertion section 232'. The formed strip stock is then bent at the center of notches 392 to form a connector of a desired shape, for instance, as shown in FIGS. 50 and 51. This bending procedure can be similar to that described above with respect to flat stock 220. In this regard, each of the three corners of the resulting flange connectors form a miter joint 352' and the ends of the strip stock are joined together to form the fourth corner of the flange connector. Also, the corner 354' of the insertion section 232' is formed by curving the side tabs 394.

As a further aspect of the present invention, the corner drop off 391 is placed at each of the corners of the flange connector to provide reinforcement for the flange connector. The corner drop 391 may be securely attached to the corner by spot welding or other common technique. It will be appreciated that the arcuate section 389 of the corner drop matches the radius of the rounded corner 354' insertion portion 232' of the flange connector 54'. It also will be appreciated that by the foregoing method, the resulting flange connector 54' constitutes a structurally sound and reinforced member utilizing the corner drop 391, which typically might be discarded as scrap material. Thus, through the present method, substantially all of the strip stock 386 is utilized to form the flange connector, with very little waste.

The flange connector 54' shown in FIGS. 50 and 51 may be formed by alternative methods. For example, rather than using a two-stage punch process, a single stage punch process may be used to punch out the corner drop 391, which corresponds to the "final punch stage 2" described above. Thereafter, the notches 387 and 388 may be formed by slitting the strip stock 386 with a band saw or other tool. Next, the strip stock may be formed into a desired profile and then bent to form the corners of the flange connector, as described above.

As a further alternative, the flange connector 54' shown in FIGS. 50 and 51 may be formed by a singular powered and automated tool that first punches the strip stock into the configuration shown by the notch 392 and at the same time forming the corner drop off 391 as an initial stage of the punch/forming process. In a second stage of the continuous process, the strip stock 386 is formed into a desired profile, for example, the profile of the connector shown in FIGS. 11 and 24. As would be appreciated, this punching and forming technique would significantly reduce the required handling of the strip stock 386 to form the flange connector 54'.

In the foregoing description, the notches 224, 224', and 224", were described as being cut out or make prior to the forming of the forming of the strip stock into the profile shown in FIGS. 39 and 43. However, such notches can be cut out after the desired profile of the flanged connector is formed, as described above by roll forming and/or bending and/or other well-known techniques. This alternative sequence may be desirable if the particular cross-sectional profile of the flange connector would be such that the strip stock would tend to distort or warp or not otherwise retain the desired shape during forming.

Figure 29:
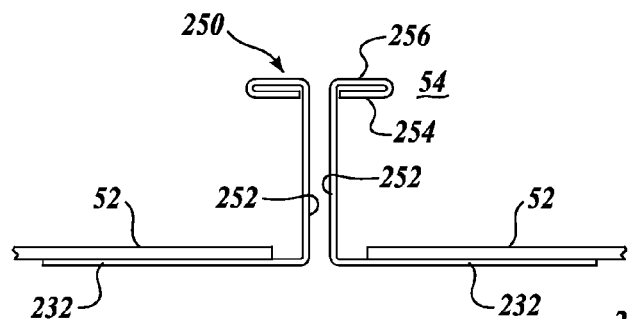
FIG. 29 illustrates a pair of flange connectors corresponding to FIG. 11, shown in face-to-face relationship.

Two of the flanged connectors 54, as shown in FIGS. 11, 39, and 43, are illustrated in face-to-face relationship to each other in FIG. 29. Such flange connectors may be retained in face-to-face relationship to each other by use of fasteners, such as self-threading screws extending through the mating flanges 254. As noted above, a gasket, a bead of caulk, or other material may be interposed between the mating flanges 254 to achieve an airtight seal therebetween. Also, rather than using threaded fasteners, the flanged connectors may be retained together by clips, for example, clips similar to clips 40 shown in FIG. 2. It can be appreciated, through the present invention, duct structure 50 may be economically manufactured and installed relative to prior art rectangular/square duct structures, including those discussed above.

The flanged connectors 54 correspond to the T24 flange profile standard established by the Sheet Metal and Air-Conditioning Contractors National Association (SMACNA). Moreover, such connectors are capable of achieving a connector rating from E-J under SMACNA standards. The present invention can be utilized to readily produce other cross-sectional profiles for flanged connectors. Several examples of other profiles are illustrated in FIGS. 30-33. In these figures the part numbers corresponding thereto are identified with the same part numbers as in FIG. 29, but with a letter suffix. As a first example, the flanged connector shown in FIG. 31 is also considered to correspond to the SMACNA T24 profile, but with the return section 254 outward of the hem section 256 rather than inward as shown in FIG. 14.

Figure 30:
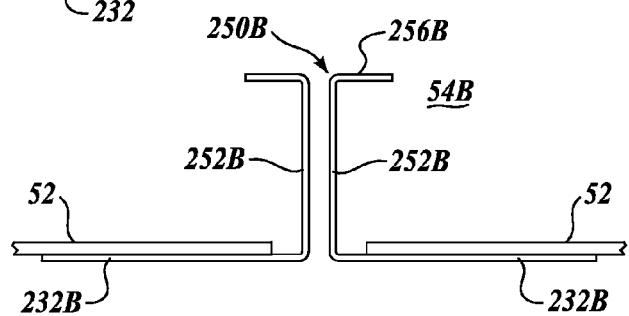
FIG. 30 is an alternative embodiment of flanged connectors constructed in accordance with the present invention shown in face-to-face relationship.
Figure 31:
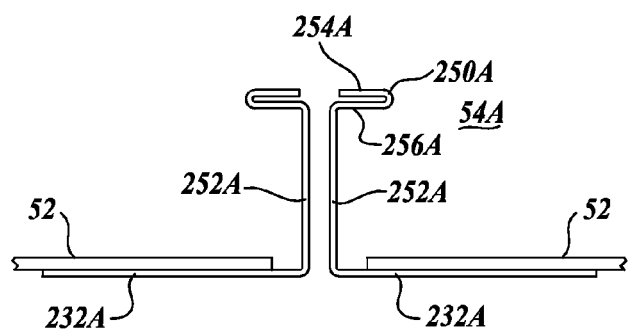
FIGS. 31, 32, and 33, are alternative embodiments of flanged connectors shown in face-to-face relationship.
Figure 32:
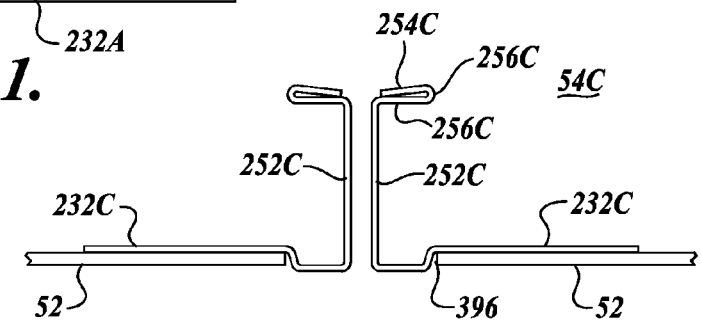
Figure 33:
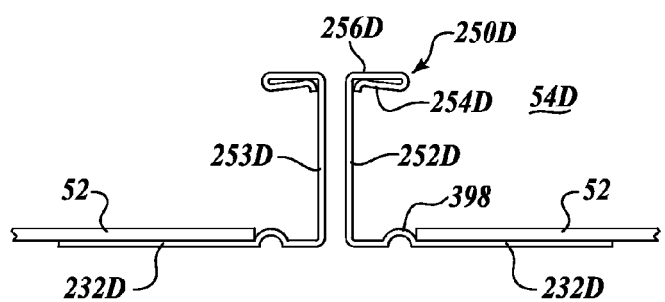

FIG. 30 illustrates flanged connectors 54B, which are similar to flanged connectors 54 and 54A, but without a return section 254. This profile corresponds to SMACNA profile T24A. FIGS. 32 and 33 depict flange connector profiles 54C and 54D which also can be manufactured in accordance with the present invention. One manner in which the profile shown in FIG. 32 differs from that shown in FIGS. 30 and 31 is that the insertion portion 232C is offset slightly upwardly at a location 396, a distance away from mating flange 252C. This offset provides increased structural strength for the insertion flange portion 232C and also serves as an abutment for the end of duct 52. The insertion flange section 232D, shown in FIG. 33, is also constructed somewhat differently than in FIGS. 29-32. In this regard, an arcuate, inwardly directed ridge 398 is formed in the insertion flange portion 232D. This ridge can serve as a locator for the end of duct 52 within which the insertion flange is engaged.

FIGS. 52-61 illustrate alternative embodiments of insertion flange 54. These alternative embodiments differ primarily in the configuration of the reinforcing sections 250E-250N. In these embodiments, like components/features of these flanged connectors are given the same item number as for flanged connector 54, but with the addition of an alphabetic suffix E-N. In each of the flanged connector profiles 54E-54N, the hem section 256E-256N is provided. However, rather than having a return section that is simply folded over on a hem section, each of the reinforcing sections 250E-250N are somewhat different in configuration. For example, in FIG. 52, the return section 254E actually extends laterally from the distal end of the hem section 256E (downwardly, shown in FIG. 52) and then is folded over on itself at 400 in the direction facing the mating flange. It is to be understood that the folded over portion 400 could alternatively be folded over to the outside, i.e., away from the mating flange portion 252E.

FIGS. 53-61 illustrate alternative embodiments of the return section 254F-254N. For example in FIG. 53, the return section 254F is shown as substantially rectangular or square in cross-section. Whereas, in FIGS. 54, 56, 59, and 60, the return sections 254G, 254I, 254L, and 254M, are substantially triangular in shape. In FIG. 55, the return section 254H is substantially circular. In FIG. 57, the return flange portion 254J is generally rectilinear in shape. In FIG. 58, the return flange portion 254K is generally oval, and in FIG. 61, the return flange portion 254N is generally hook-shaped, substantially in reverse direction to the return section 254K shown in FIG. 58. It is to be appreciated that embodiments other than those in FIGS. 52-61 may be utilized for the flanged connector, including the return section of the flanged connector.

FIGS. 67-71 illustrate further alternative embodiments of flanged connectors. The flanged connectors 54O-54X are similar to flange connectors 54E-54N, but with the exception that the hem sections 256O-256X extend generally diagonally from the distal (outer) portion of corresponding mating flanges 252O-252X, relative to corresponding mating flanges 252E-252N. The hem sections 256O-256X may be disposed at other angles than shown in FIGS. 67-71. In addition, rather than being relatively straight, the hem sections 256O-256X may be curved, arced, or in other shapes.

FIGS. 72-80 illustrate alternative embodiments of flanged connectors, designated as 54Y-54AG. As in flanged connector 54, such alternative flanged connectors each includes an insertion section, a mating flange and a reinforcing section. These components of the flanged connector are given the same part numbers as in FIGS. 11, 39, and 43, but with the addition of a corresponding letter suffix.

In the flanged connectors 54Y-54AD shown in FIGS. 72-80, each includes a short hem section 256Y-256AD extending laterally from the distal (outer) edge of the corresponding mating flange 252Y-252AD and then a return section 254Y-254AD that extends downwardly either substantially parallel to the mating flange or diagonally downwardly and away from the mating flange. Also, each of the flanged connectors 54Y-54AD includes a retention leg section 402Y-402AD, respectively. Such retention leg sections may be substantially parallel to the corresponding insertion sections 232Y-232AD, and help serve to capture or retain the duct 52 between the insertion section and the leg section. The distal end of the leg sections, shown in FIGS. 72-75, and 77, is flared away from insertion section 232Y-232AB and 232AD, so as to function as a "lead-in" for the duct 52 when the flanged connector is assembled with the duct.

The flange connectors 54AE, 54AF, and 54AG, as shown in FIGS. 78, 79, and 80, do not have leg section 402. However, in flange connectors 54AE and 54AF, the insertion sections 232AE and 232AF are offset similar to that shown in FIG. 32. Also, the distal end portions of the insertion sections 232AE and 232AF extend or flare diagonally toward the hem section to define a "lead in" since in these embodiments the insertion section is actually exterior to the adjacent end portion of the duct 52.

The flanged connector 54AG shown in FIG. 80 is formed similarly to a T24 profile, about a groove 404 formed in the mating flange 252AG. A bead of caulk or round sealing ring, not shown, or other type of seal, may be placed within the groove 404 to provide an air tight seal when the flanged connector is installed. As shown in FIG. 80, the end of the duct 52 includes an outwardly directed end flange 406 that overlaps a portion of the mating flange 252AG. The end flange 406 may be readily formed with a die structure, rollers, or other means known in the art.

Figure 81:
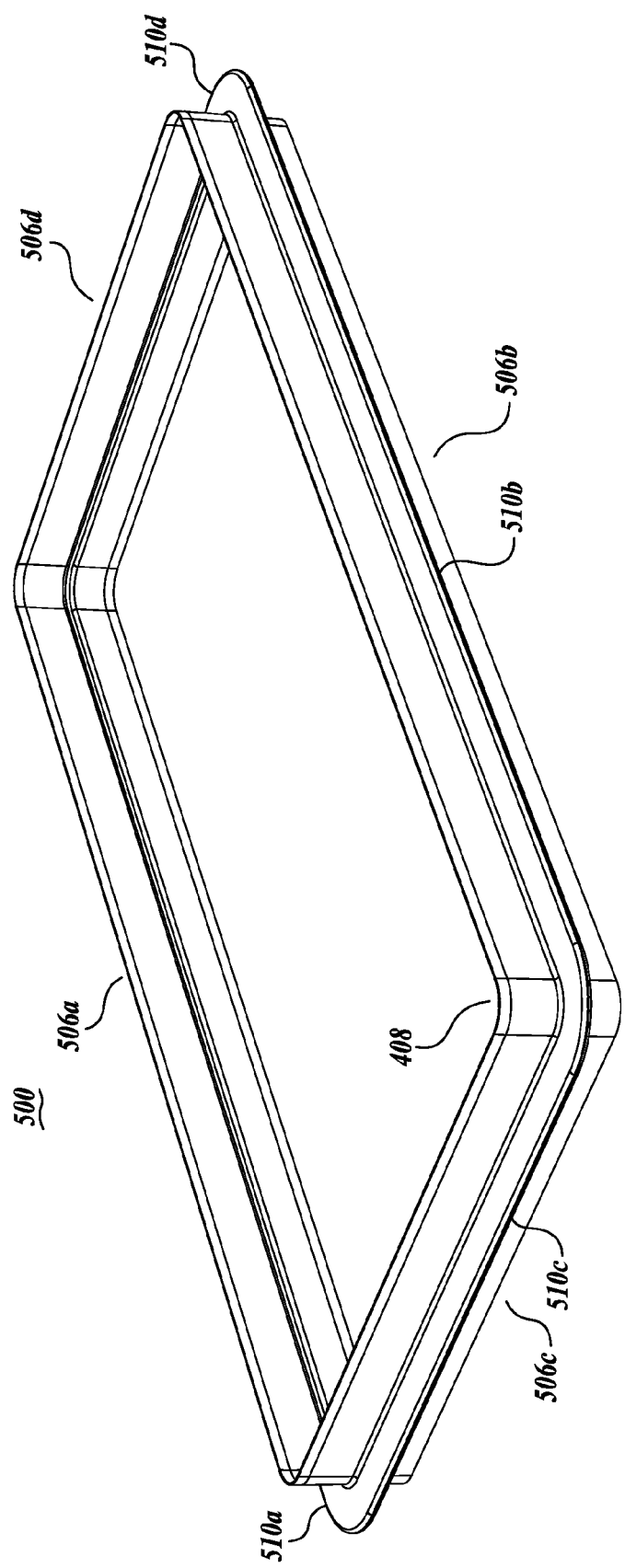
FIG. 81 is an isometric view of a standing seam slip joint connector in accordance with one embodiment of the disclosure.
Figure 82:
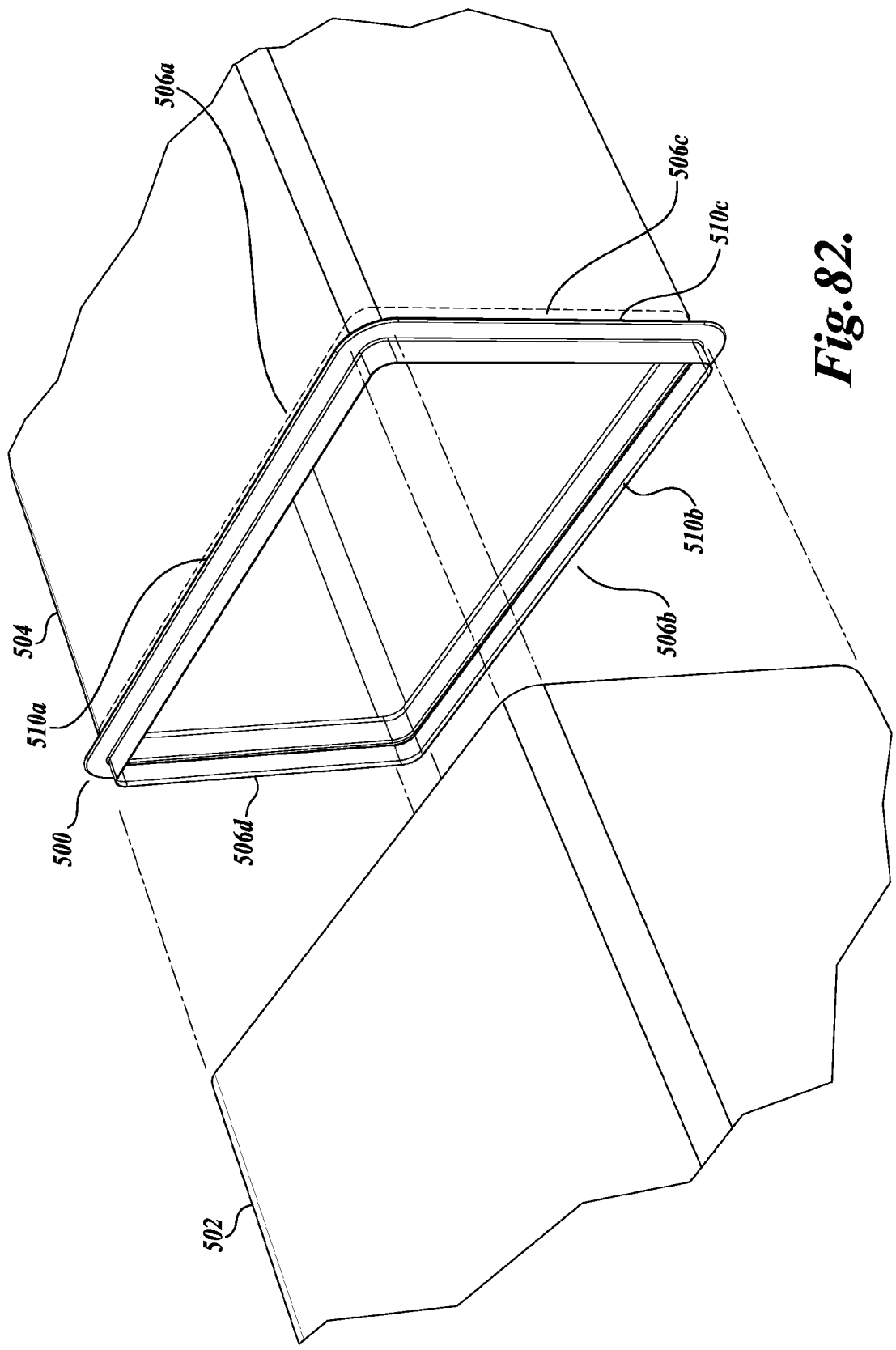
FIG. 82 is an isometric view of the standing slip joint connector of FIG. 81 shown installed on the end portion of the length of rectangular spiral seam duct.

FIGS. 81 and 82 illustrate a standing seam connector 500 constructed in accordance with the present disclosure for use in connecting the adjacent end portions of rectangular duct sections 502 and 504. As illustrated, connector 500 is a slip type connector that is engageable into the adjacent ends of the duct sections 502 and 504. The connector 500 is rectilinear in shape having parallel spaced apart longer sections 506a and 506b interconnected by transverse shorter sections 506c and 506d. Each of the sections 506a-506d intersect each other at rounded corners 508. Each of the sections of the connector 500 also includes a standing seam 510a, 510b, 510c, and 510d that extend transversely to the outer planar surface of the connector sections 506a-506d. When the connector 500 is installed with the duct sections 502 and 504, the ends of such duct sections abut against the standing seam 510a-510d. It will be appreciated that through the use of connector 500, the duct sections 502 and 504 are conveniently interconnected and securely fastened together by engaging the connector into the interiors of the duct section adjacent ends until the duct sections abut against the standing seam 510a-510d and then using hardware members, such as self-tapping sheet metal screws, to securely fasten the connector to the duct sections.

The connector 501 can be coated with a resilient material to serve as a gasket or sealer when used to interconnect duct sections 502 and 504. Such resilient material can be applied over the entire exterior of the connector 500, or only over the portions of the connector that slip into the interior of the duct sections, or only over the standing seam portion of the connector, as required.

Figure 83:
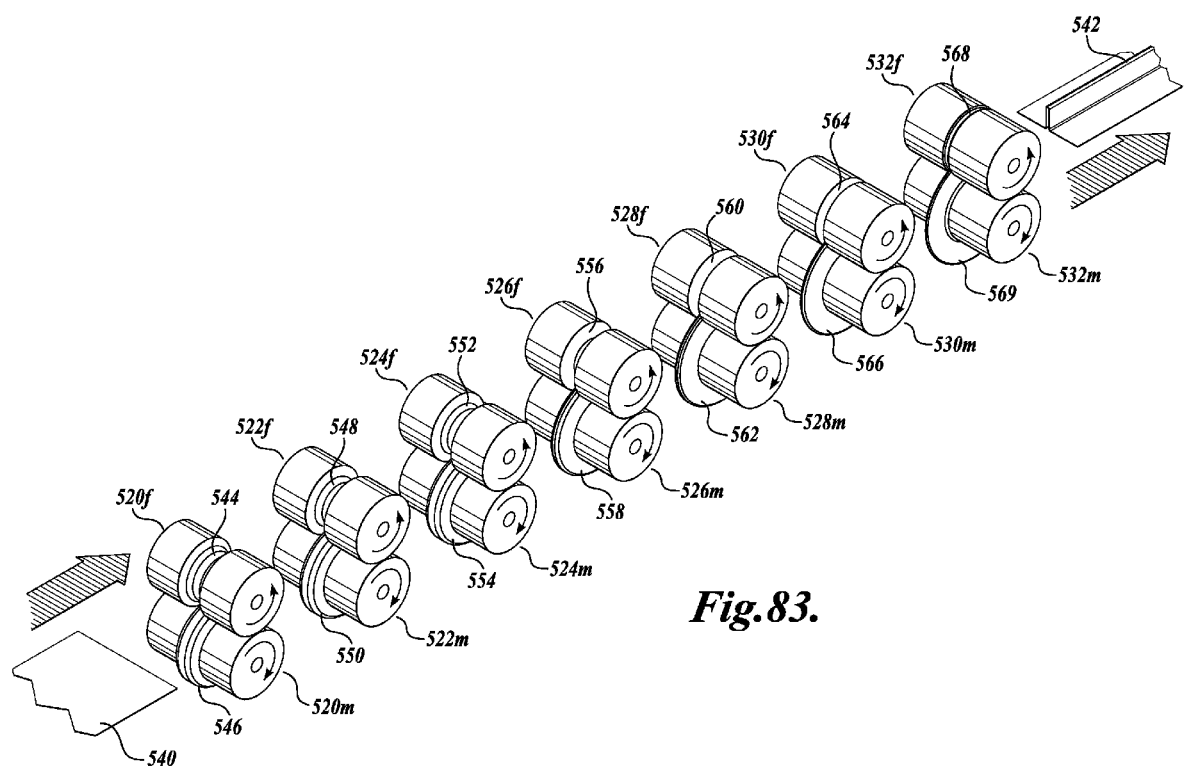
FIG. 83 illustrates a step in the method of forming the rectilinear standing seam slip joint of FIG. 81.
Figure 84:
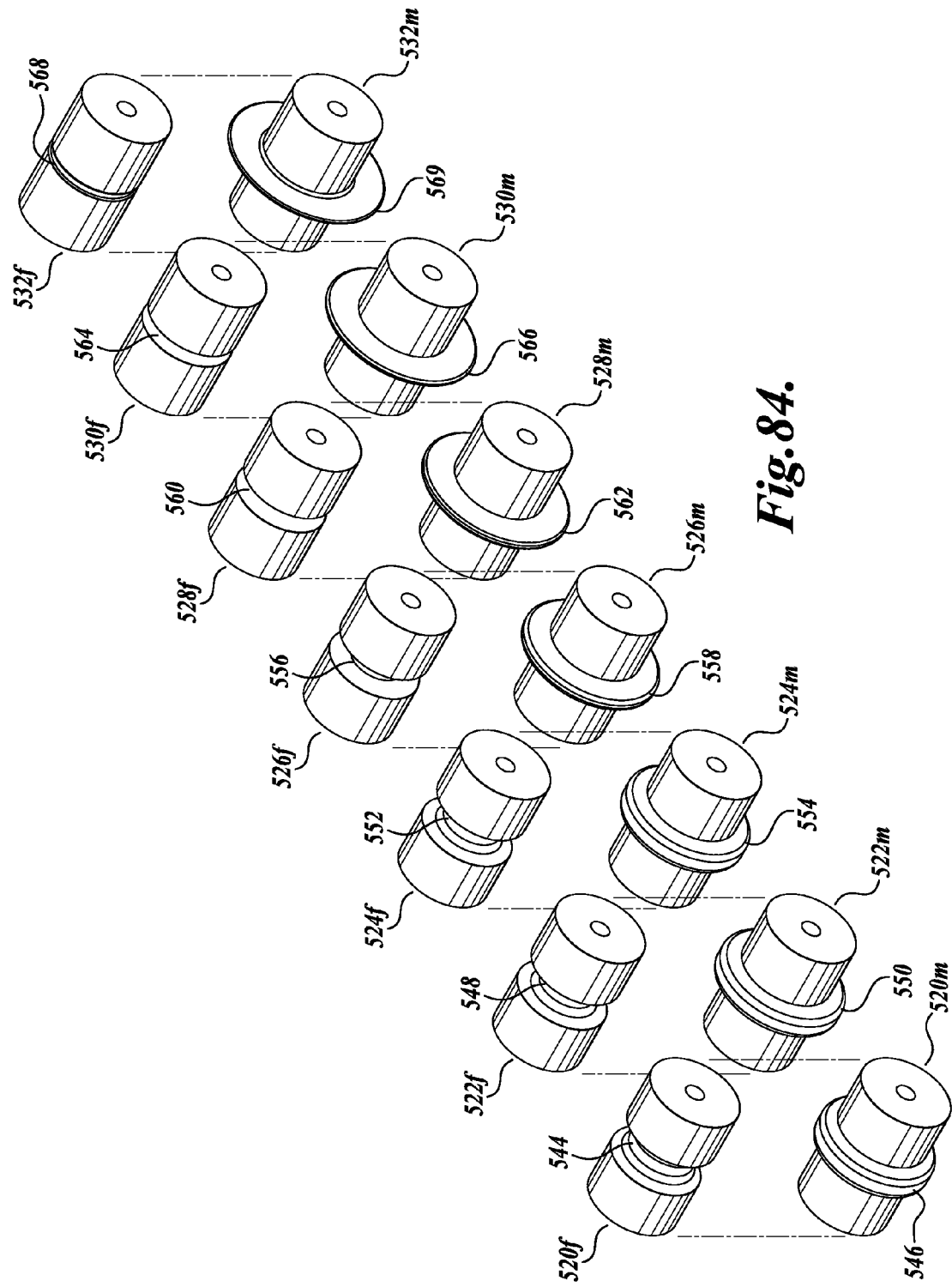
FIG. 84 is a view similar to FIG. 83, but with the male roller dies shown separated from the female roller dies.

The connector 500 can be constructed using a number of different methods and techniques. One such method is illustrated in FIGS. 83-87. As shown in FIG. 83, a length of thin strip stock 540 is fed between sets of male and female roller dies 520*f* and 520*m*, 522*f* and 522*m*, 524*f* and 524*m*, 526*f* and 526*m*, 528*f* and 528*m*, 530*f* and 530*m*, and 532*f* and 532*m*. FIGS. 83 and 84 show seven sets of matching male and female roller dies. Each of the dies is powered to rotate in unison. Alternatively, only the male dies or only the female dies may be powered.

The roller die sets progressively transform the length of thin strip stock 540 from a planar profile to a profile having a standing seam 542 extending transversely from the adjacent planar portion of the strip. This is accomplished by designing the roller die set to progressively deform the strip material 540. In this regard, in the roller die set 520*m*-520*f*, the female die 520*f* has a fairly wide groove 544 formed therein, whereas male die member 520*m* has a fairly wide central shoulder 546 formed therein to match the shape of the groove 544. The female roller die 522*f* also includes groove 548 that is somewhat narrower and somewhat deeper than groove 544 of roller die 520*f*. Correspondingly, male roller die 522*m* is formed with a projecting central shoulder 550 which is somewhat narrower and somewhat larger in diameter than the corresponding shoulder 546 of male die 520*m*. This progression of a narrower, deeper female groove continues with female roller dies 524*f*, 526*f*, 528*f*, 530*f*, and 532*f* illustrated in FIGS. 83 and 84 as grooves 552, 556, 560, 564, and 568, respectively. Likewise, the same progression of the thicknesses and diameters of the shoulders are formed in the male roller dies 524*m*, 526*m*, 528*m*, 530*m*, and 532*m*. In this regard, see shoulders 554, 558, and 562, 566, and 569. By the time the strip stock 540 has passed through the last roller die set 532*f*/532*m*, the desired shape and size of the seam 542 has been formed. As will be appreciated, the number of roller die sets and their relative placement to each other may vary depending on the type and thickness of the strip stock material, as well as the desired height of the seam 542. As an example, for strip stock 540 of from about 10 to 20 gauge, the seam 542 may extend from about ¼ to ¾ of an inch above the outer surface of the slip joint, however it is to be understood that the strip stock may be made of material of other gauges and that the seam 542 may be of other heights.

Figure 85:
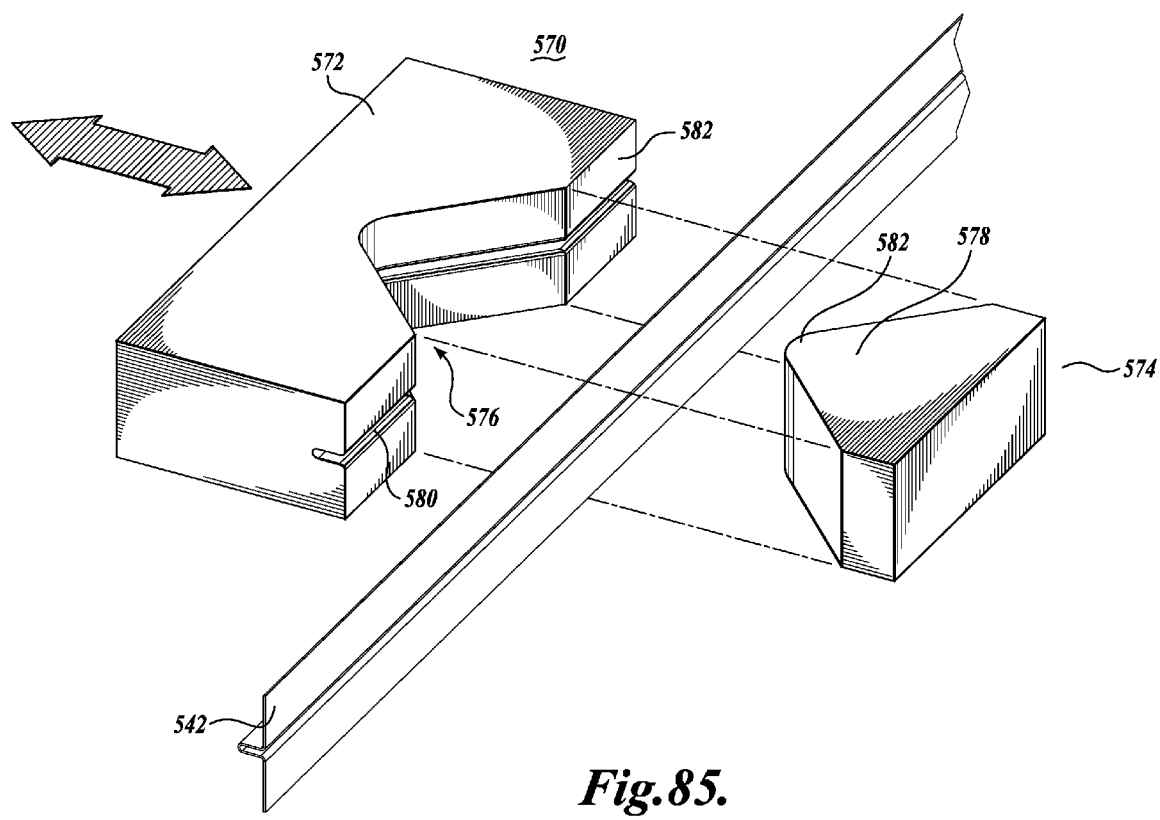
FIG. 85 is an isometric view of a die assembly for forming corners in the rectilinear slip joint shown in FIG. 81.
Figure 86:
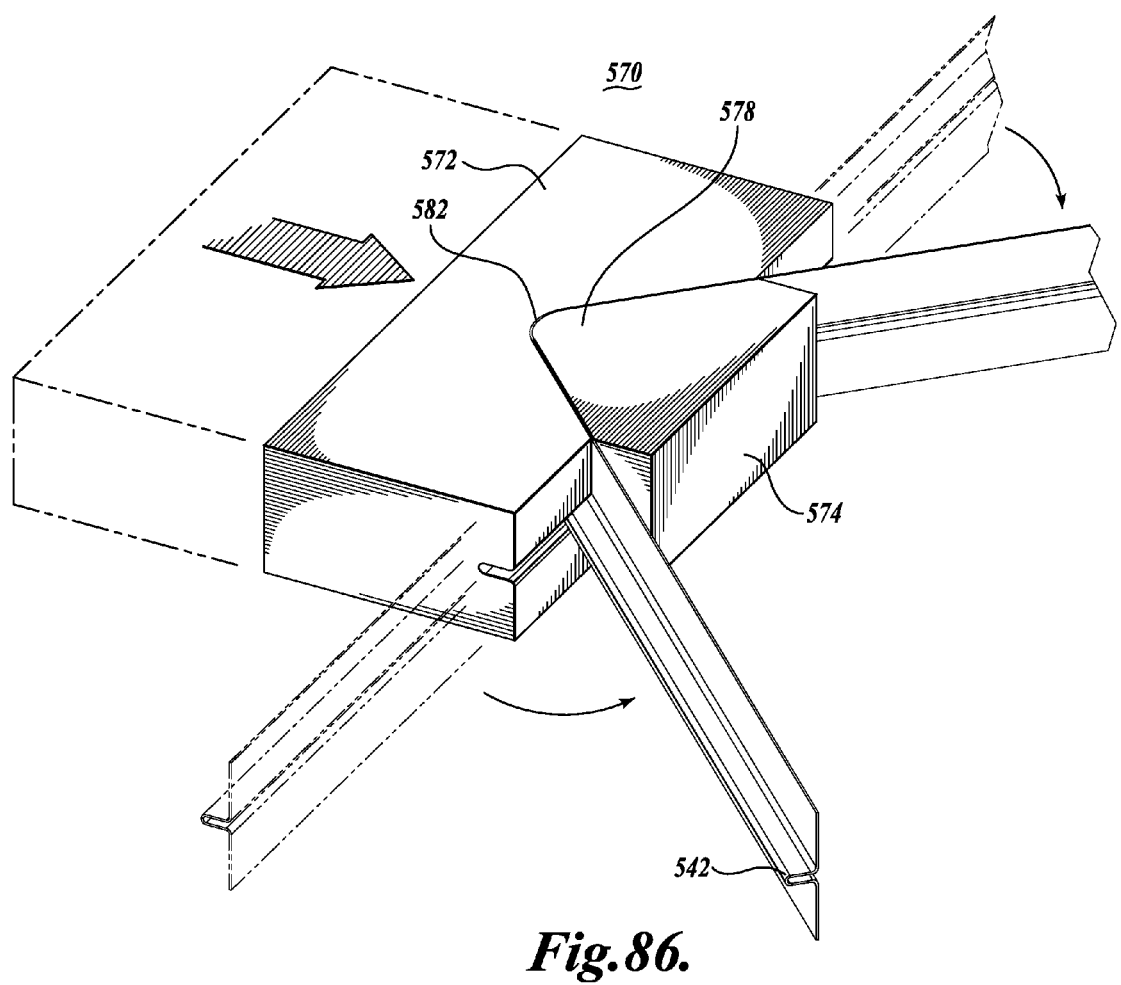
FIG. 86 is a view similar to FIG. 85, but with the die shown in close position.
Figure 87:
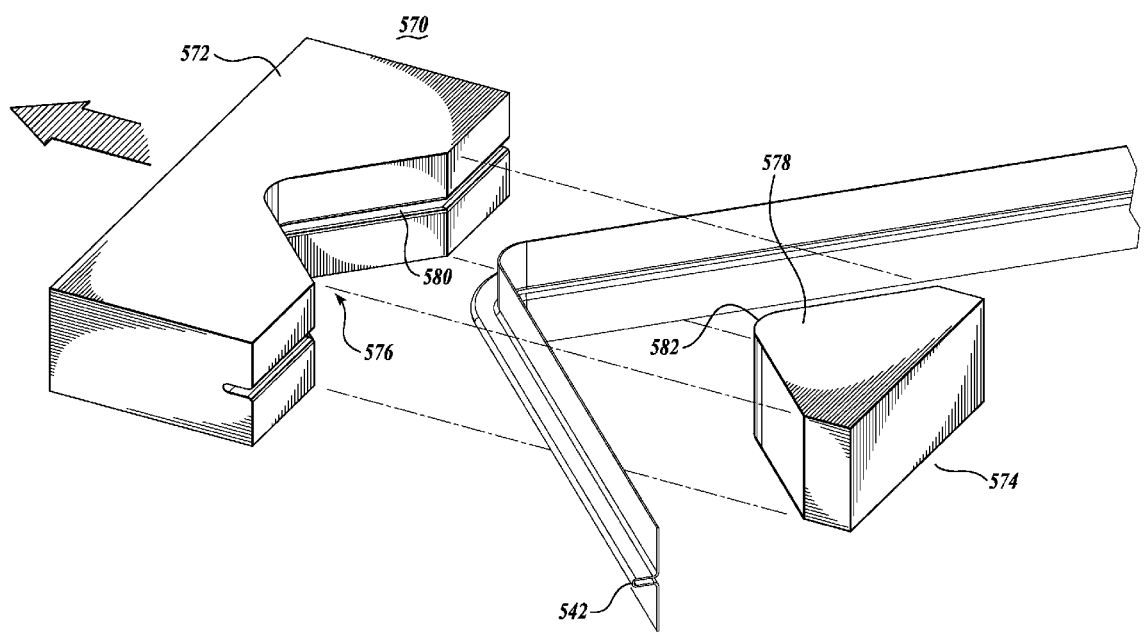
FIG. 87 is a view similar to view 86, but with the die shown in open in open position and shown a formed corner of the slip joint.
Figure 88:
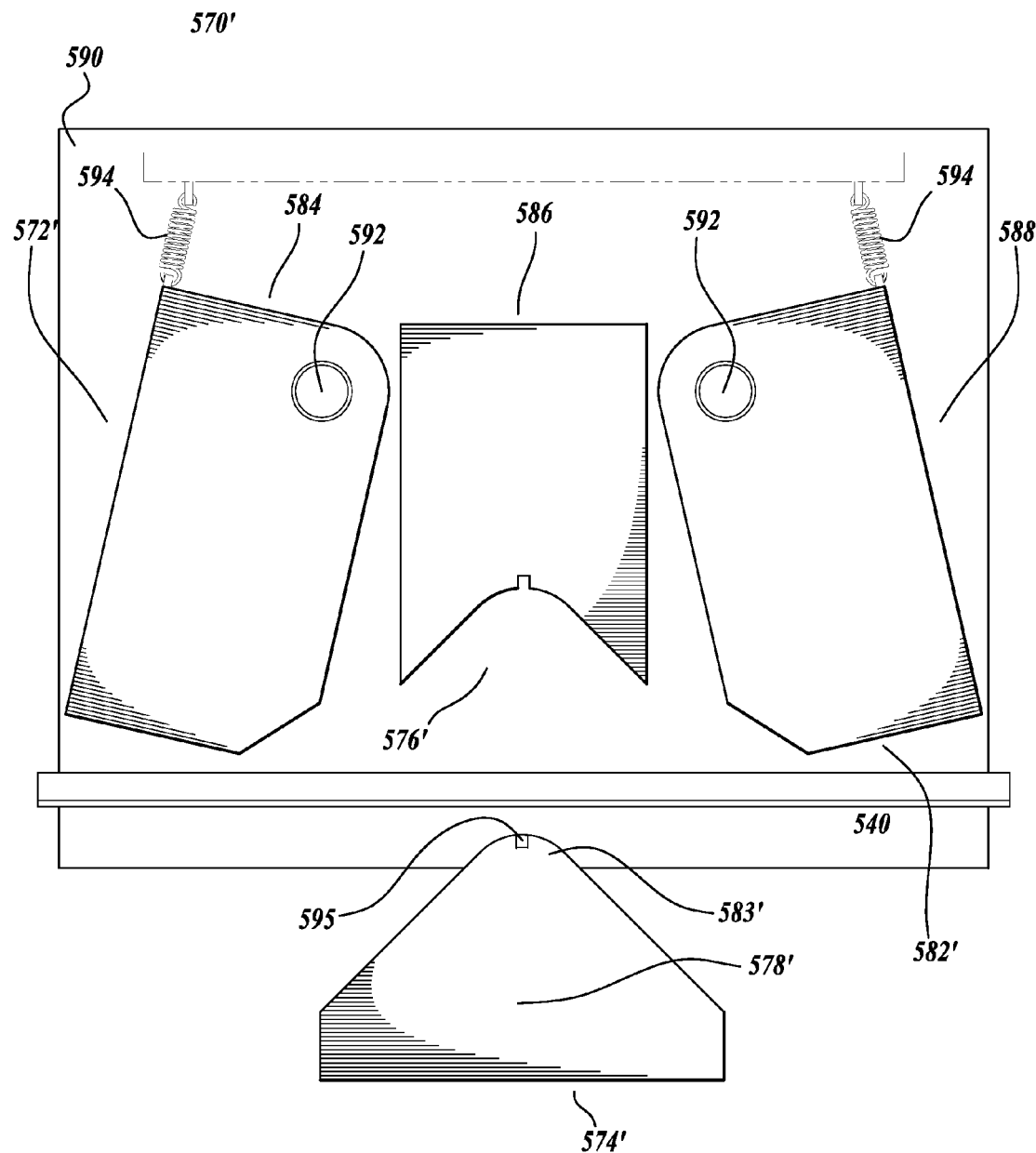
FIGS. 88, 89, 90, and 91 illustrate another die assembly for forming corners in a rectilinear slip joint.
Figure 89:
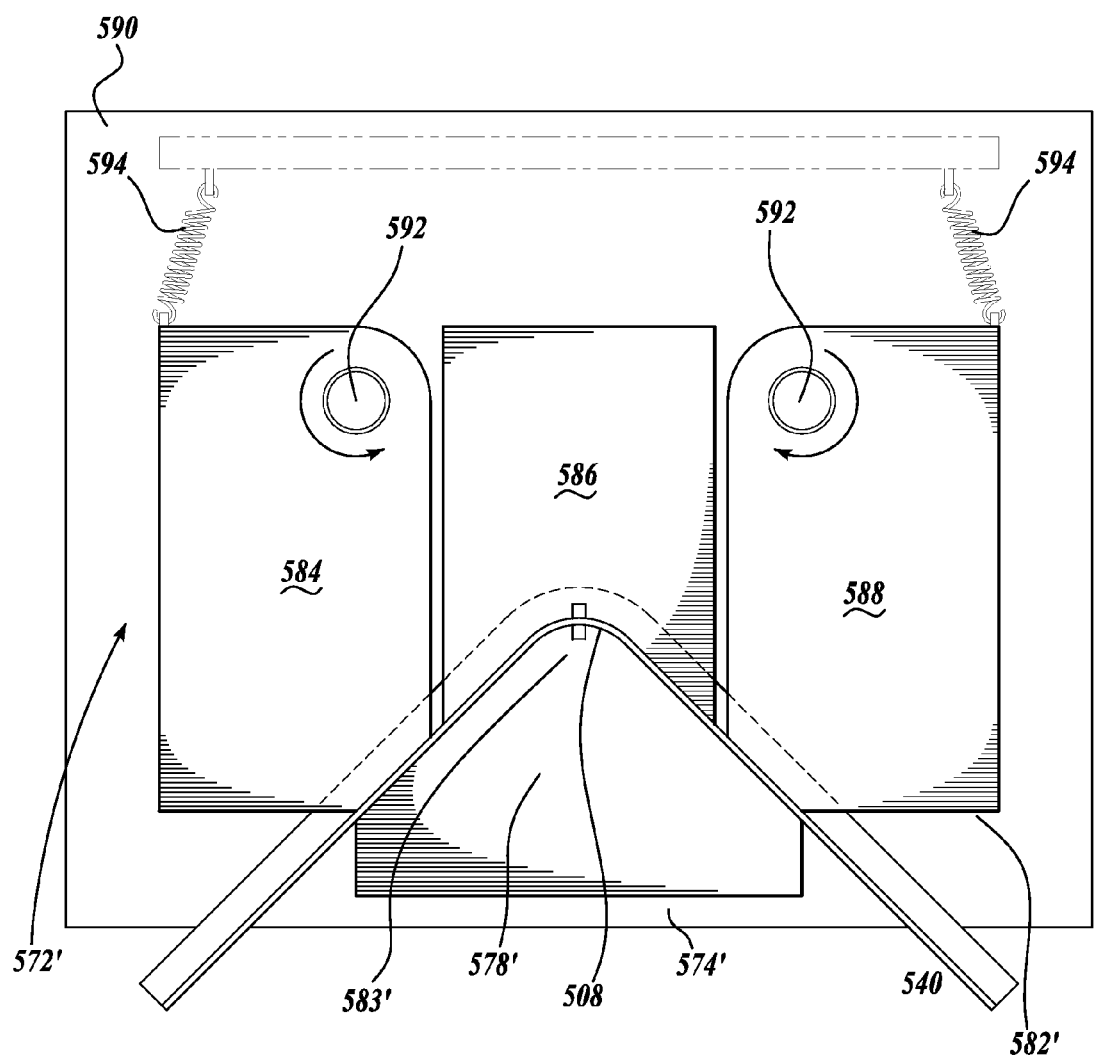
Figure 90:
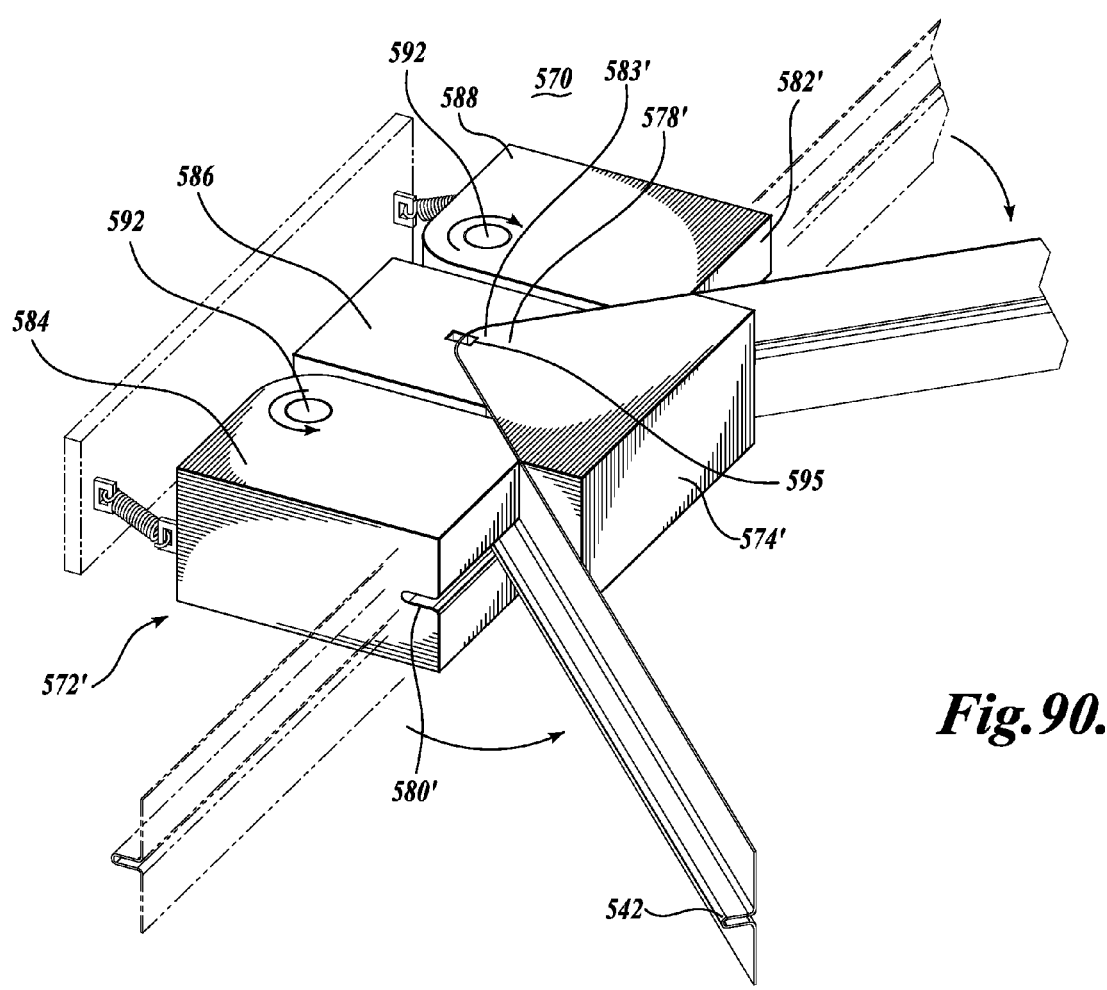
Figure 91:
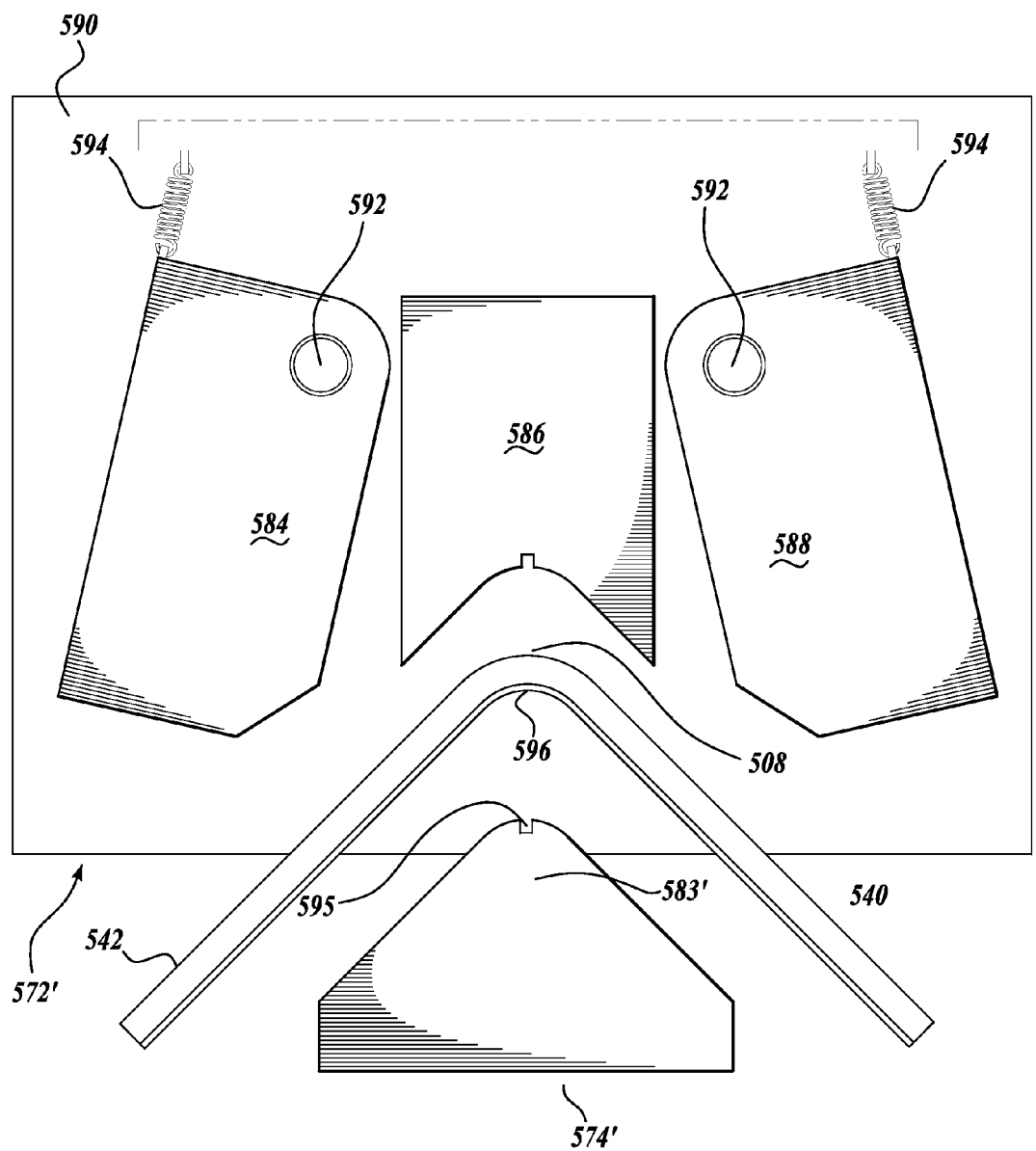

Once a standing seam 542 has been formed in the strip stock 540 by the roller dies, the length of strip stock is then transversely bent to form four corners 508 corresponding to the corners of the rectilinear ducting to be joined. This can be accomplished by utilizing the bending die 570 shown in FIGS. 85-87. The bending die 570 generally includes a female section 572 and a male section 574. A 90 degree V-shaped notch 576 is formed in the leading side or edge portion 582 of the female die 572 to receive a correspondingly shaped male projection section 578 of the male die 574. As shown in FIGS. 85 and 87, a groove 580 is formed along the leading edge 582, as well as within the V portion 576 of the female die 572 to receive the standing seam 542 of the formed strip 540. The formed strip 540 is placed with respect to the female die 572 with the standing seam 542 within groove 580 and then the two die sections are moved toward each other so that the male projection 578 engages within the V section 576, thereby to form a 90 degree corner in the strip 540. This operation is repeated four times to form each of the four corners of the connector 500. The free ends of the formed connector can be joined together by any convenient means, such as by welding or by utilizing a short length of flat stock along the inside surface of the connector to which the free ends of the connector can be attached by any convenient means, such as by welding, riveting, etc.

It will be appreciated that the leading corner 583 of the male projection 578 of the die 574 is rounded somewhat so that the corners 508 of the connector are also rounded at a radius at least as large as and typically a little larger than the inside radius of the corners of the duct sections 502 and 504. This enables the connector 500 to properly fit relatively snugly with the adjacent ends of the duct sections 502 and 504.

FIGS. 88-91 illustrate another form of bending die 570' used to bend the formed strip stock 540 into a rectilinear shape. The bending die 570' is similar to that shown in FIGS. 88-91. Accordingly, the components of the bending die 570' corresponding to the bending die 570 are represented by the same part number, but with the addition of a prime (') designation.

Referring to FIGS. 88-91 the bending die 570' includes a female section 572' and a male section 574'. The female section 572' is composed of three major components, a left-hand die section 584, a central die section 586, and a right-hand die section 588 mounted on a base plate 590. The three die sections 584, 586, and 588 cooperatively define a 90° V-shaped notch 576' formed in the leading side or edge portion 582' of the female die 572', in the manner of female die 572, to receive a correspondingly shaped male projection section 578' of the male die 574'. As in female die 572, the female die 572' also is configured to define a groove 580' along the leading edge 582' of the die sections 584 and 588, as well as the central die section 586. The groove 580' is sized to receive the standing seam 542 of the formed strip 540.

The left-hand die section 584 and the right-hand die section 588 are pivotally mounted to a base 590 by shafts 592, which allow the left- and right-hand die sections to spread apart from each other after the strip stock 540 has been bent to define the corner 508. This is accomplished by extension springs 594 that are attached to rear outer corners of the die sections 584 and 588. When a corner 508 is being formed the die section 584 and 588 are pivoted inwardly so as to cooperate with center section 586 to form a continuous V-portion 576', see FIGS. 89-90. However, once the male section 574' is removed from the female section 572' shown in FIG. 91, the die sections 584 and 588 are able to pivot outwardly relative to each other to facilitate removal of the formed corner 508 of the strip stock 540 from the die V-portion 576'.

As shown in FIGS. 88-91, the leading corner portion 583' of the male die 574' is formed with a vertical groove 595 extending along the height of the leading corner. The groove 595 is designed to receive portions 596 of the formed corner 508 that are pinched inwardly toward the leading corner 583' of the male die 574' during the process of forming the corner 508.

It will also be appreciated that by the foregoing method, connectors 500 can be efficiently and accurately constructed. Moreover, the resulting connector 500 is a singular piece used to connect duct sections 502 and 504 rather than requiring numerous individual pieces that each individually must be installed as in the prior art discussed above.

Figure 92:
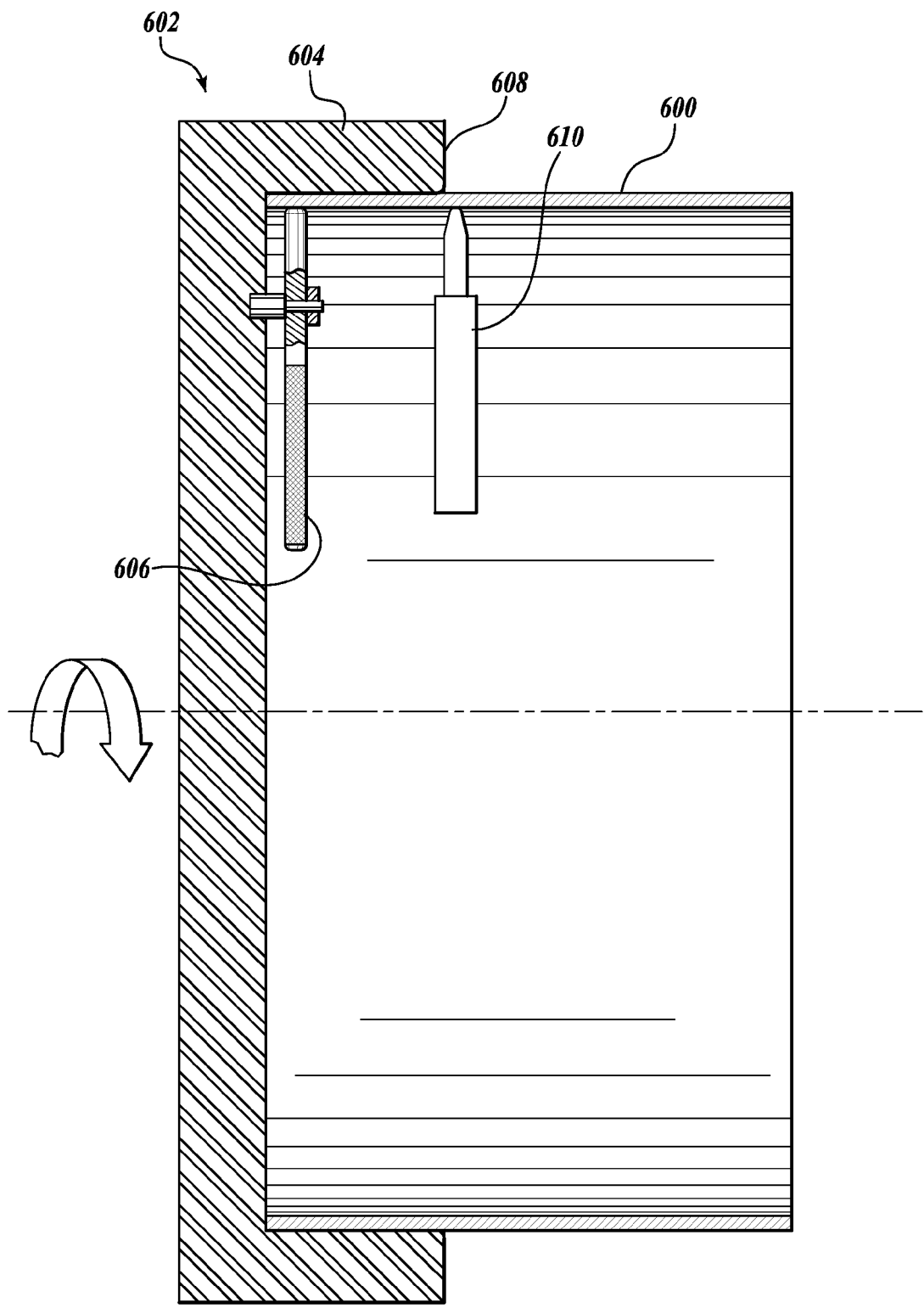
FIGS. 92, 93, and 94 illustrate another method of forming a rectilinear slip joint in accordance with the present disclosure, with FIG. 92 showing a band of light gauge material positioned in a spin die, FIG. 93 showing the band being partially formed.
Figure 93:
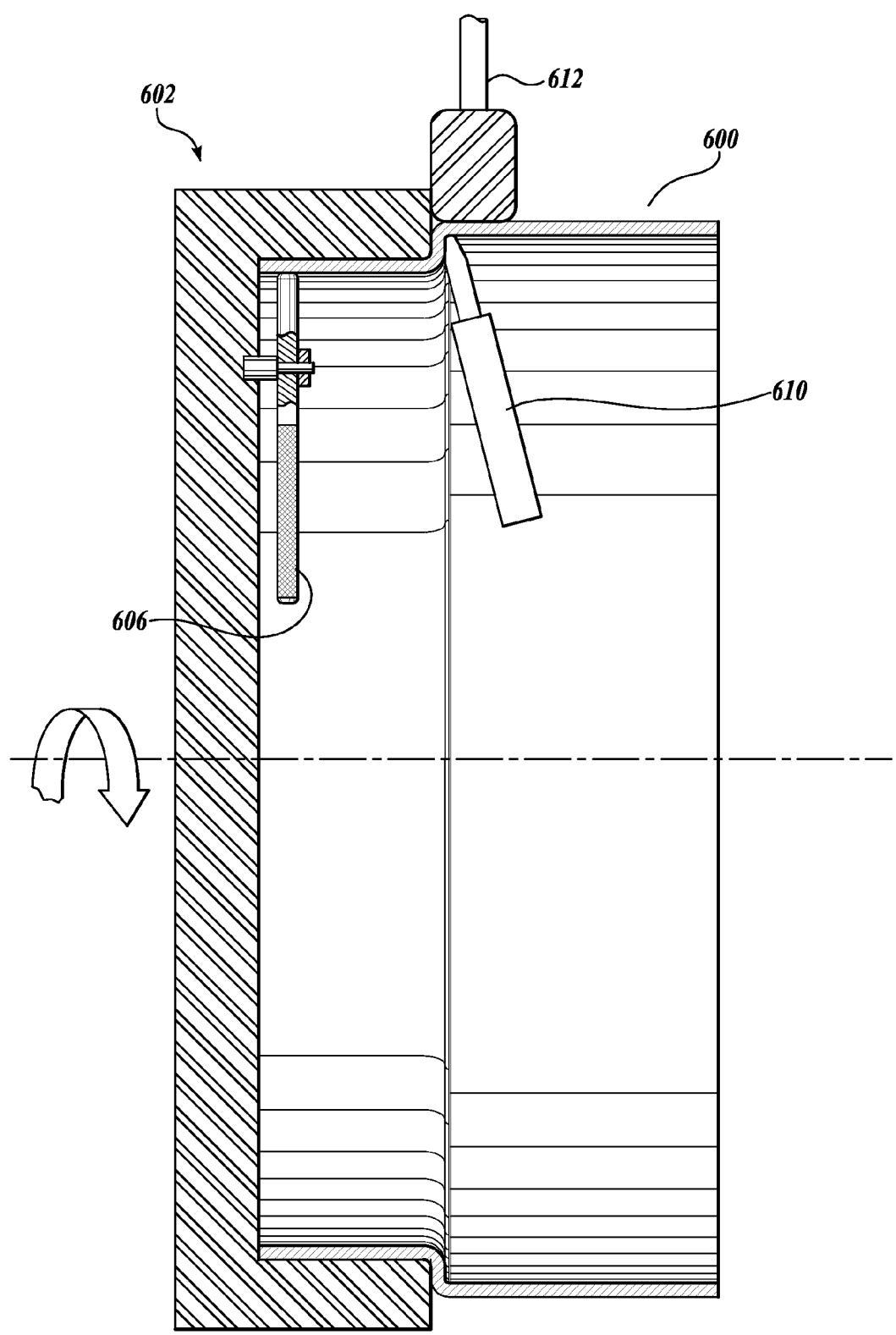
Figure 94:
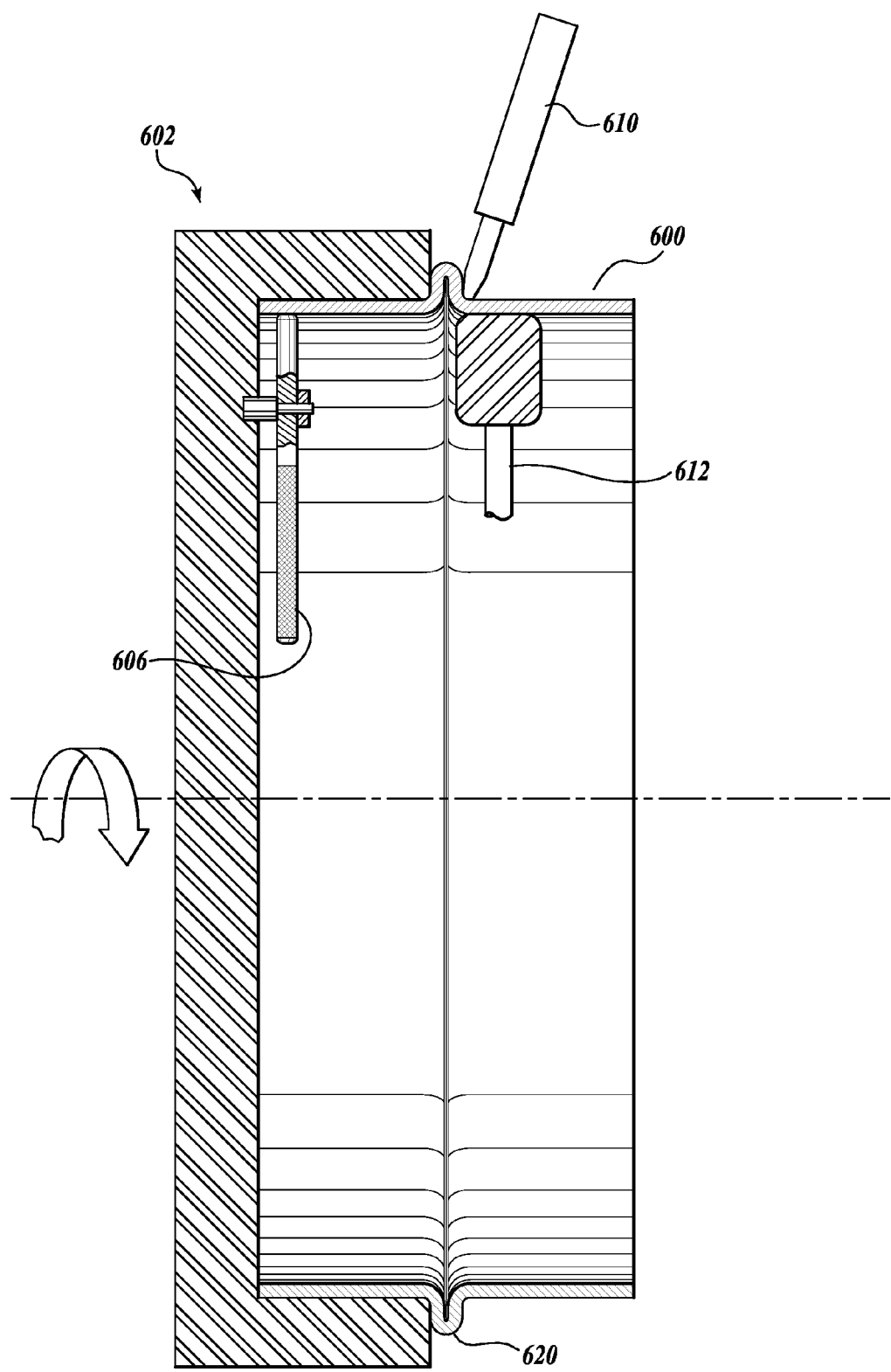

FIGS. 92-94 illustrate another method of forming a connector for interconnecting adjacent end portions of rectilinear HVAC ducts. The illustrated method begins with a length of strip material similar to strip 540 shown in FIG. 83, but formed into a round band 600, with the ends of the band connected together by welding or other standard procedure. The band 600 is placed in a spin die 602 with the band securely positioned against the inside surface of the die outer rim portion 604. The band can be held in place by one or more rotatable fingers 606 in a standard method. Spin die 602 can be of the type shown and described in U.S. Pat. No. 6,289,706, incorporated herein by reference. As shown in FIG. 92, when the band 600 is engaged and placed within the spin die 602, a portion of the band extends beyond the outer end 608 of the die. Referring to FIGS. 92 and 93, with the spin die 602 spinning, a tool 610 is used to press the outer portion of the band 600 against die edge 608. While tool 610 is in place, a second tool 612 can be used to push against the outward side of the band to as shown in FIG. 93. Thereafter, the tool 610 can be used to form the band to the configuration shown in FIG. 94 wherein the band now has a bead portion 620 that stands radially out from the remainder of the band. It is to be understood that other forming sequences can be used to form the bead 620 than described above.

Figure 95:
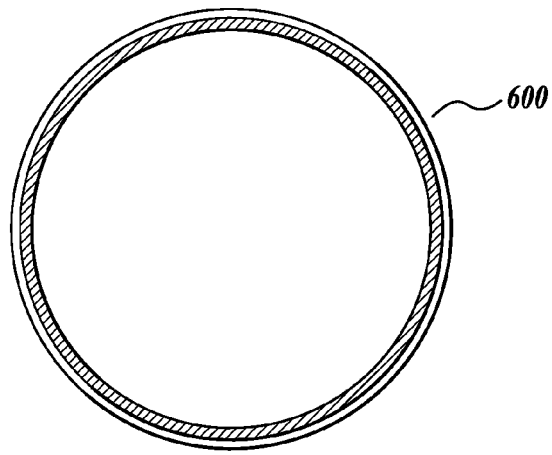
FIG. 95 shows the formed circular band after removal from the spin die.
Figure 96:
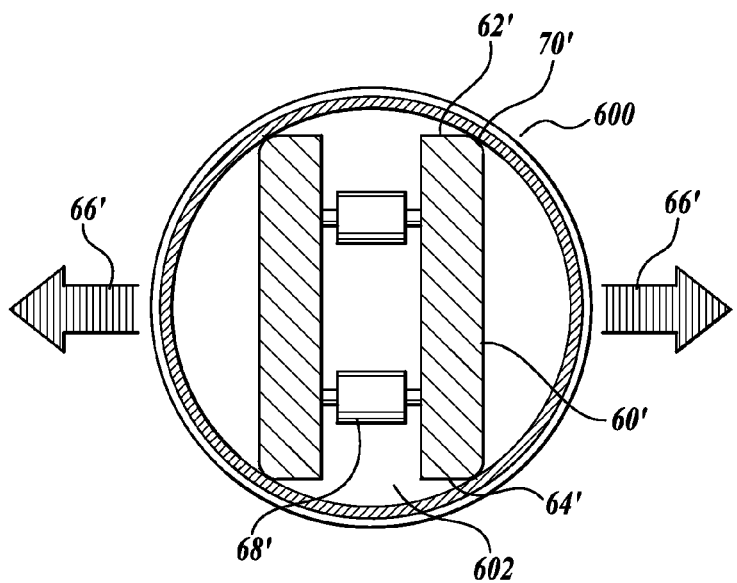
FIG. 96 shows the formed circular band engaged over retracted die members.
Figure 97:
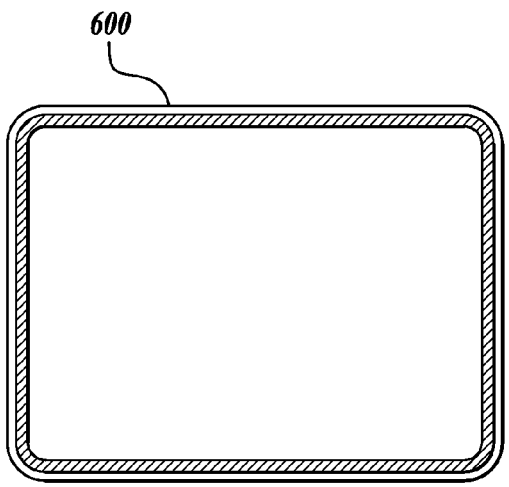
FIG. 97 shows the circular formed band of FIG. 96 reshaped into rectilinear configuration to match the shape of the end portions of the rectilinear HVAC ducting to be interconnected.

The beaded band shown in FIG. 94 is removed from the die 602 and then the band may be formed into a rectilinear shape using one or more of the methods described above that are used to reshape circular ducting into rectilinear ducting, see FIGS. 95, 96, and 97. Once rectilinear in shape, the band 600 can be inserted into adjacent end portions of rectilinear ducting to be joined, with the end edges of the duct sections abutting against the bead 620. The installed band 600 can be secured in place utilizing hardware members, such as sheet screws as described above with respect to rectilinear slip joint 500. The rectilinear slip joint created from band 600 has the same advantages as rectilinear slip joint 500 described above. It is to be understood that the slip joints 500 and 600 can also be used to interconnect rectilinear duct sections with fittings, such as elbows, T's, reducers, etc.

It will be appreciated that the connectors described above in addition to interconnecting lengths of square or rectangular ducting, can also be used as stiffeners for duct lengths. Such connectors can be manufactured in sizes to closely slideably engage over the duct. Once in place, the connectors can be affixed to the duct wall by any convenient manner, such as with hardware members, for example, threaded screws extending through the insertion sections of the connector and in to the underlying wall of the duct, or by welding.

While preferred embodiments of the present disclosure have been illustrated and described, it will be appreciated that various changes can be made therein without departing from the spirit and scope of the disclosure. In this regard, various configurations and cross-sectional profiles for flange connectors of the present disclosure have been illustrated and described. These various profiles can be manufactured utilizing the methods of the present disclosure, beginning with a length of strip stock and forming the desired cross-sectional profile in the strip stock using roll forming bending and other well known techniques. Thereafter, the length of formed strip stock is bent into a square rectangular configuration corresponding to the cross-sectional shape of the duct being connected together. These methods can be used to form flanged connector rings of other profiles not shown and described herein, for square and rectangular ducts.

The embodiments of the invention in which an exclusive property or privilege is claimed are defined as follows:

1. A method of forming large cross-sectional, rectilinear cross-section ducting from thin gauge metal for use in heating, ventilating, and air conditioning systems, comprising:
(a) preforming round cross-sectional ducting from thin gauge helically wound and interlocked sheet metal strip;
(b) placing the preformed round ducting over an expansion die comprising opposed die members, both of said die members each having a substantially planar outwardly directed face and side edge portions transverse to the face, with the outwardly directed face and the side edge portions intersecting each other at relieved, non-sharp corners; and (c) forcing the die members away from each other while maintaining the outward die member faces substantially parallel to each other to bear against adjacent portions of the preformed ducting wherein the preformed ducting transforms in cross-sectional shape to assume a final generally rectilinear cross-sectional shape with:

all non-sharp corners as defined by the intersection of the outwardly directed faces of the die members and the die member side edge portions;

upon removal of the die members from the ducting, the ducting defining minor sides spaced apart from each other and major sides spaced apart from each other, said major sides being longer than said minor sides and extending transversely to said minor sides, with the minor sides bowed nominally outwardly and the major sides bowed nominally inwardly; and said ducting flexible in cross-section under normal air pressure when in use to reduce the bowing of the major sides.

2. A method according to claim 1, wherein the die members side edge portions are substantially perpendicular to the outwardly directed faces of said die members; whereby the preformed ducting assuming the shape of the side edge portions of the die members.

3. A method according to claim 1, wherein the expansion die corners formed by the intersection of outwardly directed die faces and die side edge portions are chamfered.

4. A method according to claim 1, wherein the expansion die corners formed by the intersection of outwardly directed die faces and die side edge portions are rounded.

5. A method according to claim 4, wherein the expansion die corners formed by the intersection of outwardly directed die faces and die side edge portions have a radius of from 1 inch to 2 inches.

6. A method according to claim 4, wherein the expansion die corners formed by the intersection of outwardly directed die faces and die side edge portions have a radius of ½ inch to 1 inch.

7. A method according to claim 4, wherein the expansion die corners formed by the intersection of outwardly directed die faces and die side edge portions have a radius of ⅛ inch to 1 inch.

8. A method according to claim 1, wherein the outwardly directed faces of the die members cooperate to transform the preformed round cross-sectional ducting in a generally rectangular cross-section.

9. A method according to claim 1, wherein the round cross-sectional ducting is preformed from strip material using a continuous forming method.

10. A method according to claim 1, optionally prior to placing the preformed round ducting over an expansion die, preliminarily deforming the preformed round ducting into a shape intermediate between the initial preformed round ducting shape and the final rectilinear shape with the final cross-sectional shape of the ducting.

11. A method according to claim 10, wherein the preliminary deforming of the preformed round ducting is performed by pressing against the exterior of the round ducting.

12. A method according to claim 10, wherein the preliminary deforming of the preformed round ducting is performed by pressing against the interior of the round ducting.

13. A method according to claim 1, wherein the amount of bowing of the minor side is approximately 3/16 inch per 12 inches along the minor side of the ducting.

* * * * *